US012739383B2

(12) United States Patent
Besenbruch et al.

(10) Patent No.: US 12,739,383 B2
(45) **Date of Patent: *Sep. 15, 2026**

(54) IMAGE ENCODING AND DECODING, VIDEO ENCODING AND DECODING: METHODS, SYSTEMS AND TRAINING METHODS

(71) Applicant: InterDigital VC Holdings, Inc., Wilmington, DE (US)

(72) Inventors: Chri Besenbruch, London (GB); Aleksandar Cherganski, London (GB); Christopher Finlay, London (GB); Alexander Lytchier, London (GB); Jonathan Rayner, London (GB); Tom Ryder, London (GB); Jan Xu, London (GB); Arsalan Zafar, London (GB)

(73) Assignee: InterDigital VC Holdings, Inc., Wilmington, DE (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/513,581

(22) Filed: Nov. 19, 2023

(65) Prior Publication Data

US 2024/0107022 A1 Mar. 28, 2024

Related U.S. Application Data

(63) Continuation of application No. 18/105,338, filed on Feb. 3, 2023, now Pat. No. 11,843,777, which is a (Continued)

(30) Foreign Application Priority Data

Oct. 23, 2020 (GB) ..................................... 2016824

(51) Int. Cl.
*H04N 19/13* (2014.01)
*G06V 10/422* (2022.01)
(Continued)

(52) U.S. Cl.
CPC ........... *H04N 19/13* (2014.11); *G06V 10/422* (2022.01); *H04N 19/124* (2014.11); *H04N 19/42* (2014.11)

(58) Field of Classification Search
CPC ...... H04N 19/13; H04N 19/124; H04N 19/42; G06V 10/422
(Continued)

(56) References Cited

U.S. PATENT DOCUMENTS 10,373,300 B1 8/2019 Besenbruch et al.
10,489,936 B1 11/2019 Zafar et al.
(Continued)

OTHER PUBLICATIONS

Agustsson, Eirikur , et al., Generative adversarial networks for extreme learned image compression. In Proceedings of the IEEE International Conference on Computer Vision, pp. 221-231, 2019.
(Continued)

*Primary Examiner* — Mainul Hasan
*Assistant Examiner* — Richard B Carter
(74) *Attorney, Agent, or Firm* — Condo Roccia Koptiw LLP

(57) ABSTRACT

Lossy or lossless compression and transmission, comprising the steps of: (i) receiving an input image; (ii) encoding it to produce a y latent representation; (iii) encoding the y latent representation to produce a z hyperlatent representation; (iv) quantizing the z hyperlatent representation to produce a quantized z hyperlatent representation; (v) entropy encoding the quantized z hyperlatent representation into a first bitstream, (vi) processing the quantized z hyperlatent representation to obtain a location entropy parameter μy, an entropy scale parameter σy, and a context matrix Ay of the y latent representation; (vii) processing the y latent representation, the location entropy parameter μy and the context matrix Ay, to obtain quantized latent residuals; (viii) entropy
(Continued)

encoding the quantized latent residuals into a second bitstream; and (ix) transmitting the bitstreams.

20 Claims, 14 Drawing Sheets

Related U.S. Application Data continuation of application No. 17/748,502, filed on May 19, 2022, now Pat. No. 11,606,560, which is a continuation of application No. 17/740,798, filed on May 10, 2022, now Pat. No. 11,558,620, which is a continuation of application No. PCT/GB2021/052770, filed on Oct. 25, 2021.

(51) Int. Cl.
*H04N 19/124* (2014.01)
*H04N 19/42* (2014.01)

(58) Field of Classification Search
USPC .................................................... 375/240.03
See application file for complete search history.

(56) References Cited

U.S. PATENT DOCUMENTS

| | | | | |
|---|---|---|---|---|
| 11,475,542 | B2 * | 10/2022 | Munkberg | G06T 5/70 |
| 11,606,560 | B2 | 3/2023 | Besenbruch et al. | |
| 11,677,948 | B2 * | 6/2023 | Besenbruch | G06N 3/045<br>375/240.03 |
| 2019/0171929 | A1 * | 6/2019 | Abadi | G06N 3/045 |
| 2019/0180136 | A1 | 6/2019 | Bousmalis et al. | |
| 2020/0364574 | A1 * | 11/2020 | Kim | G06N 3/09 |
| 2021/0004677 | A1 | 1/2021 | Menick et al. | |
| 2022/0272352 | A1 | 8/2022 | Dinh et al. | |

OTHER PUBLICATIONS

Blau, Yochai , et al., The perception-distortion tradeoff. In Proceedings of the IEEE Conference on Computer Vision and Pattern Recognition, 2018.

Goodfellow, Ian , et al., Generative adversarial nets. Advances in neural information processing systems, 27, 2014.

Habibian, Amirhossein , et al., "Video Compression With Rate-Distortion Autoencoders", arxiv.org, Cornell University Library, 201 Olin Library Cornell University Ithaca, NY 14853, Aug. 14, 2019 (Aug. 14, 2019).

Han, Jun , et al., "Deep Probabilistic Video Compression", arxiv.org, Cornell University Library, 201 Olin Library Cornell University Ithaca, NY 14853, Oct. 5, 2018 (Oct. 5, 2018).

Jan, Xu , et al., "Efficient Context-Aware 1-21 Lossy Image Compression", 2020 IEEE/CVF Conference on Computer Vision and Pattern Recognition Workshops (CVPRW), IEEE, Jun. 14, 2020 (Jun. 14, 2020).

Kingma, Diederik , et al., Auto-encoding variational bayes. arXiv preprint arXiv:1312.6114, 2013.

Mechrez, Roey , et al., Maintaining natural image statistics with the contextual loss. In Asian Conference on Computer Vision, pp. 427-443. Springer, 2018.

Mechrez, Roey , et al., The contextual loss for image transformation with non-aligned data. In Proceedings of the European Conference on Computer Vision (ECCV), pp. 768-783, 2018.

Ronneberger, Olaf , et al., U-net: Convolutional networks for biomedical image segmentation. In International Conference on Medical Image Computing and Computer-assisted Intervention, pp. 234-241. Springer, 2015.

Zhang, Richard , et al., The unreasonable effectiveness of deep features as a perceptual metric. In Proceedings of the IEEE Conference on Computer Vision and Pattern Recognition, 2018.

* cited by examiner

| $L_{ii-4}$ | $L_{ii-3}$ | $L_{ii-2}$ |
| --- | --- | --- |
| $L_{ii-1}$ | $i$ | |
| | | |

(a)

| 1 | 2 | 3 | 4 | 5 |
| --- | --- | --- | --- | --- |
| 6 | 7 | 8 | 9 | 10 |
| 11 | 12 | 13 | 14 | 15 |

(b)

IMAGE ENCODING AND DECODING, VIDEO ENCODING AND DECODING: METHODS, SYSTEMS AND TRAINING METHODS

CROSS-REFERENCE TO RELATED APPLICATIONS

This application is a continuation of U.S. application Ser. No. 18/105,338, filed Feb. 3, 2023 (now U.S. Pat. No. 11,843,777), which is a continuation of U.S. application Ser. No. 17/748,502, filed on May 19, 2022 (now U.S. Pat. No. 11,606,560), which is a continuation of U.S. application Ser. No. 17/740,798, filed on May 10, 2022 (now U.S. Pat. No. 11,558,620), which is a continuation of PCT Application No. PCT/GB2021/052770, filed on Oct. 25, 2021, which claims priority to GB Application No. GB 2016824.1, filed on Oct. 23, 2020, the entire contents of each of which being fully incorporated herein by reference.

BACKGROUND OF THE INVENTION

1. Field of the Invention

The field of the invention relates to computer-implemented methods and systems for image encoding and decoding, to computer-implemented methods and systems for video encoding and decoding, to computer-implemented training methods, and to related computer program products.

2. Technical Background

There is increasing demand from users of communications networks for images and video content. Demand is increasing not just for the number of images viewed, and for the playing time of video; demand is also increasing for higher resolution, lower distortion content, if it can be provided. This places increasing demand on communications networks, and increases their energy use, for example, which has adverse cost implications, and possible negative implications for the environment, through the increased energy use.

Although image and video content is usually transmitted over communications networks in compressed form, it is desirable to increase the compression, while preserving displayed image quality, or to increase the displayed image quality, while not increasing the amount of data that is actually transmitted across the communications networks. This would help to reduce the demands on communications networks, compared to the demands that otherwise would be made.

3. Discussion of Related Art

U.S. Pat. No. 10,373,300B1 discloses a system and method for lossy image and video compression and transmission that utilizes a neural network as a function to map a known noise image to a desired or target image, allowing the transfer only of hyperparameters of the function instead of a compressed version of the image itself. This allows the recreation of a high-quality approximation of the desired image by any system receiving the hyperparameters, provided that the receiving system possesses the same noise image and a similar neural network. The amount of data required to transfer an image of a given quality is dramatically reduced versus existing image compression technology. Being that video is simply a series of images, the application of this image compression system and method allows the transfer of video content at rates greater than previous technologies in relation to the same image quality.

U.S. Pat. No. 10,489,936B1 discloses a system and method for lossy image and video compression that utilizes a metanetwork to generate a set of hyperparameters necessary for an image encoding network to reconstruct the desired image from a given noise image.

SUMMARY OF THE INVENTION

Advantages of the computer-implemented methods, computer systems, and computer program products described below include that they reduce energy consumption.

Decoding computer systems described below may be implemented as a portable device, or as a mobile device e.g. a smartphone, a tablet computer, or a laptop computer. An advantage is that battery charge consumption of the portable device, or of the mobile device may be reduced.

According to a first aspect of the invention, there is provided a computer-implemented method for lossy or lossless image or video compression and transmission, the method including the steps of:

(i) receiving an input image;

(ii) encoding the input image using an encoder trained neural network, to produce a y latent representation;

(iii) encoding the y latent representation using a hyperencoder trained neural network, to produce a z hyperlatent representation;

(iv) quantizing the z hyperlatent representation using a predetermined entropy parameter to produce a quantized z hyperlatent representation;

(v) entropy encoding the quantized z hyperlatent representation into a first bitstream, using predetermined entropy parameters;

(vi) processing the quantized z hyperlatent representation using a hyperdecoder trained neural network to obtain a location entropy parameter $\mu_y$, an entropy scale parameter $\sigma_y$, and a context matrix $A_y$ of the y latent representation;

(vii) processing the y latent representation, the location entropy parameter $\mu_y$ and the context matrix $A_y$, using an implicit encoding solver, to obtain quantized latent residuals;

(viii) entropy encoding the quantized latent residuals into a second bitstream, using the entropy scale parameter $\sigma_y$; and (ix) transmitting the first bitstream and the second bitstream.

An advantage is that ground-truth variable (image or latent) can readily be used during the training of the compression algorithms; this speeds up training. An advantage is that because the Implicit Encode Solver (IES) also returns the quantized y latent representation, there is no need to run a separate decode solver during training to recover the quantized y latent representation from latent residuals: the quantized y latent representation is already given; this speeds up training. An advantage is that the computational cost of using an iterative linear solver in an AI-based compression pipeline can account for a tiny fraction of the total computations in the entire pipeline. An advantage is that encoding time is reduced.

The method may be one wherein in step (iv) the predetermined entropy parameter is a predetermined location entropy parameter $\mu_z$, and in step (v) the predetermined entropy parameters are the predetermined location entropy parameter $\mu_z$ and a predetermined entropy scale parameter $\sigma_z$. An advantage is faster processing of the entropy parameters, which reduces encoding time.

The method may be one in which the implicit encoding solver solves the implicit equations (I) the quantized latent residuals equal a quantisation function of the sum of the y latent representation minus $\mu_y$ ty minus $A_y$ acting on the quantised y latent representation; and (II) the quantised y latent representation equals the quantized latent residuals plus $\mu_y$ plus $A_y$ acting on the quantised y latent representation.

An advantage is that the computational cost of using an iterative linear solver in an AI-based compression pipeline can account for a tiny fraction of the total computations in the entire pipeline. An advantage is that encoding time is reduced.

The method may be one wherein the implicit encoding solver solves the implicit equations by defining B=I−A, where A is a m×m matrix, and I is the m×m identity matrix, wherein (a) if B is lower triangular, then the serial method forward substitution is used; or (b) if B is upper triangular, then the serial method backward substitution is used; or (c) B is factorised as a triangular decomposition, and then $B^*y=\mu+\hat{\xi}$, where $\hat{\xi}$ is the quantized residual, is solved by inverting lower triangular factors with forward substitution, and by inverting upper triangular factors with backward substitution; or (d) B is factorised with a QR decomposition, where Q is an orthonormal matrix and R is an upper triangular matrix, and the solution is $y=R^{-1}Q^t\mu$, where $Q^t$ is Q transpose, or B is factorized using B=QL, where L is a lower triangular matrix, or B=RQ, or B=LQ, where Q is inverted by its transpose, R is inverted with back substitution, and L is inverted with forward substitution, and then respectively, the solution is $y=L^{-1}Q^t\mu$, or $y=Q^tR^{-1}\mu$, or $y=Q^tL^{-1}\mu$; or (e) B=D+L+U, with D a diagonal matrix, and here L is a strictly lower triangular matrix, and U a strictly upper triangular matrix, and then the iterative Jacobi method is applied, until a convergence criterion is met; or (f) the Gauss-Seidel method is used; or (g) the Successive Over Relaxation method is used, or (h) the Conjugate Gradient method is used.

An advantage is that the computational cost of using an iterative linear solver in an AI-based compression pipeline can account for a tiny fraction of the total computations in the entire pipeline. An advantage is that encoding time is reduced.

The method may be one wherein the implicit encoding solver solves the implicit equations using an iterative solver, in which iteration is terminated when a convergence criterion is met. An advantage is that the computational cost of using an iterative linear solver in an AI-based compression pipeline can account for a tiny fraction of the total computations in the entire pipeline. An advantage is that encoding time is reduced.

The method may be one wherein the implicit encoding solver returns residuals, and a quantized latent representation y. An advantage is that because the Implicit Encode Solver (IES) also returns the quantized y latent representation, there is no need to run a separate decode solver during training to recover the quantized y latent representation from latent residuals: the quantized y latent representation is already given; this speeds up training.

The method may be one wherein the matrix A is lower triangular, upper triangular, strictly lower triangular, strictly upper triangular, or A has a sparse, banded structure, or A is a block matrix, or A is constructed so that its matrix norm is less than one, or A is parametrised via a matrix factorisation such as a LU or QR decomposition. An advantage is that encoding time is reduced.

According to a second aspect of the invention, there is provided an encoding computer system for lossy or lossless image or video compression and transmission, the encoding computer system including an encoding computer, an encoder trained neural network, a hyperencoder trained neural network and a hyperdecoder trained neural network, wherein:

(i) the encoding computer is configured to receive an input image;

(ii) the encoding computer is configured to encode the input image using the encoder trained neural network, to produce a y latent representation;

(iii) the encoding computer is configured to encode the y latent representation using the hyperencoder trained neural network, to produce a z hyperlatent representation;

(iv) the encoding computer is configured to quantize the z hyperlatent representation using a predetermined entropy parameter to produce a quantized z hyperlatent representation;

(v) the encoding computer is configured to entropy encode the quantized z hyperlatent representation into a first bitstream, using predetermined entropy parameters;

(vi) the encoding computer is configured to process the quantized z hyperlatent representation using the hyperdecoder trained neural network to obtain a location entropy parameter $\mu_y$, an entropy scale parameter $\sigma_y$, and a context matrix $A_y$ of the y latent representation;

(vii) the encoding computer is configured to process the y latent representation, the location entropy parameter $\mu_y$ and the context matrix $A_y$, using an implicit encoding solver, to obtain quantized latent residuals;

(viii) the encoding computer is configured to entropy encode the quantized latent residuals into a second bitstream, using the entropy scale parameter $\sigma_y$; and (ix) the encoding computer is configured to transmit the first bitstream and the second bitstream.

The system may be one configured to perform a method of any aspect of the first aspect of the invention.

According to a third aspect of the invention, there is provided a computer-implemented method for lossy or lossless image or video decoding, the method including the steps of:

(i) receiving a first bitstream and a second bitstream;

(ii) decoding the first bitstream using an arithmetic decoder, using predetermined entropy parameters, to produce a quantized z hyperlatent representation;

(iii) decoding the quantized z hyperlatent representation using a hyperdecoder trained neural network, to obtain a location entropy parameter $\mu_y$, an entropy scale parameter $\sigma_y$, and a context matrix $A_y$ of a y latent representation;

(iv) decoding the second bitstream using the entropy scale parameter a y in an arithmetic decoder, to output quantised latent residuals;

(v) processing the quantized latent residuals, the location entropy parameter $\mu_y$ and the context matrix $A_y$, using an (e.g. implicit) (e.g. linear) decoding solver, to obtain a quantized y latent representation;

(vi) decoding the quantized y latent representation using a decoder trained neural network, to obtain a reconstructed image.

An advantage is that the computational cost of using an iterative linear solver in an AI-based compression pipeline can account for a tiny fraction of the total computations in the entire pipeline. An advantage is that decoding time is reduced.

The method may be one wherein in step (ii) the predetermined entropy parameters are a predetermined location entropy parameter $\mu_z$ and a predetermined entropy scale parameter $\sigma_z$. An advantage is faster processing of the entropy parameters, which reduces decoding time.

The method may be one including the step of (vii) storing the reconstructed image.

The method may be one in which the (e.g. implicit) (e.g. linear) decoding solver solves the (e.g. implicit) equation that the quantised y latent representation equals the quantized latent residuals plus $\mu_y$ plus $A_y$ acting on the quantised y latent representation. An advantage is that decoding time is reduced.

The method may be one wherein the (e.g. implicit) (e.g. linear) decoding solver solves the (e.g. implicit) equations by defining B=I−A, where A is a m×m matrix, and I is the m×m identity matrix, wherein (a) if B is lower triangular, then the serial method forward substitution is used; or (b) if B is upper triangular, then the serial method backward substitution is used; or (c) B is factorised as a triangular decomposition, and then $B*y=\mu+\hat{\xi}$, where $\hat{\xi}$ is the quantized residual, is solved by inverting lower triangular factors with forward substitution, and by inverting upper triangular factors with backward substitution; or (d) B is factorised with a QR decomposition, where Q is an orthonormal matrix and R is an upper triangular matrix, and the solution is $y=R^{-1}Q^t\mu$, where $Q^t$ is Q transpose, or B is factorized using B=QL, where L is a lower triangular matrix, or B=RQ, or B=LQ, where Q is inverted by its transpose, R is inverted with back substitution, and L is inverted with forward substitution, and then respectively, the solution is $y=L^{-1}Q^t\mu$, or $y=Q^tR^{-1}\mu$, or $y=Q^tL^{-1}\mu$; or (e) B=D+L+U, with D a diagonal matrix, and here L is a strictly lower triangular matrix, and U a strictly upper triangular matrix, and then the iterative Jacobi method is applied, until a convergence criterion is met; or (f) the Gauss-Seidel method is used; or (g) the Successive Over Relaxation method is used, or (h) the Conjugate Gradient method is used.

An advantage is that the computational cost of using an iterative linear solver in an AI-based compression pipeline can account for a tiny fraction of the total computations in the entire pipeline. An advantage is that decoding time is reduced.

The method may be one in which an iterative solver is used, in which iteration is terminated when a convergence criterion is reached. An advantage is that the computational cost of using an iterative linear solver in an AI-based compression pipeline can account for a tiny fraction of the total computations in the entire pipeline. An advantage is that decoding time is reduced.

The method may be one in which the (e.g. implicit) (e.g. linear) decoding solver (e.g. any linear equation solver) is not necessarily the same type of solver as (e.g. it is different to) the solver used in encoding.

The method may be one wherein the matrix A is lower triangular, upper triangular, strictly lower triangular, strictly upper triangular, or A has a sparse, banded structure, or A is a block matrix, or A is constructed so that its matrix norm is less than one, or A is parametrised via a matrix factorisation such as a LU or QR decomposition. An advantage is that decoding time is reduced.

According to a fourth aspect of the invention, there is provided a decoding computer system for lossy or lossless image or video decoding, the decoding computer system including a decoding computer, a decoder trained neural network, and a hyperdecoder trained neural network, wherein:

(i) the decoding computer is configured to receive a first bitstream and a second bitstream;

(ii) the decoding computer is configured to decode the first bitstream using an arithmetic decoder, using predetermined entropy parameters, to produce a quantized z hyperlatent representation;

(iii) the decoding computer is configured to decode the quantized z hyperlatent representation using the hyperdecoder trained neural network, to obtain a location entropy parameter $\mu_y$, an entropy scale parameter $\sigma_y$, and a context matrix $A_y$ of a y latent representation;

(iv) the decoding computer is configured to decode the second bitstream using the entropy scale parameter $\sigma_y$ in an arithmetic decoder, to output quantized latent residuals;

(v) the decoding computer is configured to process the quantized latent residuals, the location entropy parameter $\mu_y$ and the context matrix $A_y$, using an (e.g. implicit) (e.g. linear) decoding solver, to obtain a quantized y latent representation;

(vi) the decoding computer is configured to decode the quantized y latent representation using the decoder trained neural network, to obtain a reconstructed image.

The system may be one wherein the system is configured to perform a method of any aspect according to the third aspect of the invention.

According to a fifth aspect of the invention, there is provided a computer-implemented method for lossy or lossless image or video compression and transmission, and for lossy or lossless image or video decoding, the method including a method of any aspect of the first aspect of the invention, and a method of any aspect of the third aspect of the invention.

An advantage is that ground-truth variable (image or latent) can readily be used during the training of the compression algorithms; this speeds up training. An advantage is that because the Implicit Encode Solver (IES) also returns the quantized y latent representation, there is no need to run a separate decode solver during training to recover the quantized y latent representation from latent residuals: the quantized y latent representation is already given; this speeds up training. An advantage is that the computational cost of using an iterative linear solver in an AI-based compression pipeline can account for a tiny fraction of the total computations in the entire pipeline. An advantage is that encoding time is reduced. An advantage is that decoding time is reduced.

According to a sixth aspect of the invention, there is provided a system for lossy or lossless image or video compression and transmission, and for lossy or lossless image or video decoding, the system including a system of any aspect of the second aspect of the invention, and a system of any aspect of the fourth aspect of the invention.

According to a seventh aspect of the invention, there is provided a computer implemented method of training an encoder neural network, a decoder neural network, a hyperencoder neural network, and a hyperdecoder neural network, and entropy parameters, the neural networks, and the entropy parameters, being for use in lossy image or video compression, transmission and decoding, the method including the steps of:

(i) receiving an input training image;

(ii) encoding the input training image using the encoder neural network, to produce a y latent representation;

(iii) encoding the y latent representation using the hyperencoder neural network, to produce a z hyperlatent representation;

(iv) quantizing the z hyperlatent representation using an entropy parameter of the entropy parameters to produce a quantized z hyperlatent representation;

(v) entropy encoding the quantized z hyperlatent representation into a first bitstream, using the entropy parameters;

(vi) processing the quantized z hyperlatent representation using the hyperdecoder neural network to obtain a location entropy parameter $\mu_y$, an entropy scale parameter $\sigma_y$, and a context matrix $A_y$ of the y latent representation;

(vii) processing the y latent representation, the location entropy parameter $\mu_y$ and the context matrix $A_y$, using an implicit encoding solver, to obtain quantized latent residuals;

(viii) entropy encoding the quantized latent residuals into a second bitstream, using the entropy scale parameter $\sigma_y$;

(ix) decoding the first bitstream using an arithmetic decoder, using the entropy parameters, to produce a quantized z hyperlatent representation;

(x) decoding the quantized z hyperlatent representation using the hyperdecoder neural network, to obtain a location entropy parameter $\mu_y$, an entropy scale parameter $\sigma_y$, and a context matrix $A_y$ or a y latent representation;

(xi) decoding the second bitstream using the entropy scale parameter $\sigma_y$ in an arithmetic decoder, to output quantised latent residuals;

(xii) processing the quantized latent residuals, the location entropy parameter $\mu_y$ and the context matrix $A_y$, using an (e.g. implicit) (e.g. linear) decoding solver, to obtain a quantized y latent representation;

(xiii) decoding the quantized y latent representation using the decoder neural network, to obtain a reconstructed image;

(xiv) evaluating a loss function based on differences between the reconstructed image and the input training image, and a rate term;

(xv) evaluating a gradient of the loss function;

(xvi) back-propagating the gradient of the loss function through the decoder neural network, through the hyperdecoder neural network, through the hyperencoder neural network and through the encoder neural network, and using the entropy parameters, to update weights of the encoder, decoder, hyperencoder and hyperdecoder neural networks, and to update the entropy parameters; and (xvii) repeating steps (i) to (xvi) using a set of training images, to produce a trained encoder neural network, a trained decoder neural network, a trained hyperencoder neural network and a trained hyperdecoder neural network, and trained entropy parameters; and (xviii) storing the weights of the trained encoder neural network, the trained decoder neural network, the trained hyperencoder neural network and the trained hyperdecoder neural network, and storing the trained entropy parameters.

An advantage is that ground-truth variable (image or latent) can readily be used during the training of the compression algorithms. An advantage is that because the Implicit Encode Solver (IES) also returns the quantized y latent representation, there is no need to run a separate decode solver during training to recover the quantized y latent representation from latent residuals: the quantized y latent representation is already given. An advantage is that the computational cost of using an iterative linear solver in an AI-based compression pipeline can account for a tiny fraction of the total computations in the entire pipeline. An advantage is that encoding time is reduced. An advantage is that decoding time is reduced.

The method may be one wherein in step (iv) the entropy parameter is a location entropy parameter $\mu_z$, and in steps (v), (ix) and (xvi) to (xviii) the entropy parameters are the location entropy parameter $\mu_z$ and an entropy scale parameter $\sigma_z$. An advantage is that faster processing of entropy parameters is provided, and therefore encoding time is reduced. An advantage is that faster processing of entropy parameters is provided, and therefore decoding time is reduced.

The method may be one in which the implicit encoding solver solves the implicit equations (I) the quantized latent residuals equal a quantisation function of the sum of the y latent representation minus $\mu_y$ minus $A_y$ acting on the quantised y latent representation; and (II) the quantised y latent representation equals the quantized latent residuals plus $\mu_y$ plus $A_y$ acting on the quantised y latent representation.

An advantage is that the computational cost of using an iterative linear solver in an AI-based compression pipeline can account for a tiny fraction of the total computations in the entire pipeline. An advantage is that encoding time is reduced.

The method may be one in which the (e.g. implicit) (e.g. linear) decoding solver solves the (e.g. implicit) equation that the quantised y latent representation equals the quantized latent residuals plus $\mu_y$ plus $A_y$ acting on the quantised y latent representation. An advantage is that decoding time is reduced.

The method may be one in which ground-truth variable (image or latent) is used during the training of compression algorithms. An advantage is that encoding time is reduced.

The method may be one wherein the implicit encoding solver solves the implicit equations by defining $B=I-A$, where A is a m×m matrix, and I is the m×m identity matrix, wherein (a) if B is lower triangular, then the serial method forward substitution is used; or (b) if B is upper triangular, then the serial method backward substitution is used; or (c) B is factorised as a triangular decomposition, and then $B^*y=\mu+\xi$, where $\xi$ is the quantized residual, is solved by inverting lower triangular factors with forward substitution, and by inverting upper triangular factors with backward substitution; or (d) B is factorised with a QR decomposition, where Q is an orthonormal matrix and R is an upper triangular matrix, and the solution is $y=R^{-1}Q^t\mu$, where $Q^t$ is Q transpose, or B is factorized using B=QL, where L is a lower triangular matrix, or B=RQ, or B=LQ, where Q is inverted by its transpose, R is inverted with back substitution, and L is inverted with forward substitution, and then respectively, the solution is $y=L^{-1}Q^t\mu$, or $y=Q^tR^{-1}\mu$, or $y=Q^tL^{-1}\mu$; or (e) B=D+L+U, with D a diagonal matrix, and here L is a strictly lower triangular matrix, and U a strictly upper triangular matrix, and then the iterative Jacobi method is applied, until a convergence criterion is met; or (f) the Gauss-Seidel method is used; or (g) the Successive Over Relaxation method is used, or (h) the Conjugate Gradient method is used. An advantage is that the computational cost of using an iterative linear solver in an AI-based compression pipeline can account for a tiny fraction of the total computations in the entire pipeline. An advantage is that encoding time is reduced.

The method may be one wherein the (e.g. implicit) (e.g. linear) decoding solver solves the (e.g. implicit) equations by defining B=I−A, where A is a m×m matrix, and I is the m×m identity matrix, wherein (a) if B is lower triangular, then the serial method forward substitution is used; or (b) if B is upper triangular, then the serial method backward substitution is used; or (c) B is factorised as a triangular decomposition, and then $B*y=\mu+\xi$, where $\xi$ is the quantized residual, is solved by inverting lower triangular factors with forward substitution, and by inverting upper triangular factors with backward substitution; or (d) B is factorised with a QR decomposition, where Q is an orthonormal matrix and R is an upper triangular matrix, and the solution is $y=R^{-1}Q^t\mu$, where $Q^t$ is Q transpose, or B is factorized using B=QL, where L is a lower triangular matrix, or B=RQ, or B=LQ, where Q is inverted by its transpose, R is inverted with back substitution, and L is inverted with forward substitution, and then respectively, the solution is $y=L^{-1}Q^t\mu$, or $y=Q^tR^{-1}\mu$, or $y=Q^tL^{-1}\mu$; or (e) B=D+L+U, with D a diagonal matrix, and here L is a strictly lower triangular matrix, and U a strictly upper triangular matrix, and then the iterative Jacobi method is applied, until a convergence criterion is met; or (f) the Gauss-Seidel method is used; or (g) the Successive Over Relaxation method is used, or (h) the Conjugate Gradient method is used. An advantage is that the computational cost of using an iterative linear solver in an AI-based compression pipeline can account for a tiny fraction of the total computations in the entire pipeline. An advantage is that decoding time is reduced.

The method may be one wherein the quantized y latent representation returned by the solver is used elsewhere in the data compression pipeline, thus removing the need to run a Decode Solver during training, which may massively decrease the time needed to train an AI-based compression algorithm.

The method may be one wherein the implicit encoding solver solves the implicit equations using an iterative solver, in which iteration is terminated when a convergence criterion is met.

The method may be one wherein the implicit encoding solver returns residuals, and a quantized latent representation y.

The method may be one wherein the matrix A is lower triangular, upper triangular, strictly lower triangular, strictly upper triangular, or A has a sparse, banded structure, or A is a block matrix, or A is constructed so that its matrix norm is less than one, or A is parametrised via a matrix factorisation such as a LU or QR decomposition. An advantage is that encoding time is reduced. An advantage is that decoding time is reduced.

The method may be one wherein the (e.g. implicit) (e.g. linear) decoding solver (e.g. any linear equation solver) is not necessarily the same type of solver as (e.g. it is different to) the solver used in encoding.

According to an eighth aspect of the invention, there is provided a computer program product executable on a processor to train an encoder neural network, a decoder neural network, a hyperencoder neural network, and a hyperdecoder neural network, and entropy parameters, the neural networks, and the entropy parameters, being for use in lossy image or video compression, transmission and decoding, the computer program product executable on the processor to:

(i) receive an input training image;
(ii) encode the input training image using the encoder neural network, to produce a y latent representation;
(iii) encode the y latent representation using the hyperencoder neural network, to produce a z hyperlatent representation;
(iv) quantize the z hyperlatent representation using an entropy parameter of the entropy parameters to produce a quantized z hyperlatent representation;
(v) entropy encode the quantized z hyperlatent representation into a first bitstream, using the entropy parameters;
(vi) process the quantized z hyperlatent representation using the hyperdecoder neural network to obtain a location entropy parameter $\mu_y$, an entropy scale parameter $\sigma_y$, and a context matrix $A_y$ of the y latent representation;
(vii) process the y latent representation, the location entropy parameter $\mu_y$ and the context matrix $A_y$, using an implicit encoding solver, to obtain quantized latent residuals;
(viii) entropy encode the quantized latent residuals into a second bitstream, using the entropy scale parameter $\sigma_y$;
(ix) decode the first bitstream using an arithmetic decoder, using the entropy parameters, to produce a quantized z hyperlatent representation;
(x) decode the quantized z hyperlatent representation using the hyperdecoder neural network, to obtain a location entropy parameter $\mu_y$, an entropy scale parameter $\sigma_y$, and a context matrix $A_y$ of a y latent representation;
(xi) decode the second bitstream using the entropy scale parameter $\sigma_y$ in an arithmetic decoder, to output quantised latent residuals;
(xii) process the quantized latent residuals, the location entropy parameter $\mu_y$ and the context matrix $A_y$, using an (e.g. implicit) (e.g. linear) decoding solver, to obtain a quantized y latent representation;
(xiii) decode the quantized y latent representation using the decoder neural network, to obtain a reconstructed image;
(xiv) evaluate a loss function based on differences between the reconstructed image and the input training image, and a rate term;
(xv) evaluate a gradient of the loss function;
(xvi) back-propagate the gradient of the loss function through the decoder neural network, through the hyperdecoder neural network, through the hyperencoder neural network and through the encoder neural network, and use the entropy parameters, to update weights of the encoder, decoder, hyperencoder and hyperdecoder neural networks, and to update the entropy parameters; and
(xvii) repeat (i) to (xvi) using a set of training images, to produce a trained encoder neural network, a trained decoder neural network, a trained hyperencoder neural network and a trained hyperdecoder neural network, and trained entropy parameters; and
(xviii) store the weights of the trained encoder neural network, the trained decoder neural network, the trained hyperencoder neural network and the trained hyperdecoder neural network, and store the trained entropy parameters.

The computer program product may be one executable on the processor to perform a method of any aspect of the seventh aspect of the invention.

According to a ninth aspect of the invention, there is provided a computer-implemented method for lossy or lossless image or video compression and transmission, the method including the steps of:

(i) receiving an input image;

(ii) encoding the input image using an encoder trained neural network, to produce a y latent representation;

(iii) encoding the y latent representation using a hyperencoder trained neural network, to produce a z hyperlatent representation;

(iv) quantizing the z hyperlatent representation using a pre-learned entropy parameter to produce a quantized z hyperlatent representation;

(v) entropy encoding the quantized z hyperlatent representation into a first bitstream, using an arithmetic encoder, using a one dimensional discrete probability mass function dependent on pre-learned entropy parameters including the pre-learned entropy parameter;

(vi) processing the quantized z hyperlatent representation using a hyperdecoder trained neural network to obtain a location entropy parameter $\mu_y$, an entropy scale parameter $\sigma_y$, and a L-context matrix Ly of the y latent representation;

(vii) processing the y latent representation, the location entropy parameter $\mu_y$ and the L-context matrix $L_y$, using an implicit encoding solver, to obtain quantized latent residuals;

(viii) entropy encoding the quantized latent residuals into a second bitstream, using an arithmetic encoder, using a one dimensional discrete probability mass function, and the entropy scale parameter $\sigma_y$; and (ix) transmitting the first bitstream and the second bitstream.

An advantage is that encoding can be done quickly, by solving a simple implicit equation. An advantage is reduced encoding time. An advantage is that parameters of the autoregressive model are conditioned on a quantized hyperlatent representation.

The method may be one wherein in step (iv) the pre-learned entropy parameter is a pre-learned location entropy parameter $\mu_z$, and in step (v) the pre-learned entropy parameters are the pre-learned location entropy parameter $\mu_z$ and a pre-learned entropy scale parameter $\sigma_z$. An advantage is faster processing of the entropy parameters, which reduces encoding time.

The method may be one wherein in step (viii) the one dimensional discrete probability mass function has zero mean.

The method may be one in which the implicit encoding solver solves the implicit equations (I) the quantized latent residuals equal a rounding function of the sum of the y latent representation minus $\mu_y$ minus $L_y$ acting on the quantised y latent representation; and (II) the quantised y latent representation equals the quantized latent residuals plus $\mu_y$ plus $L_y$ acting on the quantised y latent representation.

An advantage is that encoding time is reduced.

The method may be one in which an equation that the quantised y latent representation $\hat{y}$ equals the quantized value of the y latent representation minus a location entropy parameter $\mu$ minus an L context matrix acting on the quantised y latent representation $\hat{y}$, plus the location entropy parameter plus an L context matrix $L_{ij}$ acting on the quantised y latent representation $\hat{y}$, is solved, in which this equation is solved serially, operating on the pixels according to the ordering of their dependencies in the autoregressive model, in which all pixels are iterated through in their autoregressive ordering, and $$\hat{y}_i = \left\lfloor y_i - \mu_i - \sum_{j=i-k}^{i-1} L_{ij}\hat{y}_j \right\rceil + \mu_i + \sum_{j=i-k}^{i-1} L_{ij}\hat{y}_j$$

is applied at each iteration to retrieve the quantised latent at the current iteration. An advantage is that encoding time is reduced.

The method may be one in which an autoregressive structure defined by the sparse context matrix L is exploited to parallelise components of the serial decoding pass; in this approach, first a dependency graph, a Directed Acyclic Graph (DAG), is created defining dependency relations between the latent pixels; this dependency graph is constructed based on the sparsity structure of the L matrix; then, the pixels in the same level of the DAG which are conditionally independent of each other are all calculated in parallel, without impacting the calculations of any other pixels in their level; and the graph is iterated over by starting at the root node, and working through the levels of the DAG, and at each level, all nodes are processed in parallel. An advantage is that encoding time is reduced.

The method may be one wherein a learned L-context module is employed in the entropy model on the quantized latent representation y.

According to a tenth aspect of the invention, there is provided an encoding computer system for lossy or lossless image or video compression and transmission, the encoding computer system including an encoding computer, an encoder trained neural network, a hyperencoder trained neural network and a hyperdecoder trained neural network, wherein:

(i) the encoding computer is configured to receive an input image;

(ii) the encoding computer is configured to encode the input image using the encoder trained neural network, to produce a y latent representation;

(iii) the encoding computer is configured to encode the y latent representation using the hyperencoder trained neural network, to produce a z hyperlatent representation;

(iv) the encoding computer is configured to quantize the z hyperlatent representation using a pre-learned entropy parameter to produce a quantized z hyperlatent representation;

(v) the encoding computer is configured to entropy encode the quantized z hyperlatent representation into a first bitstream, using an arithmetic encoder, using a one dimensional discrete probability mass function dependent on pre-learned entropy parameters including the pre-learned entropy parameter;

(vi) the encoding computer is configured to process the quantized z hyperlatent representation using the hyperdecoder trained neural network to obtain a location entropy parameter $\mu_y$, an entropy scale parameter $\sigma_y$, and a L-context matrix $L_y$ of the y latent representation;

(vii) the encoding computer is configured to process the y latent representation, the location entropy parameter $\mu_y$ and the L-context matrix $L_y$, using an implicit encoding solver, to obtain quantized latent residuals;

(viii) the encoding computer is configured to entropy encode the quantized latent residuals into a second bitstream, using an arithmetic encoder, using a one dimensional discrete probability mass function, and the entropy scale parameter $\sigma_y$; and (ix) the encoding computer is configured to transmit the first bitstream and the second bitstream.

The system may be configured to perform a method of any aspect of the ninth aspect of the invention.

According to an eleventh aspect of the invention, there is provided a computer-implemented method for lossy or lossless image or video decoding, the method including the steps of:

(i) receiving a first bitstream and a second bitstream;

(ii) decoding the first bitstream using an arithmetic decoder, using a one dimensional discrete probability mass function dependent on pre-learned location entropy parameters, to produce a quantized z hyperlatent representation;

(iii) decoding the quantized 7 hyperlatent representation using a hyperdecoder trained neural network, to obtain a location entropy parameter $\mu_y$, an entropy scale parameter $\sigma_y$, and a L-context matrix $L_y$ of a y latent representation;

(iv) decoding the second bitstream using an arithmetic decoder, the one dimensional discrete probability mass function, and the entropy scale parameter $\sigma_y$, to output quantised latent residuals;

(v) processing the quantized latent residuals, the location entropy parameter $\mu_y$ and the L-context matrix $L_y$, using an (e.g. implicit) (e.g. linear) decoding solver, to obtain a quantized y latent representation;

(vi) decoding the quantized y latent representation using a decoder trained neural network, to obtain a reconstructed image.

An advantage is that the decoding pass of the L-context modelling step is not a serial procedure, and can be run in parallel, which reduces decoding time. An advantage is reduced decoding time. An advantage is that parameters of the autoregressive model are conditioned on a quantized hyperlatent representation.

The method may be one wherein in step (ii) the pre-learned entropy parameters are a pre-learned location entropy parameter $\mu_z$ and a pre-learned entropy scale parameter $\sigma_z$. An advantage is faster processing of the entropy parameters, which reduces encoding time.

The method may be one wherein in step (iv) the one dimensional discrete probability mass function has zero mean.

The method may be one including the step of (vii) storing the reconstructed image.

The method may be one in which the (e.g. implicit) (e.g. linear) decoding solver solves the (e.g. implicit) equation that the quantised y latent representation equals the quantized latent residuals plus $\mu_y$ plus $L_y$ acting on the quantised y latent representation. An advantage is that decoding time is reduced.

The method may be one in which the equation system is lower triangular, and standard forward substitution is used to solve the (e.g. implicit) equation. An advantage is that decoding time is reduced.

The method may be one in which an autoregressive structure defined by the sparse context matrix L is exploited to parallelise components of the serial decoding pass; in this approach, first a dependency graph, a Directed Acyclic Graph (DAG), is created modelling dependency relations between the latent pixels; this dependency graph is constructed based on the sparsity structure of the L matrix; then, the quantized y latents are recovered from the quantized residuals by iterating through the layers of the DAG and processing all pixels of the level in parallel, using the linear decode equations. An advantage is that decoding time is reduced.

The method may be one wherein the decoding pass of the L-context modelling step is not a serial procedure, and can be run in parallel. An advantage is that decoding time is reduced.

The method may be one wherein because recovering the quantized residuals from the second bitstream is not autoregressive, this process is extremely fast. An advantage is that decoding time is reduced.

The method may be one in which an L-context module is employed, if an L-context module was used in encode. An advantage is that decoding time is reduced.

According to a twelfth aspect of the invention, there is provided a decoding computer system for lossy or lossless image or video decoding, the decoding computer system including a decoding computer, a decoder trained neural network, and a hyperdecoder trained neural network, wherein:

(i) the decoding computer is configured to receive a first bitstream and a second bitstream;

(ii) the decoding computer is configured to decode the first bitstream using an arithmetic decoder, using a one dimensional discrete probability mass function dependent on pre-learned location entropy parameters, to produce a quantized z hyperlatent representation;

(iii) the decoding computer is configured to decode the quantized z hyperlatent representation using the hyperdecoder trained neural network, to obtain a location entropy parameter $\mu_y$, an entropy scale parameter $\sigma_y$, and a L-context matrix $L_y$ of a y latent representation;

(iv) the decoding computer is configured to decode the second bitstream using an arithmetic decoder, the one dimensional discrete probability mass function, and the entropy scale parameter $\sigma_y$, to output quantised latent residuals;

(v) the decoding computer is configured to process the quantized latent residuals, the location entropy parameter $\mu_y$ and the L-context matrix $L_y$, using an (e.g. implicit) (e.g. linear) decoding solver, to obtain a quantized y latent representation;

(vi) the decoding computer is configured to decode the quantized y latent representation using a decoder trained neural network, to obtain a reconstructed image.

The system may be configured to perform a method of any aspect according to the eleventh aspect of the invention.

According to a thirteenth aspect of the invention, there is provided a computer-implemented method for lossy or lossless image or video compression and transmission, and for lossy or lossless image or video decoding, the method including a method of any aspect of the ninth aspect of the invention, and a method of any aspect of the eleventh aspect of the invention. An advantage is that encoding can be done quickly, by solving a simple implicit equation. An advantage is reduced encoding time. An advantage is that parameters of the autoregressive model are conditioned on a quantized hyperlatent representation. An advantage is that the decoding pass of the L-context modelling step is not a serial procedure, and can be run in parallel, which reduces decoding time. An advantage is reduced decoding time.

According to a fourteenth aspect of the invention, there is provided a system for lossy or lossless image or video compression and transmission, and for lossy or lossless image or video decoding, the system including a system of any aspect of the tenth aspect of the invention, and a system of any aspect of the twelfth aspect of the invention.

According to a fifteenth aspect of the invention, there is provided a computer implemented method of training an encoder neural network, a decoder neural network, a hyperencoder neural network, and a hyperdecoder neural network, and entropy parameters, the neural networks and the entropy parameters being for use in lossy image or video compression, transmission and decoding, the method including the steps of:

(i) receiving an input training image;
(ii) encoding the input training image using the encoder neural network, to produce a y latent representation;
(iii) encoding the y latent representation using the hyperencoder neural network, to produce a z hyperlatent representation;
(iv) quantizing the z hyperlatent representation using an entropy parameter of the entropy parameters to produce a quantized z hyperlatent representation;
(v) entropy encoding the quantized z hyperlatent representation into a first bitstream, using an arithmetic encoder, using a one dimensional discrete probability mass function dependent on the entropy parameters;
(vi) processing the quantized z hyperlatent representation using the hyperdecoder neural network to obtain a location entropy parameter $\mu_y$, an entropy scale parameter $\sigma_y$, and a L-context matrix $L_y$ of they latent representation;
(vii) processing the y latent representation, the location entropy parameter $\mu_y$ and the L-context context matrix $L_y$, using an implicit encoding solver, to obtain quantized latent residuals;
(viii) entropy encoding the quantized latent residuals into a second bitstream, using an arithmetic encoder, using a one dimensional discrete probability mass function, and the entropy scale parameter $\sigma_y$; and
(ix) decoding the first bitstream using an arithmetic decoder, using the one dimensional discrete probability mass function dependent on the entropy parameters, to produce a quantized z hyperlatent representation;
(x) decoding the quantized z hyperlatent representation using the hyperdecoder neural network, to obtain a location entropy parameter $\mu_y$, an entropy scale parameter $\sigma_y$, and a L-context matrix $L_y$ of a y latent representation;
(xi) decoding the second bitstream using an arithmetic decoder, the one dimensional discrete probability mass function, and the entropy scale parameter $\sigma_y$, to output quantised latent residuals;
(xii) processing the quantized latent residuals, the location entropy parameter $\mu_y$ and the L-context matrix $L_y$, using an (e.g. implicit) (e.g. linear) decoding solver, to obtain a quantized y latent representation;
(xiii) decoding the quantized y latent representation using the decoder neural network, to obtain a reconstructed image;
(xiv) evaluating a loss function based on differences between the reconstructed image and the input training image, and a rate term;
(xv) evaluating a gradient of the loss function;
(xvi) back-propagating the gradient of the loss function through the decoder neural network, through the hyperdecoder neural network, through the hyperencoder neural network and through the encoder neural network, and using the entropy parameters, to update weights of the encoder, decoder, hyperencoder and hyperdecoder neural networks, and to update the entropy parameters; and
(xvii) repeating steps (i) to (xvi) using a set of training images, to produce a trained encoder neural network, a trained decoder neural network, a trained hyperencoder neural network and a trained hyperdecoder neural network, and trained entropy parameters; and
(xviii) storing the weights of the trained encoder neural network, the trained decoder neural network, the trained hyperencoder neural network and the trained hyperdecoder neural network, and storing the trained entropy parameters.

An advantage is that encoding can be done quickly, by solving a simple implicit equation. An advantage is reduced encoding time. An advantage is that parameters of the autoregressive model are conditioned on a quantized hyperlatent representation. An advantage is that the decoding pass of the L-context modelling step is not a serial procedure, and can be run in parallel, which reduces decoding time. An advantage is reduced decoding time.

The method may be one wherein in step (iv) the entropy parameter is a location entropy parameter $\mu_z$, and in steps (v), (ix) and (xvi) to (xviii) the entropy parameters are the location entropy parameter $\mu_z$ and an entropy scale parameter $\sigma_z$. An advantage is that faster processing of entropy parameters is provided, and therefore encoding time is reduced. An advantage is that faster processing of entropy parameters is provided, and therefore decoding time is reduced.

The method may be one wherein in steps (viii) and (xi) the one dimensional discrete probability mass function has zero mean.

The method may be one in which the implicit encoding solver solves the implicit equations (I) the quantized latent residuals equal a rounding function of the sum of the y latent representation minus $\mu_y$ minus $L_y$ acting on the quantised y latent representation; and
(II) the quantised y latent representation equals the quantized latent residuals plus $\mu_y$ plus $L_y$ acting on the quantised y latent representation. An advantage is that encoding time is reduced.

The method may be one in which the (e.g. implicit) (e.g. linear) decoding solver solves the (e.g. implicit) equation that the quantised y latent representation equals the quantized latent residuals plus $\mu_y$ plus $L_y$ acting on the quantised y latent representation. An advantage is that decoding time is reduced.

The method may be one in which an equation that the quantised y latent representation $\hat{y}$ equals the quantized value of the y latent representation minus a location entropy parameter $\mu$ minus an L context matrix acting on the quantised y latent representation $\hat{y}$, plus the location entropy parameter $\mu$, plus an L context matrix $L_{ij}$ acting on the quantised y latent representation $\hat{y}$, is solved, in which this equation is solved serially, operating on the pixels according to the ordering of their dependencies in the autoregressive model, in which all pixels are iterated through in their autoregressive ordering, and $$\hat{y}_i = \left\lfloor y_i - \mu_i - \sum_{j=i-k}^{i-1} L_{ij}\hat{y}_j \right\rceil + \mu_i + \sum_{j=i-k}^{i-1} L_{ij}\hat{y}_j$$

is applied at each iteration to retrieve the quantised latent at the current iteration. An advantage is that encoding time is reduced.

The method may be one in which an autoregressive structure defined by the sparse context matrix L is exploited to parallelise components of the serial decoding pass; in this approach, first a dependency graph, a Directed Acyclic Graph, is created defining dependency relations between the latent pixels; this dependency graph is constructed based on the sparsity structure of the L matrix; then, the pixels in the same level of the DAG which are conditionally independent of each other are all calculated in parallel, without impacting the calculations of any other pixels in their level; and the graph is iterated over by starting at the root node, and working through the levels of the DAG, and at each level, all nodes are processed in parallel. An advantage is that encoding time is reduced. An advantage is that decoding time is reduced.

According to a sixteenth aspect of the invention, there is provided a computer program product executable on a processor to train an encoder neural network, a decoder neural network, a hyperencoder neural network, and a hyperdecoder neural network, and entropy parameters, the neural networks, and the entropy parameters, being for use in lossy image or video compression, transmission and decoding, the computer program product executable on the processor to:

(i) receive an input training image;

(ii) encode the input training image using the encoder neural network, to produce a y latent representation;

(iii) encode the y latent representation using the hyperencoder neural network, to produce a z hyperlatent representation;

(iv) quantize the z hyperlatent representation using an entropy parameter of the entropy parameters to produce a quantized z hyperlatent representation;

(v) entropy encode the quantized z hyperlatent representation into a first bitstream, using an arithmetic encoder, using a one dimensional discrete probability mass function dependent on the entropy parameters;

(vi) process the quantized z hyperlatent representation using the hyperdecoder neural network to obtain a location entropy parameter $\mu_y$, an entropy scale parameter $\sigma_y$, and a L-context matrix $L_y$ of the y latent representation;

(vii) process the y latent representation, the location entropy parameter $\mu_y$ and the L-context context matrix $L_y$, using an implicit encoding solver, to obtain quantized latent residuals;

(viii) entropy encode the quantized latent residuals into a second bitstream, using an arithmetic encoder, using a one dimensional discrete probability mass function, and the entropy scale parameter $\sigma_y$; and (ix) decode the first bitstream using an arithmetic decoder, using the one dimensional discrete probability mass function dependent on the entropy parameters, to produce a quantized z hyperlatent representation;

(x) decode the quantized z hyperlatent representation using the hyperdecoder neural network, to obtain a location entropy parameter $\mu_y$, an entropy scale parameter $\sigma_y$, and a L-context matrix $L_y$ of a y latent representation;

(xi) decode the second bitstream using an arithmetic decoder, the one dimensional discrete probability mass function, and the entropy scale parameter $\sigma_y$, to output quantised latent residuals;

(xii) process the quantized latent residuals, the location entropy parameter $\mu_y$ and the L-context matrix $L_y$, using an (e.g. implicit) (e.g. linear) decoding solver, to obtain a quantized y latent representation;

(xiii) decode the quantized y latent representation using the decoder neural network, to obtain a reconstructed image;

(xiv) evaluate a loss function based on differences between the reconstructed image and the input training image, and a rate term;

(xv) evaluate a gradient of the loss function;

(xvi) back-propagate the gradient of the loss function through the decoder neural network, through the hyperdecoder neural network, through the hyperencoder neural network and through the encoder neural network, and to use the entropy parameters, to update weights of the encoder, decoder, hyperencoder and hyperdecoder neural networks, and to update the entropy parameters; and (xvii) repeat (i) to (xvi) using a set of training images, to produce a trained encoder neural network, a trained decoder neural network, a trained hyperencoder neural network and a trained hyperdecoder neural network, and trained entropy parameters; and (xviii) store the weights of the trained encoder neural network, the trained decoder neural network, the trained hyperencoder neural network and the trained hyperdecoder neural network, and storing the trained entropy parameters.

The computer program product may be executable on the processor to perform a method of any aspect of the fifteenth aspect of the invention.

According to a seventeenth aspect of the invention, there is provided a computer implemented method of training a total neural network including a neural network which modifies encoder-decoder performance, the total neural network parameterized by parameters θ and including encoder and decoder neural networks for use in lossy image or video compression, transmission and decoding, the method including the steps of:

(i) receiving an input training image x;

(ii) encoding the input training image using the encoder neural network, to produce a latent representation;

(iii) quantizing the latent representation to produce a quantized latent $\hat{y}$;

(iv) using the decoder neural network to produce an output image $\hat{x}$ from the quantized latent, wherein the output image is an approximation of the input image;

(v) evaluating a Lagrangian loss function including a Lagrange multiplier λ, based on evaluation of a distortion function of differences between the output image and the input training image, and based on differences between a compression rate function of the quantized latent $R(\hat{y})$ and a target compression rate $r_0$;

(vi) calculating total neural network parameter gradients using backpropagation of the evaluated Lagrangian loss function;

(vii) updating the total network parameters θ by performing a descent step of the Lagrangian loss function with respect to the total network parameters θ based on the total neural network parameter gradients evaluated in step (vi);

(viii) updating the Lagrange multiplier by performing an ascent step of the Lagrangian loss function with respect to the Lagrange multiplier;

(ix) repeating steps (i) to (viii) using a set of training images, to produce a trained set of parameters θ, and optionally a target compression rate $r_0$; and (x) storing the trained set of parameters θ.

An advantage is that given a target compression rate, distortion is minimized, subject to the constraint that the average model compression rate be equal to the target compression rate. An advantage is this allows to minimize the image distortion, for a given target compression rate. An advantage is to reliably train deep neural networks for specified rate targets, averaged across a test set. Advantages include: reliable constraint enforcement, stability.

According to an 18th aspect of the invention, there is provided a computer implemented method of training a total neural network including a neural network which modifies encoder-decoder performance, the total neural network parameterized by parameters θ and including encoder and decoder neural networks for use in lossy image or video compression, transmission and decoding, the method including the steps of:

(i) receiving an input training image x;

(ii) encoding the input training image using the encoder neural network, to produce a latent representation;

(iii) quantizing the latent representation to produce a quantized latent ŷ;

(iv) using the decoder neural network to produce an output image x̂ from the quantized latent, wherein the output image is an approximation of the input image;

(v) evaluating an augmented Lagrangian loss function including a Lagrange multiplier λ, based on evaluation of a distortion function of differences between the output image and the input training image, and based on differences between a compression rate function of the quantized latent $R(\hat{y})$ and a target compression rate $r_0$;

(vi) calculating total neural network parameter gradients using backpropagation of the evaluated augmented Lagrangian loss function;

(vii) updating the total network parameters θ by performing an optimizer step in which a SGD or SGD-like optimizer optimizes the total network parameters θ based on a learning rate for the network parameters optimizer and the total neural network parameter gradients evaluated in step (vi);

(viii) evaluating gradients for the Lagrange multiplier by evaluating an augmented Lagrangian loss function quadratic term weight μ multiplied by a difference between the compression rate function of the quantized latent and the target compression rate;

(ix) updating the Lagrange multiplier by performing an optimizer step in which a SGD or SGD-like optimizer optimizes the Lagrange multiplier based on a learning rate for the Lagrange multiplier optimizer;

(x) repeating steps (i) to (ix) using a set of training images, to produce a trained set of parameters θ, and (xi) storing the trained set of parameters θ.

An advantage is this allows to minimize the image distortion, for a fixed rate. An advantage is to reliably train deep neural networks for specified rate targets, averaged across a test set. Advantages include: reliable constraint enforcement, stability, robust to variations in hyperparameters, recover original rate-distortion objective as the loss is minimised.

The method may be one including the step of clipping the gradients for the Lagrange multiplier evaluated in step (viii), and including updating the Lagrange multiplier by performing the optimizer step in which the SGD or SGD-like optimizer optimizes the Lagrange multiplier based on the learning rate for the Lagrange multiplier optimizer and the clipped gradients for the Lagrange multiplier.

The method may be one wherein the trained set of parameters θ is a converged set of parameters θ.

The method may be one wherein the augmented Lagrangian loss function is $D(x,\hat{x})+\lambda(R(\hat{y})-r_0)+\mu(R(\hat{y})-r_0)^2/2$, where D is a function measuring distortion of data reconstruction.

The method may be one wherein step (x) includes modifying the Lagrange multiplier by the learning rate for the Lagrange multiplier optimizer times the loss function quadratic term weight multiplied by a difference between the compression rate function of the quantized latent and the target compression rate. An advantage is that the multiplier converges in a reasonable amount of time.

The method may be one wherein decoupling the learning rate for the Lagrange multiplier from the loss function quadratic term weight through the introduction of the factor of the learning rate for the Lagrange multiplier optimizer means that the loss function quadratic term weight can be kept small, while the multiplier converges in a reasonable amount of time. An advantage is that the multiplier converges in a reasonable amount of time.

The method may be one wherein the SGD-like optimizer optimizing the Lagrange multiplier is an Adam optimizer. Advantages are increased stability, adaptability, and being significantly more robust to variations in architectures, rate targets, and choices of hyperparameters.

The method may be one in which the quantized latent compression rate is calculated using a training quantisation function in the forward pass steps (iii) and (iv), and in the backward pass steps (v) to (viii) (i.e. in gradient computation) when updating the total neural network parameters θ, but the quantized latent compression rate is calculated using an inference quantisation function when performing updates to the Augmented Lagrangian Method's Lagrange multiplier steps (viii), and (ix). An advantage is that converging to a target rate on a training set of images reasonably guarantees that we will have the same constraint satisfied on a test set of images.

The method may be one in which the quantized latent is calculated using an inference quantisation function in the forward pass steps (iii) and (iv), and in the backward pass steps (v) to (viii) (i.e. in gradient computation) the quantized latent is calculated using a training quantisation function. An advantage is that converging to a target rale on a training set of images reasonably guarantees that we will have the same constraint satisfied on a test set of images.

The method may be one wherein the set of training images used is a set of training images used to train the encoder and the decoder, modified so as to be compressed to the target compression rate; the distortion function in step (v) is reduced by a scale factor s (e.g. approximately two, initially); during training, a running average of scaled distortion is updated; at predefined iterations of training, the scale factor s is adjusted in proportion to (e.g. two times) the running average, and the Lagrange multiplier is modified by a factor in inverse proportion to the adjustment to the scale factor. An advantage is that the method ensures the loss function is roughly of the same scale, no matter the target rate.

The method may be one in which the running average is one of: arithmetic mean, median, geometric mean, harmonic mean, exponential moving average, smoothed moving average, linear weighted moving average. An advantage is that the method ensures the loss function is roughly of the same scale, no matter the target rate.

The method may be one wherein the quantized latent is represented using a probability distribution of the latent space, the probability distribution including a location parameter and a scale parameter a, wherein a is reduced as the computer implemented method of training proceeds. e.g. using a decaying scale threshold. An advantage is this causes neural network training to avoid bad local minima, resulting in improved overall image encoding and decoding performance, i.e. reduced reconstructed image distortion, for a fixed rate.

The method may be one in which the probability distribution is Gaussian or Laplacian.

The method may be one wherein a is reduced as the computer implemented method of training proceeds, until a reaches a final value.

The method may be one wherein $\sigma$ is reduced as the computer implemented method of training proceeds, using a progressively decreasing thresholding value t. An advantage is this causes neural network training to avoid bad local minima, resulting in improved overall image encoding and decoding performance, i.e. reduced reconstructed image distortion, for a fixed rate.

The method may be one wherein $\sigma$ is reduced as the computer implemented method of training proceeds, decaying t linearly with respect to the number of training iterations.

The method may be one wherein $\sigma$ is reduced as the computer implemented method of training proceeds, decaying t exponentially with respect to the number of training iterations.

The method may be one wherein $\sigma$ is reduced as the computer implemented method of training proceeds, decaying t with respect to the loss metric.

The method may be one wherein the quantized latent is represented using a probability distribution of the latent space, the probability distribution including a location parameter and a scale parameter $\sigma$, wherein all realisations of $\sigma$ are thresholded to a fixed value.

The method may be one wherein all realisations of$\sigma$ are mapped with functions of a strictly positive codomain, for a defined domain, such as the softplus operation, or the squaring operation with thresholding, or the absolute value operation with thresholding.

According to a 19th aspect of the invention, there is provided a computer program product executable on a processor to train a total neural network including a neural network which modifies encoder-decoder performance, the total neural network parameterized by parameters $\sigma$ and including encoder and decoder neural networks for use in lossy image or video compression, transmission and decoding, the computer program product executable on the processor to:

(i) receive an input training image x;

(ii) encode the input training image using the encoder neural network, to produce a latent representation;

(iii) quantize the latent representation to produce a quantized latent $\hat{y}$;

(iv) use the decoder neural network to produce an output image $\hat{x}$ from the quantized latent, wherein the output image is an approximation of the input image;

(v) evaluate a Lagrangian loss function including a Lagrange multiplier $\lambda$, based on evaluation of a distortion function of differences between the output image and the input training image, and based on differences between a compression rate function of the quantized latent $R(\hat{y})$ and a target compression rate $r_0$;

(vi) calculate total neural network parameter gradients using backpropagation of the evaluated Lagrangian loss function;

(vii) update the total network parameters $\theta$ by performing a descent step of the Lagrangian loss function with respect to the total network parameters $\theta$ based on the total neural network parameter gradients evaluated in (vi);

(viii) update the Lagrange multiplier by performing an ascent step of the Lagrangian loss function with respect to the Lagrange multiplier;

(ix) repeat (i) to (viii) using a set of training images, to produce a trained set of parameters $\theta$, and optionally a target compression rate $r_0$; and (x) store the trained set of parameters $\theta$.

The computer program product may be executable on the processor to perform a method of any aspect of the 17th aspect of the invention.

According to a 20th aspect of the invention, there is provided a computer program product executable on a processor to train a total neural network including a neural network which modifies encoder-decoder performance, the total neural network parameterized by parameters $\theta$ and including encoder and decoder neural networks for use in lossy image or video compression, transmission and decoding, the computer program product executable on the processor to:

(i) receive an input training image x;

(ii) encode the input training image using the encoder neural network, to produce a latent representation;

(iii) quantize the latent representation to produce a quantized latent $\hat{y}$;

(iv) use the decoder neural network to produce an output image $\hat{x}$ from the quantized latent, wherein the output image is an approximation of the input image;

(v) evaluate an augmented Lagrangian loss function including a Lagrange multiplier $\lambda$, based on evaluation of a distortion function of differences between the output image and the input training image, and based on differences between a compression rate function of the quantized latent $R(\hat{y})$ and a target compression rate $r_0$;

(vi) calculate total neural network parameter gradients using backpropagation of the evaluated augmented Lagrangian loss function;

(vii) update the total network parameters $\theta$ by performing an optimizer step in which a SGD or SGD-like optimizer optimizes the total network parameters $\theta$ based on a learning rate for the network parameters optimizer and the total neural network parameter gradients evaluated in (vi);

(viii) evaluate gradients for the Lagrange multiplier by evaluating an augmented Lagrangian loss function quadratic term weight $\mu$ multiplied by a difference between the compression rate function of the quantized latent and the target compression rate;

(ix) update the Lagrange multiplier by performing an optimizer step in which a SGD or SGD-like optimizer optimizes the Lagrange multiplier based on a learning rate for the Lagrange multiplier optimizer;

(x) repeat (i) to (ix) using a set of training images, to produce a trained set of parameters $\theta$, and (xi) store the trained set of parameters $\theta$.

The computer program product may be executable on the processor to perform a method of any aspect of the 18th aspect of the invention.

According to a 21st aspect of the invention, there is provided a computer implemented method of training an encoder neural network to reduce encoder distortions, the encoder neural network parameterized by parameters $\theta$, the encoder being a neural network for use in lossy image or video compression, the method including the steps of:

(i) receiving an input training image x;

(ii) encoding the input training image using the encoder neural network, to produce an image reconstruction y;

(iii) passing the input training image x through a feature embedding network that has been pre-trained on a training set of images to produce output $\tilde{x}$ containing features;

(iv) passing the image reconstruction y through the feature embedding network to produce output $\tilde{y}$ containing features;

(v) partitioning the output $\tilde{x}$ into a set of N equally sized feature vectors $\tilde{X}=\{\tilde{x}_i\}$;

(vi) partitioning the output $\tilde{y}$ into a set of N equally sized feature vectors $\tilde{Y}=\{\{\tilde{y}_i\}$;

(vii) for each pair of feature vectors $\tilde{x}_i$ and $\tilde{y}_j$, evaluating a distance element $\tilde{d}_{i,j}$, for example a cosine distance;

(viii) for each distance element $d_{i,j}$, calculating a normalised distance element $d_{i,j}$, for example $d_{i,j}/(\min_k d_{i,k}+\varepsilon)$, where $\varepsilon$ is a small positive constant;

(ix) for each normalised distance element $\tilde{d}_{i,j}$, calculating a similarity element $w_{i,j}$ which is an exponentially decreasing function of $\tilde{d}_{i,j}$, for example $\exp((1-\tilde{d}_{i,j})/h)$, where h is positive and is a bandwidth parameter;

(x) for each similarity element $w_{i,j}$, calculating $c_{i,j}$ which is $w_{i,j}/(\Sigma_k w_{i,k})$;

(xi) calculating a context loss;

(xii) evaluating a loss function, which is the sum of the context loss and an additional loss for the generator, which is a function of x and y;

(xiii) backpropagating the loss function;

(xiv) optimizing the encoder neural network parameterized by the parameters $\theta$;

(xv) repeating steps (i) to (xiv) using a set of training images, to produce a trained set of parameters $\theta$, and (xvi) storing the trained set of parameters $\theta$.

An advantage is strongly improved human-perceived visual quality of reconstructed images which have been encoded by the encoder neural network.

The method may be one wherein the context loss is minus $C(\tilde{X}, \tilde{Y})$, where $C(\tilde{X}, \tilde{Y})$ equals $(\Sigma_j \max_i c_{i,j})$ divided by N. An advantage is strongly improved human-perceived visual quality of reconstructed images which have been encoded by the encoder neural network.

The method may be one wherein the context loss is a weighted average of minus $C(\tilde{X}, \tilde{Y})$ and minus $C(\tilde{Y}, \tilde{X})$, where $C(\tilde{X}, \tilde{Y})$ equals $(\Sigma_j \max_i c_{i,j})$ divided by N. An advantage is strongly improved human-perceived visual quality of reconstructed images which have been encoded by the encoder neural network.

The method may be one wherein the context loss is an arithmetic average of minus $C(\tilde{X}, \tilde{Y})$ and minus $C(\tilde{Y}, \tilde{X})$, where $C(\tilde{X}, \tilde{Y})$ equals $(\Sigma_j \max_i c_{i,j})$ divided by N. An advantage is strongly improved human-perceived visual quality of reconstructed images which have been encoded by the encoder neural network.

The method may be one in which the context loss further includes Deep Render's adversarial Video Multimethod Assessment Fusion (VMAF) proxy, or a Learned Perceptual Image Patch Similarity (LPIPS) or a generative adversarial loss. An advantage is strongly improved human-perceived visual quality of reconstructed images which have been encoded by the encoder neural network.

The method may be one in which this approach leads to strongly improved perceived visual quality of the reconstructed images, as perceived using the human visual system.

The method may be one in which statistical distances between representations of the images in some latent feature space are used. An advantage is strongly improved human-perceived visual quality of reconstructed images which have been encoded by the encoder neural network.

According to a 22nd aspect of the invention, there is provided a computer program product executable on a processor to train an encoder neural network to reduce encoder distortions, the encoder neural network parameterized by parameters $\theta$, the encoder being a neural network for use in lossy image or video compression, the computer program product executable on the processor to:

(i) receive an input training image x;

(ii) encode the input training image using the encoder neural network, to produce an image reconstruction y;

(iii) pass the input training image x through a feature embedding network that has been pre-trained on a training set of images to produce output $\tilde{x}$ containing features;

(iv) pass the image reconstruction y through the feature embedding network to produce output $\tilde{y}$ containing features;

(v) partition the output $\tilde{x}$ into a set of N equally sized feature vectors $\tilde{X}=\{\tilde{x}_i\}$;

(vi) partition the output $\tilde{y}$ into a set of N equally sized feature vectors $\tilde{Y}=\{\{\tilde{y}_i\}$;

(vii) for each pair of feature vectors $\tilde{x}_i$ and $\tilde{y}_j$, evaluate a distance element $d_{i,j}$, for example a cosine distance;

(viii) for each distance element $d_{i,j}$, calculate a normalised distance element $d_{i,j}$, for example $d_{i,j}/(\min_k d_{i,k}+\varepsilon)$, where $\varepsilon$ is a small positive constant;

(ix) for each normalised distance element $\tilde{d}_{i,j}$, calculate a similarity element $w_{i,j}$ which is an exponentially decreasing function of $\tilde{d}_{i,j}$ for example $\exp((1-\tilde{d}_{i,j}/h)$, where h is positive and is a bandwidth parameter;

(x) for each similarity element $w_{i,j}$, calculate $c_{i,j}$ which is $w_{i,j}/(\Sigma_k w_{i,k})$;

(xi) calculate a context loss;

(xii) evaluate a loss function, which is the sum of the context loss and an additional loss for the generator, which is a function of x and y;

(xiii) backpropagate the loss function;

(xiv) optimize the encoder neural network parameterized by the parameters $\theta$;

(xv) repeat (i) to (xiv) using a set of training images, to produce a trained set of parameters $\theta$, and (xvi) store the trained set of parameters $\theta$.

The computer program product may be executable on the processor to perform a method of any aspect of the 21st aspect of the invention.

According to a 23rd aspect of the invention, there is provided a computer implemented method of training an encoder neural network to reduce encoder distortions, the encoder neural network parameterized by parameters $\theta$, the encoder being a neural network for use in lossy image or video compression, the method including the steps of:

(i) receiving an input training image x;

(ii) encoding the input training image using the encoder neural network, to produce an image reconstruction y;

(iii) passing the input training image x through a feature embedding network that has been pre-trained on a training set of images to produce output z containing features;

(iv) passing the image reconstruction y through the feature embedding network to produce output $\tilde{y}$ containing features;

(v) executing a function on $\tilde{y}$ to ensure no gradients are tracked for the later executed functions, yielding output $\tilde{y}_{nograd}$;

(vi) passing the output $\tilde{x}$ through a discriminator network to provide the probability value $p_{discr,pred}$;

(vii) passing the output $\tilde{y}_{nograd}$ through the discriminator network to provide the probability value $p_{discr,pred}$;

(viii) obtaining a discriminator loss which is the sum of a classification loss of the discriminator network for real images acting on $p_{discr,real}$ and a classification loss of the discriminator network for predicted images acting on $p_{discr,pred}$;

(ix) backpropagating the discriminator loss;

(x) optimizing the discriminator network;

(xi) passing the output $\tilde{y}$ through the discriminator network to provide the probability value $p_{gen,pred}$;

(xii) obtaining an adversarial loss which is a classification loss of the encoder for predicted images acting on $p_{gen,pred}$;

(xiii) obtaining a loss function which is the sum of the adversarial loss and an additional loss for the encoder which is a function of x and y;

(xiv) backpropagating the loss from step (xiii);

(xv) optimizing the encoder neural network parameterized by the parameters θ;

(xvi) repeating steps (i) to (xv) using a set of training images, to produce a trained set of parameters θ, and (xvii) storing the trained set of parameters θ.

An advantage is strongly improved human-perceived visual quality of reconstructed images which have been encoded by the encoder neural network.

The method may be one wherein the discriminator network comprises an architecture which accepts one input tensor.

The method may be one wherein the discriminator network is a discriminator network as shown in FIG. 12.

The method may be one wherein the discriminator network comprises a convolutional neural network (CNN) architecture which consists of a plurality of sub-networks, each using tensor concatenation along a channel dimension.

The method may be one wherein the discriminator network is a discriminator network as shown in FIG. 13.

The method may be one wherein the discriminator network comprises an architecture in which a separate discriminator is assigned to every feature, wherein an overall discriminator is defined as a function of probabilities of all individual discriminators.

The method may be one wherein the discriminator network is a discriminator network as shown in FIG. 14.

The method may be one in which the loss function further includes Deep Render's adversarial Video Multimethod Assessment Fusion (VMAF) proxy, or a Learned Perceptual Image Patch Similarity (LPIPS) or a generative adversarial loss.

According to a 24th aspect of the invention, there is provided a computer program product executable on a processor to train an encoder neural network to reduce encoder distortions, the encoder neural network parameterized by parameters θ, the encoder being a neural network for use in lossy image or video compression, the computer program product executable on the processor to:

(i) receive an input training image x;

(ii) encode the input training image using the encoder neural network, to produce an image reconstruction y;

(iii) pass the input training image x through a feature embedding network that has been pre-trained on a training set of images to produce output $\tilde{x}$ containing features;

(iv) pass the image reconstruction y through the feature embedding network to produce output $\tilde{y}$ containing features;

(v) execute a function on $\tilde{y}$ to ensure no gradients are tracked for the later executed functions, yielding output $\tilde{y}_{nograd}$;

(vi) pass the output $\tilde{x}$ through a discriminator network to provide the probability value $p_{discr,real}$;

(vii) pass the output $\tilde{y}_{nograd}$ through the discriminator network to provide the probability value $p_{discr,pred}$;

(viii) obtain a discriminator loss which is the sum of a classification loss of the discriminator network for real images acting on $p_{discr,real}$ and a classification loss of the discriminator network for predicted images acting on $p_{discr,pred}$;

(ix) backpropagate the discriminator loss;

(x) optimize the discriminator network;

(xi) pass the output $\tilde{y}$ through the discriminator network to provide the probability value $p_{gen,pred}$;

(xii) obtain an adversarial loss which is a classification loss of the encoder for predicted images acting on $p_{gen,pred}$;

(xiii) obtain a loss function which is the sum of the adversarial loss and an additional loss for the encoder which is a function of x and y;

(xiv) backpropagate the loss from (xiii);

(xv) optimize the encoder neural network parameterized by the parameters θ;

(xvi) repeating (i) to (xv) using a set of training images, to produce a trained set of parameters θ, and (xvii) store the trained set of parameters θ.

The computer program product may be executable on the processor to perform a method of any aspect of the 23rd aspect of the invention.

Aspects of the invention may be combined.

In the above methods and systems, an image may be a single image, or an image may be a video image, or images may be a set of video images, for example.

The above methods and systems may be applied in the video domain.

For each of the above methods, a related system arranged to perform the method may be provided.

For each of the above training methods, a related computer program product may be provided.

BRIEF DESCRIPTION OF THE FIGURES

Aspects of the invention will now be described, by way of example(s), with reference to the following Figures, in which.

DETAILED DESCRIPTION

Technology Overview

Figure 1:
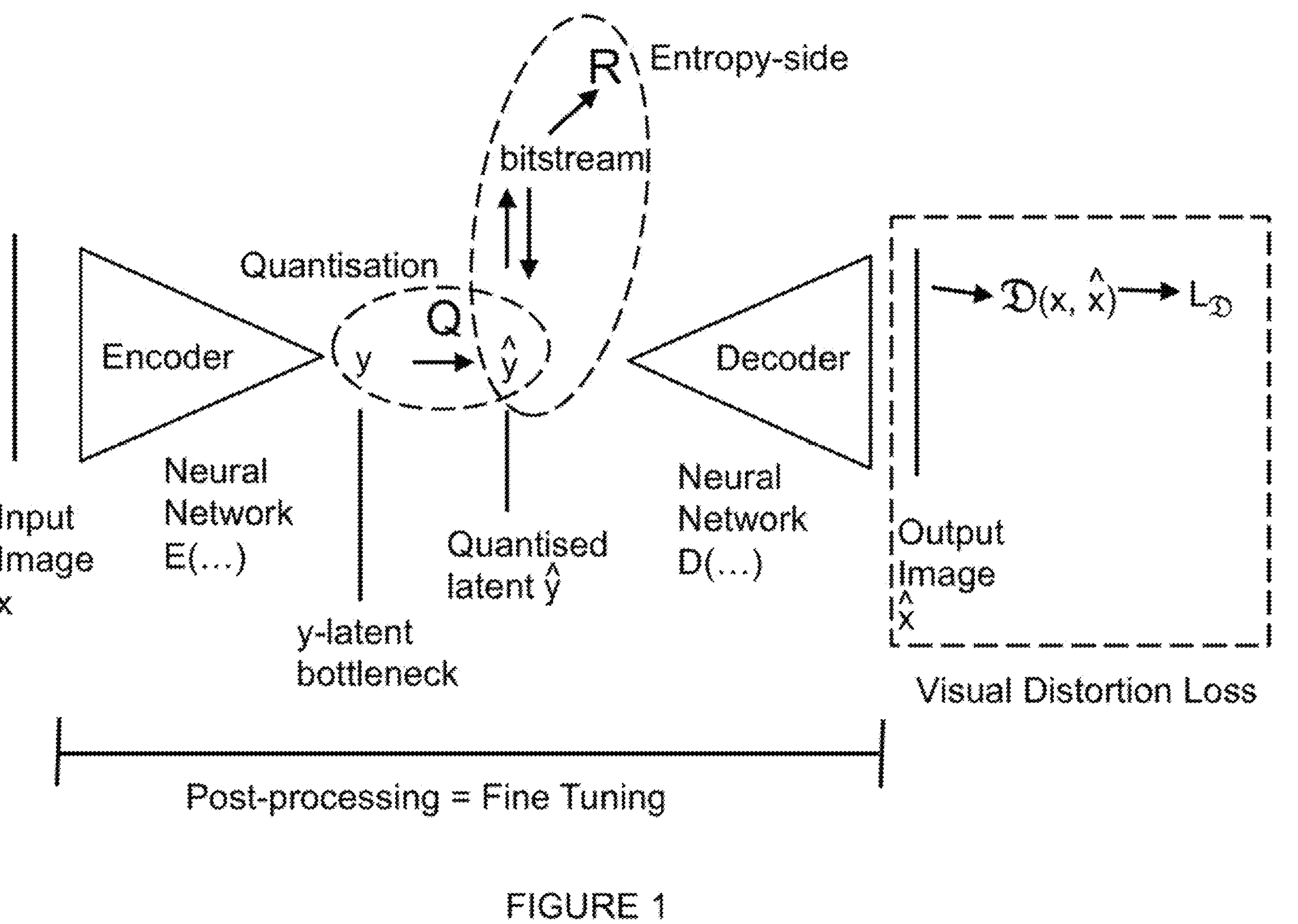
FIG. 1 shows a schematic diagram of an artificial intelligence (AI)-based compression process, including encoding an input image x using a neural network E( . . . ), and decoding using a neural network D( . . . ), to provide an output image $\hat{x}$. Runtime issues are relevant to the Encoder. Runtime issues are relevant to the Decoder. Examples of issues of relevance to parts of the process are identified.

We provide a high level overview of our artificial intelligence (AI)-based (e.g. image and/or video) compression technology.

In general, compression can be lossless, or lossy. In lossless compression, and in lossy compression, the file size is reduced. The file size is sometimes referred to as the "rate".

But in lossy compression, it is possible to change what is input. The output image $\hat{x}$ after reconstruction of a bitstream relating to a compressed image is not the same as the input image x. The fact that the output image $\hat{x}$ may differ from the input image x is represented by the hat over the "x". The difference between x and $\hat{x}$ may be referred to as "distortion", or "a difference in image quality". Lossy compression may be characterized by the "output quality", or "distortion".

Although our pipeline may contain some lossless compression, overall the pipeline uses lossy compression.

Usually, as the rate goes up, the distortion goes down. A relation between these quantities for a given compression scheme is called the "rate-distortion equation". For example, a goal in improving compression technology is to obtain reduced distortion, for a fixed size of a compressed file, which would provide an improved rate-distortion equation. For example, the distortion can be measured using the mean square error (MSE) between the pixels of x and $\hat{x}$, but there are many other ways of measuring distortion, as will be clear to the person skilled in the art. Known compression and decompression schemes include for example, JPEG, JPEG2000, AVC, HEVC, AVI.

Our approach includes using deep learning and AI to provide an improved compression and decompression scheme, or improved compression and decompression schemes.

In an example of an artificial intelligence (AI)-based compression process, an input image x is provided. There is provided a neural network characterized by a function E( . . . ) which encodes the input image x. This neural network E( . . . ) produces a latent representation, which we call y. The latent representation is quantized to provide $\hat{y}$, a quantized latent. The quantized latent goes to another neural network characterized by a function D( . . . ) which is a decoder. The decoder provides an output image, which we call $\hat{x}$. The quantized latent $\hat{y}$ is entropy-encoded into a bitstream.

For example, the encoder is a library which is installed on a user device, e.g. laptop computer, desktop computer, smart phone. The encoder produces the y latent, which is quantized to $\hat{y}$, which is entropy encoded to provide the bitstream, and the bitstream is sent over the internet to a recipient device. The recipient device entropy decodes the bitstream to provide $\hat{y}$, and then uses the decoder which is a library installed on a recipient device (e.g. laptop computer, desktop computer, smart phone) to provide the output image $\hat{x}$.

E may be parametrized by a convolution matrix θ such that $y=E_\theta(x)$.

D may be parametrized by a convolution matrix Ω such that $\hat{x}=D_\Omega(\hat{y})$.

We need to find a way to learn the parameters θ and Ω of the neural networks.

The compression pipeline may be parametrized using a loss function L. In an example, we use back-propagation of gradient descent of the loss function, using the chain vile, to update the weight parameters of θ and Ω of the neural networks using the gradients ∂L/∂w.

The loss function is the rate-distortion trade off. The distortion function is $\mathfrak{D}(x, \hat{x})$, which produces a value, which is the loss of the distortion $L_{\mathfrak{D}}$. The loss function can be used to back-propagate the gradient to train the neural networks.

So for example, we use an input image, we obtain a loss function, we perform a backwards propagation, and we train the neural networks. This is repeated for a training set of input images, until the pipeline is trained. The trained neural networks can then provide good quality output images.

An example image training set is the KODAK image set (e.g. at www.cs.albany.edu/~xypan/research/snr/Kodak.html). An example image training set is the IMAX image set. An example image training set is the Imagenet dataset (e.g. at www.image-net.org/download). An example image training set is the CLIC Training Dataset P ("professional") and M ("mobile") (e.g. at http://challenge.compression.cc/tasks/).

In an example, the production of the bitstream from $\hat{y}$ is lossless compression.

Based on Shannon entropy in information theory, the minimum rate (which corresponds to the best possible lossless compression) is the sum from i=1 to N of $(p_{\hat{y}}(\hat{y}_i) * \log_2(p_{\hat{y}}(\hat{y}_i)))$ bits, where $p_{\hat{y}}$ is the probability of $\hat{y}$, for different discrete $\hat{y}$ values $\hat{y}_i$, where $\hat{y}=\{\hat{y}_1, \hat{y}_2 \ldots \hat{y}_N\}$, where we know the probability distribution p. This is the minimum file size in bits for lossless compression of $\hat{y}$.

Various entropy encoding algorithms are known, e.g. range encoding/decoding, arithmetic encoding/decoding.

In an example, entropy coding EC uses $\hat{y}$ and $p_{\hat{y}}$ to provide the bitstream. In an example, entropy decoding ED takes the bitstream and $p_{\hat{y}}$ and provides $\hat{y}$. This example coding/decoding process is lossless.

How can we get filesize in a differentiable way? We use Shannon entropy, or something similar to Shannon entropy. The expression for Shannon entropy is fully differentiable. A neural network needs a differentiable loss function. Shannon entropy is a theoretical minimum entropy value. The entropy coding we use may not reach the theoretical minimum value, but it is expected to reach close to the theoretical minimum value.

In the pipeline, the pipeline needs a loss that we can use for training, and the loss needs to resemble the rate-distortion trade off.

A loss which may be used for neural network training is Loss=$\mathfrak{D}$+λ*R, where $\mathfrak{D}$ is the distortion function, λ is a weighting factor, and R is the rate loss. R is related to entropy. Both $\mathfrak{D}$ and R are differentiable functions.

There are some problems concerning the rate equation.

The Shannon entropy H gives us some minimum file size as a function of $\hat{y}$ and $p_{\hat{y}}$ i.e. $H(\hat{y}, p_{\hat{y}})$. The problem is how can we know $p_{\hat{y}}$, the probability distribution of the input? Actually, we do not know $p_{\hat{y}}$. So we have to approximate $p_{\hat{y}}$. We use $q_{\hat{y}}$ as an approximation to $p_{\hat{y}}$. Because we use $q_{\hat{y}}$ instead of $p_{\hat{y}}$, we are instead evaluating a cross entropy rather than an entropy. The cross entropy $CE(\hat{y}, q_{\hat{y}})$ gives us the minimum filesize for $\hat{y}$ given the probability distribution $q_{\hat{y}}$.

There is the relation $$H(\hat{y},p_{\hat{y}})=CE(\hat{y},q_{\hat{y}})+KL(p_{\hat{y}}\|q_{\hat{y}})$$

Where KL is the Kullback-Leibler divergence between $p_{\hat{y}}$ and $q_{\hat{y}}$. The KL is zero, if $p_{\hat{y}}$ and $q_{\hat{y}}$ are identical.

In a perfect world we would use the Shannon entropy to train the rate equation, but that would mean knowing $p_{\hat{y}}$, which we do not know. We only know $q_{\hat{y}}$, which is an assumed distribution.

So to achieve small file compression sizes, we need $q_{\hat{y}}$ to be as close as possible to $p_{\hat{y}}$. One category of our inventions relates to the $q_{\hat{y}}$ we use.

In an example, we assume $q_{\hat{y}}$ is a factorized parametric distribution.

One of our innovations is to make the assumptions about $q_{\hat{y}}$ more flexible. This can enable $q_{\hat{y}}$ to better approximate $p_{\hat{y}}$, thereby reducing the compressed filesize.

As an example, consider that $p_{\hat{y}}$ is a multivariate normal distribution, with a mean μ vector and a covariant matrix Σ. Σ has the size N×N, where N is the number of pixels in the latent space. Assuming $\tilde{y}$ with dimensions 1×2×512×512 (relating to images with e.g. 512×512 pixels), then E has the size 2.5 million squared, which is about 5 trillion, so therefore there are 5 trillion parameters in Σ we need to estimate. This is not computationally feasible. So, usually, assuming a multivariate normal distribution is not computationally feasible.

Let us consider $p_{\hat{y}}$, which as we have argued is too complex to be known exactly. This joint probability density function $p(\hat{y})$ can be represented as a conditional probability function, as the second line of the equation below expresses.

$$\begin{aligned} p(\hat{y}) &= p((\hat{y}_1 \hat{y}_2 \ldots \hat{y}_N) \\ &= p(\hat{y}_1)^* p(\hat{y}_2 \mid \hat{y}_1)^* p(\hat{y}_3 \mid \{\hat{y}_1, \hat{y}_2\})^* \ldots \end{aligned}$$

Very often $p(\hat{y})$ is approximated by a factorized probability density function $$p(\hat{y}_1)*p(\hat{y}_2)*p(\hat{y}_3)* \ldots p(\hat{y}_N)$$

The factorized probability density function is relatively easy to calculate computationally. One of our approaches is to start with a $q_{\hat{y}}$ which is a factorized probability density function, and then we weaken this condition so as to approach the conditional probability function, or the joint probability density function $p(\hat{y})$, to obtain smaller compressed filzesizes. This is one of the class of innovations that we have.

Distortion functions $\mathfrak{D}(x, \hat{x})$, which correlate well with the human vision system, are hard to identify. There exist many candidate distortion functions, but typically these do not correlate well with the human vision system, when considering a wide variety of possible distortions.

We want humans who view picture or video content on their devices, to have a pleasing visual experience when viewing this content, for the smallest possible file size transmitted to the devices. So we have focused on providing improved distortion functions, which correlate better with the human vision system. Modern distortion functions very often contain a neural network, which transforms the input and the output into a perceptional space, before comparing the input and the output. The neural network can be a generative adversarial network (GAN) which performs some hallucination. There can also be some stabilization. It turns out it seems that humans evaluate image quality over density functions. We try to get $p(\hat{x})$ to match $p(x)$, for example using a generative method eg. a GAN.

Hallucinating is providing fine detail in an image, which can be generated for the viewer, where all the fine, higher spatial frequencies, detail does not need to be accurately transmitted, but some of the fine detail can be generated at the receiver end, given suitable cues for generating the fine details, where the cues are sent from the transmitter.

How should the neural networks E( . . . ), D( . . . ) look like? What is the architecture optimization for these neural networks? How do we optimize performance of these neural networks, where performance relates to filesize, distortion and runtime performance in real time? There are trade offs between these goals. So for example if we increase the size of the neural networks, then distortion can be reduced, and/or filesize can be reduced, but then runtime performance goes down, because bigger neural networks require more computational resources. Architecture optimization for these neural networks makes computationally demanding neural networks run faster.

We have provided innovation with respect to the quantization function Q. The problem with a standard quantization function is that it has zero gradient, and this impedes training in a neural network environment, which relies on the back propagation of gradient descent of the loss function. Therefore we have provided custom gradient functions, which allow the propagation of gradients, to permit neural network training.

We can perform post-processing which affects the output image. We can include in the bitstream additional information. This additional information can be information about the convolution matrix Ω, where D is parametrized by the convolution matrix Ω.

The additional information about the convolution matrix Ω can be image-specific. An existing convolution matrix can be updated with the additional information about the convolution matrix Ω, and decoding is then performed using the updated convolution matrix.

Another option is to fine tune the y, by using additional information about E. The additional information about E can be image-specific.

The entropy decoding process should have access to the same probability distribution, if any, that was used in the entropy encoding process. It is possible that there exists some probability distribution for the entropy encoding process that is also used for the entropy decoding process. This probability distribution may be one to which all users are given access; this probability distribution may be included in a compression library; this probability distribution may be included in a decompression library. It is also possible that the entropy encoding process produces a probability distribution that is also used for the entropy decoding process, where the entropy decoding process is given access to the produced probability distribution. The entropy decoding process may be given access to the produced probability distribution by the inclusion of parameters characterizing the produced probability distribution in the bitstream. The produced probability distribution may be an image-specific probability distribution.

FIG. 1 shows a schematic diagram of an artificial intelligence (AI)-based compression process, including encoding an input image x using a neural network, and decoding using a neural network, to provide an output image x̂.

In an example of a layer in an encoder neural network, the layer includes a convolution, a bias and an activation function. In an example, four such layers are used.

In an example, we assume that $q_{\hat{y}}$ is a factorized normal distribution, where $y=\{y_1, y_2 \ldots y_N\}$, and $\hat{y}=\{\hat{y}_1, \hat{y}_2 \ldots \hat{y}_N\}$. We assume each $\hat{y}_i$ (i=1 to N) follows a normal distribution N e.g. with a mean μ of zero and a standard deviation σ of 1. We can define $\hat{y}=\text{Int}(y-\mu)+\mu$, where Int( ) is integer rounding.

The rate loss in the quantized latent space comes from, summing (Σ) from i=1 to N, $$\text{Rate}=(\Sigma \log_2(q_{\hat{y}}(\hat{y}_i)))/N=(\Sigma N(\hat{y}_i|=0,\sigma=1))/N$$

The output image x̂ can be sent to a discriminator network, e.g. a GAN network, to provide scores, and the scores are combined to provide a distortion loss.

We want to make the $q_{\hat{y}}$ flexible so we can model the $p_{\hat{y}}$ better, and close the gap between the Shannon entropy and the cross entropy. We make the $q_{\hat{y}}$ more flexible by using meta information. We have another neural network on our y latent space which is a hyper encoder. We have another latent space called z, which is quantized to ẑ. Then we decode the z latent space into distribution parameters such as μ and σ. These distribution parameters are used in the rate equation.

Now in the more flexible distribution, the rate loss is, summing (Σ) from i=1 to N, $$\text{Rate}-(\Sigma N(\hat{y}_i|\mu_i,\sigma_i))/N$$

So we make the $q_{\hat{y}}$ more flexible, but the cost is that we must send meta information. In this system, we have $$\text{bitstream}_{\hat{y}}=EC(\hat{y},q_{\hat{y}}(\mu,\sigma))$$

$$\hat{y}ED(\text{bitstream}_{\hat{y}},q_{\hat{y}}(\mu,\sigma))$$

Here the z latent gets its own bitstream; which is sent with $\text{bitstream}_{\hat{y}}$. The decoder then decodes bitstream; first, then executes the hyper decoder, to obtain the distribution parameters (μ, σ), then the distribution parameters (μ, σ) are used with $\text{bitstream}_{\hat{y}}$ to decode the ŷ, which are then executed by the decoder to get the output image x̂.

Although we now have to send $\text{bitstream}_{\hat{z}}$, the effect of $\text{bitstream}_{\hat{z}}$ is that it makes $\text{bitstream}_{\hat{z}}$ smaller, and the total of the new $\text{bitstream}_{\hat{y}}$ $\text{bitstream}_{\hat{z}}$ is smaller than $\text{bitstream}_{\hat{y}}$ without the use of the hyper encoder. This is a powerful method called hyperprior, and it makes the entropy model more flexible by sending meta information. The loss equation becomes $$\text{Loss}=\mathfrak{D}(x,\hat{x})+\lambda_1 * R_y+\lambda_2 * R_z$$

It is possible further to use a hyper hyper encoder for z, optionally and so on recursively, in more sophisticated approaches.

The entropy decoding process of the quantized z latent should have access to the same probability distribution, if any, that was used in the entropy encoding process of the quantized z latent. It is possible that there exists some probability distribution for the entropy encoding process of the quantized z latent that is also used for the entropy decoding process of the quantized z latent. This probability distribution may be one to which all users are given access; this probability distribution may be included in a compression library; this probability distribution may be included in a decompression library. It is also possible that the entropy encoding process of the quantized z latent produces a probability distribution that is also used for the entropy decoding process of the quantized z latent, where the entropy decoding process of the quantized z latent is given access to the produced probability distribution. The entropy decoding process of the quantized z latent may be given access to the produced probability distribution by the inclusion of parameters characterizing the produced probability distribution in the bitstream. The produced probability distribution may be an image-specific probability distribution.

Figure 2:
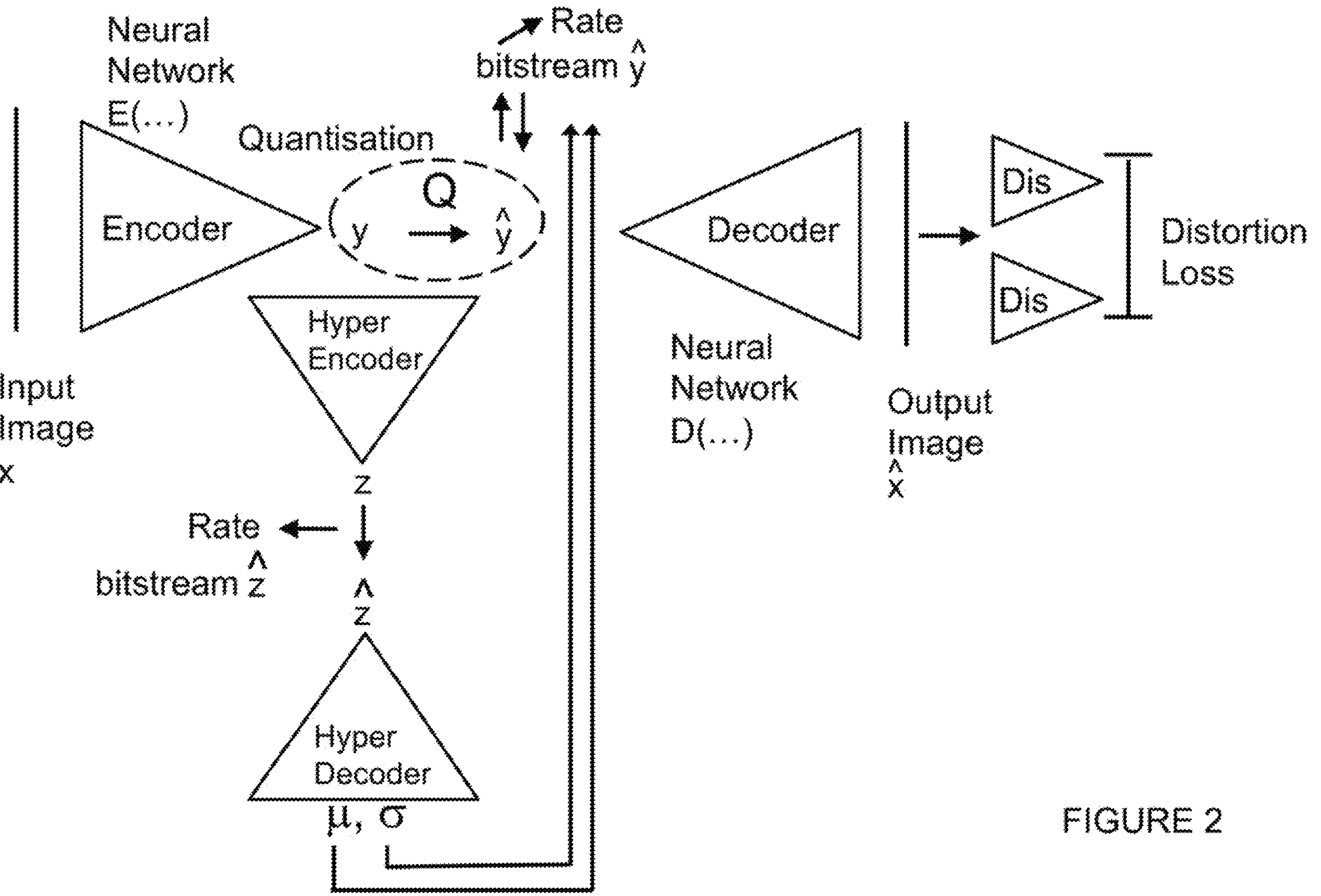
FIG. 2 shows a schematic diagram of an artificial intelligence (AD-based compression process, including encoding an input image x using a neural network E( . . . ), and decoding using a neural network D( . . . ), to provide an output image $\hat{x}$, and in which there is provided a hyper encoder and a hyper decoder. "Dis" denotes elements of a discriminator network.

FIG. 2 shows a schematic diagram of an artificial intelligence (AI)-based compression process, including encoding an input image x using a neural network, and decoding using a neural network, to provide an output image $\hat{x}$, and in which there is provided a hyper encoder and a hyper decoder.

In a more sophisticated approach, the distortion function $\mathfrak{D}$ (x, $\hat{x}$) has multiple contributions. The discriminator networks produce a generative loss $L_{GEN}$. For example a Visual Geometry Group (VGG) network may be used to process x to provide m, and to process $\hat{x}$ to provide $\hat{m}$, then a mean squared error (MSE) is provided using m and $\hat{m}$ as inputs, to provide a perceptual loss. The MSE using x and $\hat{x}$ as inputs, can also be calculated. The loss equation becomes $$\text{Loss}=\lambda_1 * R_y+\lambda_2 * R_z+\lambda_3 * MSE(x,\hat{x})+\lambda_4 * L_{GEN}+\lambda_5 * VGG(x,\hat{x}),$$

where the first two terms in the summation are the rate loss, and where the final three terms in the summation are the distortion loss $\mathfrak{D}$ (x, $\hat{x}$). Sometimes there can be additional regularization losses, which are there as part of making training stable.

Notes re HyperPrior and HyperHyperPrior

Regarding a system or method not including a hyperprior, if we have a y latent without a HyperPrior (i.e. without a third and a fourth network), the distribution over the y latent used for entropy coding is not thereby made flexible. The HyperPrior makes the distribution over the y latent more flexible and thus reduces entropy/filesize. Why? Because we can send y-distribution parameters via the HyperPrior. If we use a HyperPrior, we obtain a new, z, latent. This z latent has the same problem as the "old y latent" when there was no hyperprior, in that it has no flexible distribution. However, as the dimensionality re z usually is smaller than re y, the issue is less severe.

Figure 3:
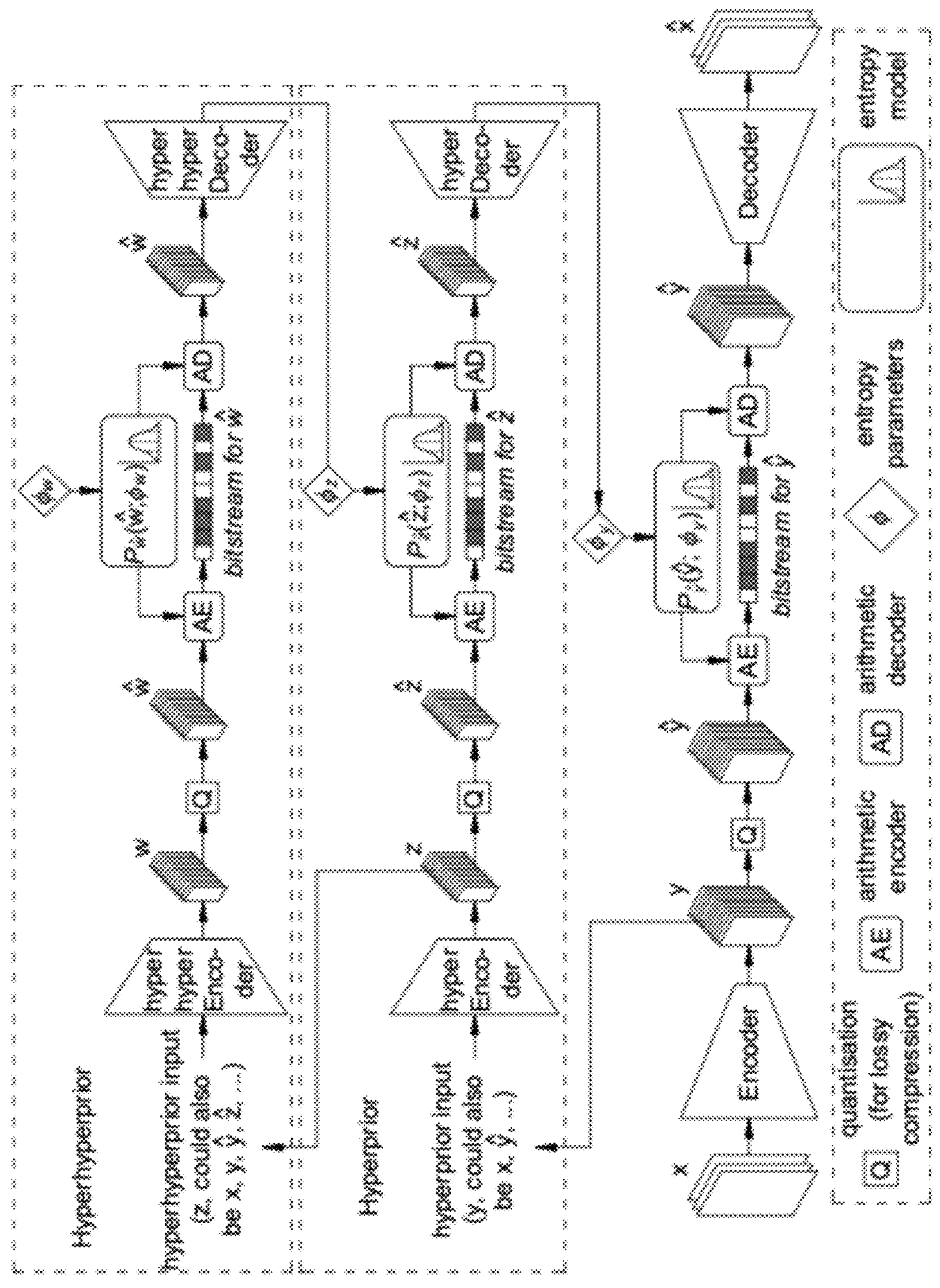
FIG. 3 shows an example structure of an autoencoder with a hyperprior and a hyperhyperprior, where hyperhyperlatents 'w' encodes information regarding the latent entropy parameters $\phi_z$, which in turn allows for the encoding/decoding of the hyperlatents 'z'. The model optimises over the parameters of all relevant encoder/decoder modules, as well as hyperhyperlatent entropy parameters $\phi_w$. Note that this hierarchical structure of hyperpriors can be recursively applied without theoretical limitations.

We can apply the concept of the HyperPrior recursively and use a HyperHyperPrior on the z latent space of the HyperPrior. If we have a z latent without a HyperHyperPrior (i.e. without a fifth and a sixth network), the distribution over the z latent used for entropy coding is not thereby made flexible. The HyperHyperPrior makes the distribution over the z latent more flexible and thus reduces entropy/filesize. Why? Because we can send z-distribution parameters via the HyperHyperPrior. If we use the HyperHyperPrior, we end up with a new w latent. This w latent has the same problem as the "old z latent" when there was no hyperhyperprior, in that it has no flexible distribution. However, as the dimensionality re w usually is smaller than re z, the issue is less severe. An example is shown in FIG. 3.

The above-mentioned concept can be applied recursively. We can have as many HyperPriors as desired, for instance: a HyperHyperPrior, a HyperHyperHyperPrior, a HyperHyperHyperHyperPrior, and so on.

GB Patent application no. 2016824.1, filed 23 Oct. 2020, is incorporated by reference.

PCT application PCT/GB2021/051041 entitled "IMAGE COMPRESSION AND DECODING, VIDEO COMPRESSION AND DECODING: METHODS AND SYSTEMS", filed 29 Apr. 2021, is incorporated by reference.

Notes re Training

Regarding seeding the neural networks for training, all the neural network parameters can be randomized with standard methods (such as Xavier Initialization). Typically, we find that satisfactory results are obtained with sufficiently small learning rates.

Note

It is to be understood that the arrangements referenced herein are only illustrative of the application for the principles of the present inventions. Numerous modifications and alternative arrangements can be devised without departing from the spirit and scope of the present inventions. While the present inventions are shown in the drawings and fully described with particularity and detail in connection with what is presently deemed to be the most practical and preferred examples of the inventions, it will be apparent to those of ordinary skill in the art that numerous modifications can be made without departing from the principles and concepts of the inventions as set forth herein.

1. IMPLICIT EQUATION SYSTEMS AND THEIR SOLVERS FOR AI-BASED IMAGE AND VIDEO COMPRESSION

1.1 Introduction

Implicit equation systems are a powerful modelling tool, yet have been underutilised in the AI and deep learning literature. We describe implicit equation systems, and methods for solving them, for use in AI-based image and compression pipelines. Implicit equation systems and their solution methods have the potential to significantly improve the performance and speed of AI-based image and compression algorithms. For example, implicit equation systems allow for the use of ground-truth variables in training. In contrast to other methods, they also allow for the use of simultaneous forward- and backward pixel context, with pixel context windows centred on a given pixel.

Implicitly defined equation systems (possibly nonlinear) and their corresponding solutions arise in many branches of the physical sciences, yet only recently has the AI and deep learning community begun to explore this modelling approach. An implicit system of equations is one defined in which an unknown variable, say for example $y \in \mathbb{R}^m$, and a known variable $x \in \mathbb{R}^m$, are combined via a function $F: R^{m+n} \mapsto \mathbb{R}^m$, so that $$F(x,y)=0 \tag{1.1}$$

A solution of this system is a variable y satisfying (1.1). Equation (1.1) could have one solution, many solutions, or no solution. Finding such a solution(s) (if it exists) in general is difficult, and requires the use of (possibly nonlinear) numerical equation solvers. Despite this difficulty, modelling with implicit systems is a powerful approach, and often yields impressive results.

This Section 1 outlines the functionality and scope of current and future utilisation of implicitly defined equation systems. their solutions, and numerical equation solvers, for use in, but not limited to, image and video data compression based on AI and deep learning. This Section 1 acts as a description of implicitly defined equation systems, their solutions, and numerical equation solvers for use in the research, development, production, marketing and distribution of AI-based image and video compression, and any of its modified or extended versions thereof.

1.2 Background: Example Implicit Systems and Solution Methods

Equation (1.1) is a very general framework for defining implicit systems. To provide some background on implicit systems. and methods of solving them, we outline the approach with several examples, which may be used as components in AI-based video and image compression pipelines.

A simple example of a practical implicit system is the following. We may seek to find an unknown variable $y \in \mathbb{R}^m$ (such as an image or latent variable in an AI-based image and video compression algorithm) satisfying the system $$y=f(y) \tag{1.2}$$

Here $f: \mathbb{R}^m \mapsto \mathbb{R}^m$ is some function. (Note that (1.2) can be put into the form of (1.1) by moving y to the right-hand side and setting $F:=f(y)-y$). In general it is difficult to solve for a y satisfying this system. If a solution to (1.2) exists, the solution is called a fixed point. If $f$ is contractive, in that its Lipschitz constant (defined by some distance metric) is less than one, an iterative solver may be used to find a fixed point solution. An iterative solver begins with an initial guess $y^0$. The initial guess could be given by sampling the elements of $y^0$ from a probability distribution, or by setting $y^0$ to some constant variable (such as all zeros). Regardless, once the initial guess is set, we progressively set $$y^{k+1}=f(y^k) \tag{1.3}$$

When the function $f$ is contractive, then given enough iterations, the sequence $\{y^k\}_{k \in N}$ will converge to a solution y satisfying (1.2).

Once the iterative solver has reached a solution, the implicit system is said to be in equilibrium. Often it is not necessary to run the iterative solver until equilibrium is reached: the iterations may be terminated when the iterates are close enough to being optimal in some sense.

This iterative approach is just one of many methods which may be used for solving systems such as (1.2) in AI-based image and video compression. Other methods may be used, many of which relax the requirement that $f$ be contractive. For example, any one of the nonlinear equation solvers discussed in Chapter 11 in [1] could be used, such as Newton's method and its many variants. The function $f$ may have some special structure. For example, in AI-based image and video compression, $f(\cdot,\theta)$ may be a neural network, parametrised via θ (such as weight matrices and biases). In this case, the implicit system would take the form $y=f(y,\theta)$. It could also be that $f$ takes in so-called "side-information" (or alternately, a "hyperlatent"), such as a variable z generated elsewhere in the compression algorithm. Combining these approaches, the system would take the form $y=f(y, \theta, z)$. In any case, the solution may be found using an iterative method, or with any other (possibly nonlinear) equation solver.

1.2.1 Linear Implicit Systems

The function $f$ may be linear with respect to the argument y. That is, we can identify $f$ with a matrix $A \in \mathbb{R}^{m \times m}$. Moreover the right-hand side may have a bias term $\mu \in \mathbb{R}^d$. In this case, the implicit system becomes $$y=Ay+\mu \tag{1.4}$$

Both A and p may themselves be neural networks or any other type of function taking in parameters θ and side-information z (hyperlatent), but note that the function acts linearly on y. Due to this special linear structure, a whole host of linear solution methods are available (see for example [2]). If A is contractive (matrix norm is less than one), then the iterative method discussed before is still applicable: start with an initial guess $y^0$ and iterate with $y^{k+1}=\mu+Ay^k$. After several iterations, the iterates $y^k$ will converge to a solution of (1.4). However several other techniques are available. Here we review several methods that are applicable for AI-based image and video compression. First, define the matrix $B:=1-A$, where I is the m×m in identity matrix. Then (1.4) can be rewritten explicitly as the linear system $By=\mu$. Now depending on the structure of the matrix B, several solution techniques are available:

- If B is lower triangular, then the serial method forward substitution may be used. To illustrate, for $i=1, \ldots, m$, set $$y_i = \frac{1}{b_{ii}}\left(\mu_i - \sum_{j<i} b_{ij} y_j\right)$$

- Similarly if B is upper triangular, then the serial method of backward substitution may be used. To illustrate, for $i=m, \ldots, 1$, set $$y_i = \frac{1}{b_{ii}}\left(\mu_i - \sum_{j>i} b_{ij} y_j\right)$$

- B may be factorised as a triangular decomposition (with or without pivoting the rows or columns), such as any one of $B=LU$, or $B=LDU$, or $B=LL^t$ (Cholesky factorisation), or $B=LDL^t$, where L is a lower triangular matrix, D is a diagonal matrix, and U is an upper triangular matrix. The system $By=\mu$ may then be solved by inverting lower triangular factors with forward substitution, and upper triangular factors with backward substitution.
- B may be factorised with a QR decomposition, where Q is an orthonormal matrix (i.e., with $Q^t=Q^{-1}$), and R an upper triangular matrix. In this case the system has solution $y=R^{-1}Q^t\mu$, where $R^{-1}$ is computed using back substitution, and we have used the fact that the transpose of Q is its inverse.
- Similarly we may also factorise B with any one of the following: $B=QL$ (L a lower triangular matrix); $B=RQ$; or $B=LQ$. In all of these cases, Q is inverted by its transpose; the upper triangular matrix R is inverted with back substitution; and the lower triangular matrix L is inverted with forward substitution.
- Examples of a orthonormal matrix which may be used in this type of factorisation for AI-based image or video compression are the wavelet transform, and the Discrete Cosine Transform and its variants.
- Suppose the matrix B is written as $B=D+L+U$, with D a diagonal matrix, and here with L a strictly lower triangular matrix, and U a strictly upper triangular matrix. Then the iterative Jacobi method can be applied. This iterative method sets $y^{k+1}=D^{-1}(\mu-(L+U)y^k)$, and iterates until a convergence criteria is reached.
- Another iterative approach, called the Gauss-Seidel method, is available when B is written as $B=L+\hat{U}$, here where $\hat{U}$ is a strictly upper triangular matrix, and L is a lower triangular matrix. The Gauss-Seidel iteration is to set $y^{k+1}=L^{-1}(\mu-\hat{U}y^k)$, where $L^{-1}$ is computed through forward substitution.
- A similar approach can be taken when $B=\hat{L}+U$, where $\hat{L}$ is strictly lower triangular and U is upper triangular. The iteration is then $y^{k+1}=U^{-1}(\mu-\hat{L}y^k)$, where $U^{-1}$ is computed through back substitution.
- Several other iterative techniques from numerical linear algebra can be used, such as Successive Over Relaxation, or the Conjugate Gradient method and its variants (see Chapter 10 in [2] for a review).

1.3 Implicit Systems for AI-Based Image and Video Compression

The previous section provided an overview of implicit systems, their solutions, and methods for finding their solutions. In this section, we discuss how implicit equation systems may be used in AI-based image and video compression.

A compression algorithm may be divided into two phases: the encoding phase and the decoding phase. In the encoding phase, input data is transformed into a latent variable with a smaller representation (in bits) than the original input variable. In the decode phase, a reverse transform is applied to the latent variable, in which the original data (or an approximation of the original data) is recovered. As we shall see, the numerical techniques used in encoding may or may not differ from the techniques used in decoding.

An AI-based compression system must be also be trained. This is the procedure of choosing parameters of the AI-based compression system that achieve good compression results (e.g. small file size and minimal distortion). During training, parts of the encoding and decoding algorithm are run, in order to decide how to adjust the parameters of the AI-based compression system.

We outline several possible uses of implicit systems for use in AI-based image and video compression, although the following is not exhaustive.

1.3.1 Implicit Compression Algorithms with Residuals

First we outline compression algorithms that utilise a residual variable. The encoder takes in a ground-truth variable $y \in \mathbb{R}^m$ (which could be an image, or a latent variable created elsewhere in the compression pipeline), and outputs a residual variable $\xi \subset \mathbb{R}^m$. The residual is quantised and may later be compressed via an entropy data compression scheme such as an arithmetic encoder. This encoding process also implicitly quantises the ground-truth variable y into a quantised variable $\hat{y}$, although during encoding $\hat{y}$ need not be stored (but may be used during the training of AI-based image and video compression algorithms).

Encoding

To be more precise, an implicit system for encoding and/or algorithm training may take the following form $$\begin{cases} \xi = y - \mu - f(\hat{y}) \\ \hat{y} = Q(\xi) + \mu + f(\hat{y}) \end{cases} \tag{1.5}$$

Here Q(•) is a quantisation function such as nearest-integer rounding. The function $f: \mathbb{R}^m \mapsto \mathbb{R}^m$ operates on the quantised variable $\hat{y}$, so that the system (1.5) is implicit in the variable $\hat{y}$. Note that here the unknown variables are $\hat{y}$ and $\xi$: these are the quantities that must be found via a numerical solver. The ground-truth variable y is given, as are $\mu$ and $f$. The function $f$ may be a neural network, with parameters $\theta$, and may also take in an additional side-information (hyperlatent) variable $\hat{z}$, created elsewhere in the compression algorithm. In addition the bias $\mu$ may also be generated via a function (such as another neural network) taking in side-information $\hat{z}$.

The implicit system (1.5) can be solved e.g. with any one of the implicit solvers discussed in Section 1.2. We call the encoding solution method an Implicit Encode Solver (IES). An example of an IES is an iterative solver, which begins with an initial guess $\hat{y}^0$. For example we may set the initial guess to be the ground truth, $\hat{y}^0=y$. (If $f$ or $\mu$ are neural networks, then during the training of $f$ or $\mu$ here the ground truth may be detached from the computational graph.) For iterations k=0, . . . N, the iterative variables are defined as $$\begin{cases} \xi^{k+1} = y - \mu - f(\hat{y}^k) \\ \hat{y}^{k+1} = Q(\xi^{k+1}) + \mu + f(\hat{y}^k) \end{cases} \tag{1.6}$$

Iteration may be terminated when a convergence criteria is met. Convergence is guaranteed if $f$ is contractive with respect to the argument $\hat{y}$. At termination, the IES returns solution $\xi$ and $\hat{y}$. The residual $\xi$ may be quantised to $\hat{\xi}$–Q($\xi$) and sent to an entropy data compression scheme: while $\hat{y}$ may be used elsewhere during the training and design of an AI-based image and video compression algorithm.

Use of a ground-truth variable during training: Note that the ground-truth variable y is used directly in the implicit system (1.5). and correspondingly in the iterations of the IES provided by (1.6). In addition, the IES outputs both the residual e and the quantised variable which may be used elsewhere during the training procedure (without needing to recover $\hat{y}$ from $\hat{\xi}$4). We remark that during training and design of an AI-based video and compression algorithm, the ground truth need not be detached here from the computational graph, nor perturbed in any way (such as by adding noise). This is a key innovation of our method: in the AI-based image and video compression research community it is widely thought that ground-truth variable (image or latent) cannot readily be used during the training of compression algorithms. However, in an implicit system such as (1.5), we have shown that this is indeed feasible and beneficial.

Training with $\hat{y}$ returned by the IES: It bears special attention that the IES returns not only $\xi$ (which is quantised and passed to an entropy encoder), but also $\hat{y}$. Because the IES also returns $\hat{y}$, there is no need to run a separate decode solver during training to recover $\hat{y}$ from $\xi$: it is already given. This is an additional key point of this Section 1: running a separate decode solver during training may be expensive and computationally demanding. Thus, the use of the quantised variable $\hat{y}$ returned by the IES elsewhere in the compression pipeline during training has the potential to massively decrease the amount of compute time and resources required to train an AI-based image and video compression pipeline.

Decoding

In the decoding phase, the variable $\hat{\xi}$=Q($\xi$) is retrieved, say from an arithmetic decoder. The quantised variable $\hat{y}$ must be recovered, by solving the system $$\hat{y}=\hat{\xi}+\mu+f(\hat{y}) \tag{1.7}$$

The equation solver used during decoding need not be the same type of solver as used in encoding. However, an iterative solver may be used. In this case, an initial guess for $\hat{y}^0$ is made, say by drawing $\hat{y}^0$ from a random distribution. Then, for iterations k=0, . . . , N the iterates are updated as $$\hat{y}^{k+1}=\hat{\xi}+\mu+f(\hat{y}^{k+1}) \tag{1.8}$$

Iteration is terminated when some convergence criteria is reached, and the Decode Solver (DS) returns the recovered variable $\hat{y}$. Any implicit system solver may be used for the Decode Solver, such as those discussed in Section 1.2.

1.4 Linear Implicit Compression Algorithms with Residual

The case when the function $f(\hat{y})$ in (1.5) is linear (with respect to $\hat{y}$) deserves special attention. In this case, we identify $f$ with a matrix $A \in \mathbb{R}^{m \times m}$. The implicit system during encoding and training is $$\begin{cases} \xi = y - \mu - A\hat{y} \\ \hat{y} = Q(\xi) + \mu + A\hat{y} \end{cases} \tag{1.9}$$

An IES must be constructed to solve this system. Now because of the special linear structure in $\hat{y}$, several options are available. An iterative scheme may be used, where an initial guess for $\hat{y}^0$ is made (again, such as setting $\hat{y}^0=y$). At each iteration k=0, . . . N, first define $$\xi^{k+1} y - \mu - A\hat{y}^k \tag{1.10}$$

In one variant of the encoding and training algorithm, the iterate $y^{k+1}$ is defined as $$\hat{y}^{k+1} = Q(\xi) + \mu + A\hat{y}^k \tag{1.11}$$

However, $y^{k+1}$ may be updated according to other iterative methods in conjunction with the updates of $\xi$, such as by using the Jacobi method or Gauss-Seidel method discussed in Section 1.2. The IES returns $\xi$ and $\hat{y}$ satisfying (1.9). The residual $\xi$ is quantised into $\hat{\xi}$ and passed to an entropy data compression algorithm, such as an arithmetic encoder.

During training of an AI-based compression pipeline, the variable $\hat{y}$ returned by the IES may be used elsewhere in the data compression pipeline, thus removing the need to run a Decode Solver during training, which may massively decrease the time needed to train an AI-based compression algorithm.

In the decode phase, we are given the quantised residual $\hat{\xi}=Q(\xi)$, and we must recover $\hat{y}$. This is done by solving the system $$\hat{y} = \hat{\xi} + \mu + A\hat{y} \tag{1.12}$$

This is an entirely linear system in $\hat{y}$, and so any one of the linear system solvers discussed in Section 1.2 may be used as a Decode Solver, such as forward- or back substitution (if A is respectively lower or upper triangular), or an iterative solver such as the Jacobi or Gauss-Seidel methods.

A remark on the speed of iterative linear solvers: In certain circumstances (dependent on the structure of A and the computing architecture being used), serial solvers (such as back- and forward substitution discussed in Section 1.2) can be slower than iterative methods. A key point in this Section 1 is that iterative solvers may be used during decode to solve (1.12), when performance gains can be had with an iterative solver (such as the Jacobi method). In other words, even if (1.12) could be solved using back- or forward substitution (for example if A is respectively upper or lower triangular), it may not be advantageous to do so in a real-time compression decoding pipeline.

Moreover, the computational cost of using an iterative linear solver in an AI-based compression pipeline can account for a tiny fraction of the total computations in the entire pipeline. For example, on an input image with a pixel resolution of 256×256, one 3×3 convolutional layer takes roughly 22 GFLOPs. In comparison, 10 iterations of an iterative solver (often all that is needed) in a 64×64 latent space uses 0.017 GFLOPs, or less than 0.1% of one neural network layer in the image space.

1.4.1 Special Matrix Structure of A

In AI-based image and video compression, it is useful for the matrix A to have some special structure. This could variously be any one of (or combinations of) the following:

- A could be (possibly strictly) lower or upper triangular. For example, suppose y is an image or latent variable vectorised into raster-scan order. Then, if A is strictly lower triangular, the non-zero coefficients of row i of A (associated with pixel $y_i$ in the raster-scan representation of y) act only on prior pixels in the raster-scan order.
- A could have a sparse, banded structure. Again suppose t is vectorised into raster-scan order. That is, the non-zero coefficients of row i of A act only on neighbouring pixels in the image representation of i. In this case, we say that A is a context matrix: for each row i in A, the matrix takes in only the neighbouring context pixels about pixel i. We call neighbouring pixels about pixel i the context windor, with a particular pixel width. For example, context window could be a square block of pixels centred at pixel i with block width 3. Alternately, the context window could be all prior pixels in the raster-scan order that are within a block centred about the pixel.
- A could be a block matrix. For example, if the image or latent y is comprised of channels. then a block structure could be constructed so that constituent sub-blocks work on each channel. As another example, the image or latent could be broken into smaller square or rectangular pixel blocks, which would then impose a block structure on A.
- A could be constructed so that its matrix norm (for example, maximum row-norm as measured in the $\iota_1$ norm) is less than one. This ensures convergence of many of the iterative solvers.
- A may be parametrised via a matrix factorisation such as a LU or QR decomposition.

Each of these structures grant computational advantages to design speedy linear equation solvers by exploiting the particular matrix structure.

1.4.2 Worked Example of a Linear Implicit System in an AI Compression Algorithm In this section we describe the usage of a linear implicit system within an AI-based algorithm for image and video compression. The encoding pass of this example works as follows, with a schematic representation detailed in FIG. 4, for example. The algorithm takes in an image x with three colour channels. The image x is then transformed into a latent representation v via an encoder. The encoder may be a neural network comprised of several layers and which may downsample the representation and increase the number of channels. The latent representation is then further transformed by a hyperencoder (which may also be a neural network), into a hyperlatent (side-information) representation z. The hyperlatent is quantised into the quantised representation $\hat{z}$ via quantisation function Q, which takes in the hyperlatent and a fixed location parameter $\mu_z$. The quantised hyperlatent is converted to a bitstream via an arithmetic entropy encoder using fixed scale parameter $\sigma_z$ and location parameter $\mu_z$.

Next, the quantised hyperlatent $\hat{z}$ is transfbrmed with a hyperdecoder (again possibly as a neural network), which outputs location parameter $\mu_y$ and matrix $A_y$, the quantities needed for the implicit linear system (1.9). The matrix could have a special matrix structure, such as being a sparse banded matrix (a context matrix), a block matrix, being lower or upper triangular, or could come factorised into a matrix factorisation such as a LU or QR factorisation. The hyperdecoder also outputs a scale parameter $\sigma_y$ which will be used later in an arithmetic encoder. The ground-truth latent y, the scale $\mu_y$ and the context matrix $A_y$ are fed into an Implicit Encoding Solver. The Implicit Encoding Solver may be one of the iterative solvers discussed above, and outputs a quantised latent residual $\hat{\xi}$. This quantised residual is finally converted into a bitstream with an arithmetic encoder using the scale parameter $\sigma_y$.

Figure 5:
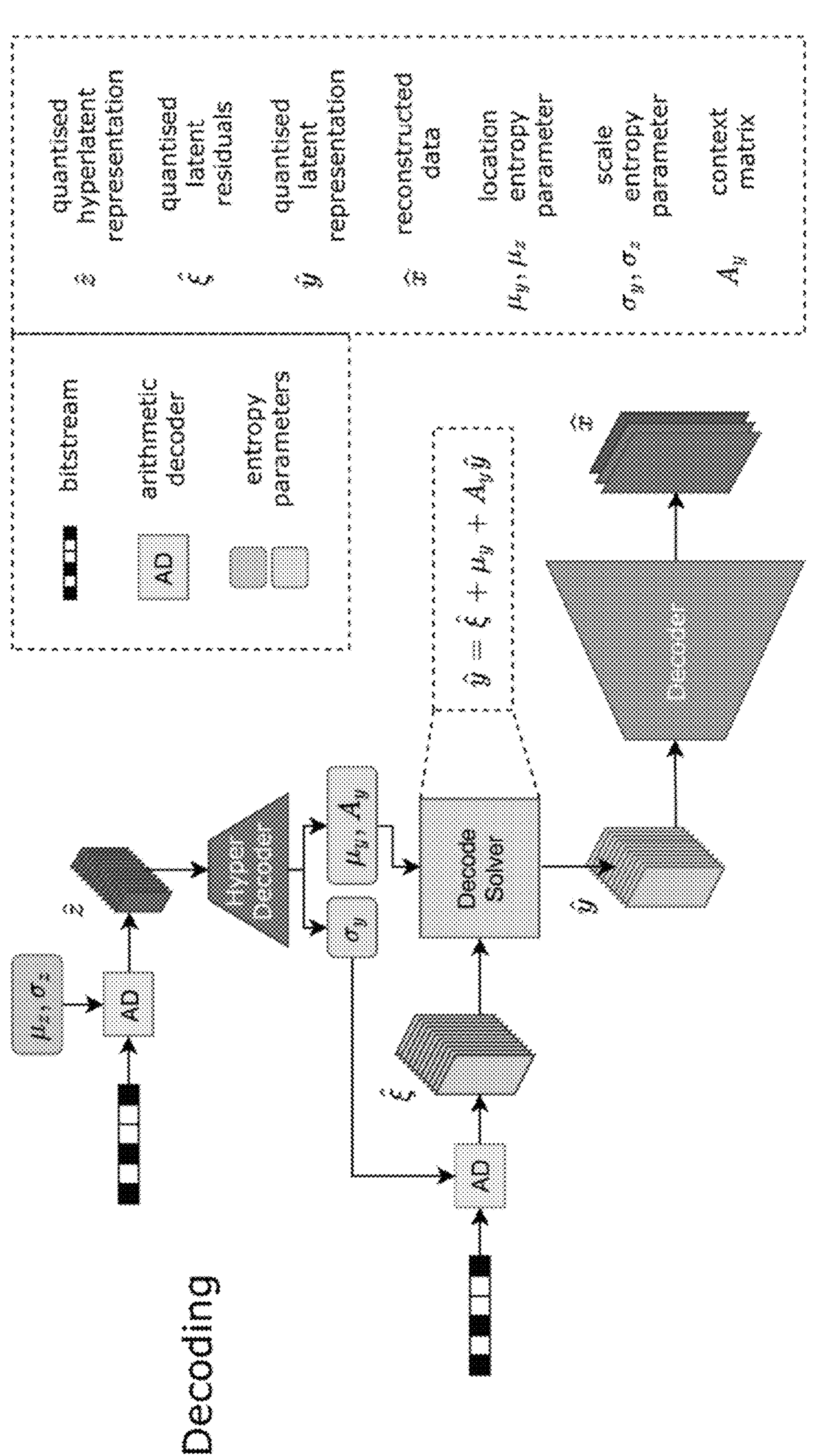
FIG. 5 shows a schematic diagram of an example decoding phase of an AI-based compression algorithm utilizing an implicit linear system (with corresponding Decode Solver), for video or image compression. Related explanation is provided in section 1.4.2.

The decoding algorithm is schematically depicted in FIG. 5 by way of example. In the decoding algorithm, the hyperlatent bitstream is first decoded into a hyperlatent $\hat{z}$ using fixed scale and location parameters $\sigma_z$ and $\mu_z$. The quantised hyperlatent is run through a hyperdecoder. The hyperdecoder outputs $\mu_y$ and matrix $A_y$, and a scale parameter $\sigma_y$. Using $\sigma_y$, an arithmetic decoder can convert the residual bitstream into a quantised residual $\hat{\xi}$. The Decode Solver is then used to find quantised latent $\hat{y}$ solving (1.12), and requires the matrix $A_y$, location $\mu_y$ and residual $\hat{\xi}$. Finally, having recovered quantised latent $\hat{y}$, a decoder is used to transform the quantised latent into the reconstructed image $\hat{x}$.

Figure 4:
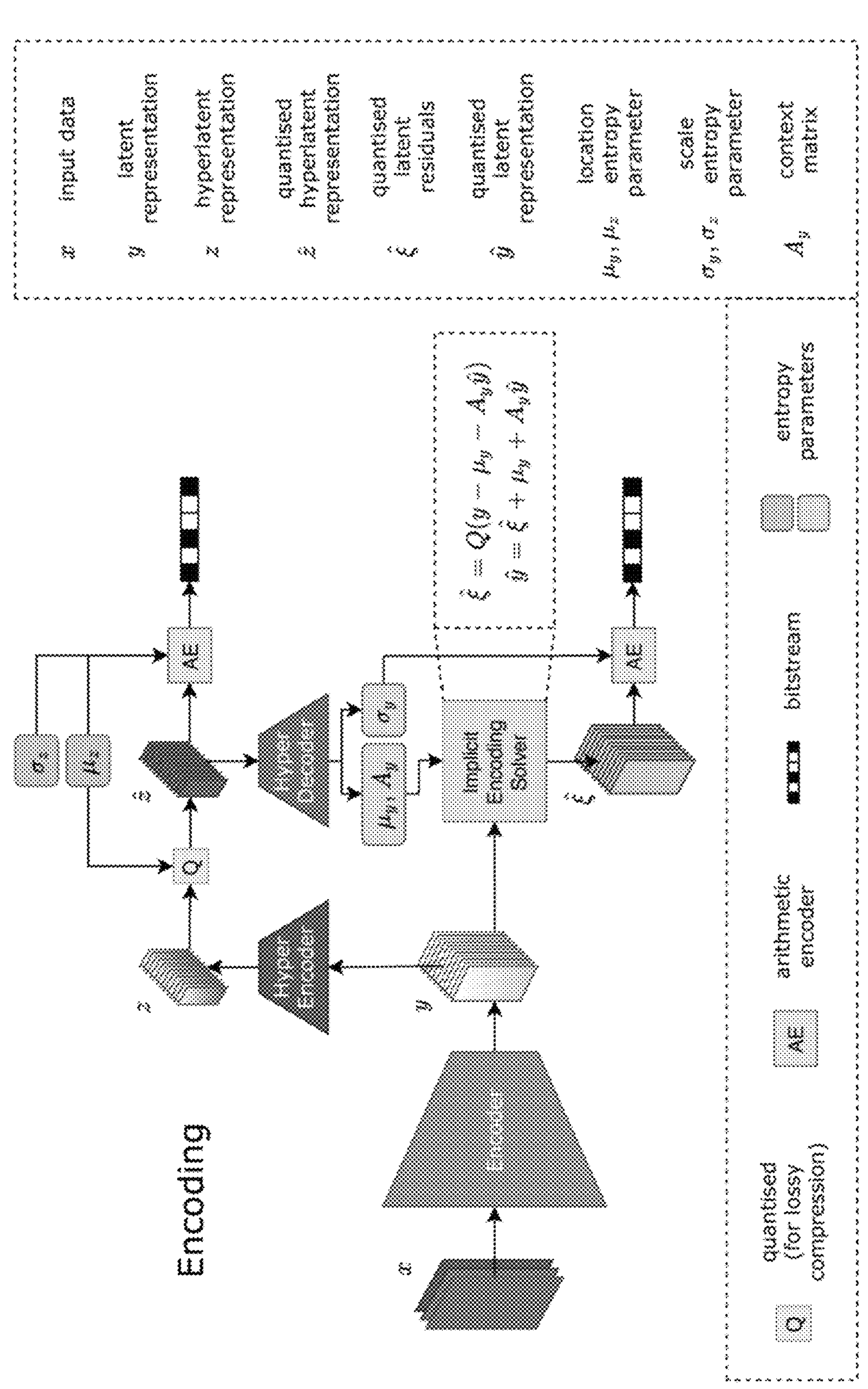
FIG. 4 shows a schematic diagram of an example encoding phase of an AI-based compression algorithm utilizing a linear implicit system (with corresponding Implicit Encoding Solver), for video or image compression. Related explanation is provided in section 1.4.2.

In a simple example, as illustrated in FIGS. 4 and 5, the parameters $\mu_z$ and $\sigma_z$ are the entropy parameters for the z hyperlatents. These parameters are globally defined at the initialisation of the network and optimised for over the course of network training. During inference, these parameters stay constant and are assumed to be shared across both encoding and decoding sides. In more complex scenarios, the entropy parameters pertaining to z hyperlatents and, if existent, higher-order latents, may also be outputted from neural networks (such as a hyperhyperatitoencoder) and the details of deriving these will be apparent to those skilled in the art.

For the network training of the exemplified AI-based compression algorithm, data samples from a training set can be passed through the described steps. The realised quantities and parameters are used to evaluate a loss function. which can be based on:

Differences between the reconstructed image and the input training image x, commonly referred to as a distortion or perceptual loss term;

The estimated length of the bitstream associated with all quantised latent quantities (including but not limited to $\hat{y}$ and $\hat{z}$), given by a cross-entropy term computed with the realised entropy parameters (the details of which is apparent to those skilled in the art), commonly referred to as a rate term.

1.5 Residual-Less Implicit Systems

We now turn to compression algorithms for AI-based video and image compression which forego the use of the residual $\xi$. In this setup, no residual is encoded, and an implicit system parametrised by side-information (hyperlatent) $\hat{z}$ is used to recover the variable $\hat{y}$. For example, we may need to solve the following system $$\hat{y}=\mu(\hat{z},\theta)+f(\hat{y},\hat{z},\theta) \tag{1.13}$$

where $f$ and $\mu$ are neural networks taking in parameters $\theta$ and side-information $\hat{z}$. Note that this system only operates at decode time, because no information is stored in the encoding phase. We emphasise the great appeal of this approach is the non-existent representation cost in the encoding phase: the variable $\hat{y}$ is represented entirely in an implicit form. The system (1.13) can be solved with any nonlinear implicit equation solver, such as an one of the iterative methods described above.

For example, the iterative procedure could be as follows. Begin with an initial guess $\hat{y}^0$, and for iterations k=0, . . . , N set $$\hat{y}^{k+1}=\mu(\hat{z},\theta)+f(\hat{y}^k,\hat{z},\theta \tag{1.14}$$

This is a type of iterated function system. One approach to training such a system is provided by the Collage Theorem. The Collage Theorem applied here states that, if $f$ is contractive in argument $\hat{y}$, with contraction factor s, then given any initial guess $\hat{y}^0$ and a large number of iterations N, then the distance between the ground-truth variable v and the Nth iterate is bounded by $$d(\hat{y}^N,y)\leq d(y,f(y)/(1-s) \tag{1.15}$$

where d is a distance metric such as mean squared error. One implication of this theorem is that during training we can optimise the right-hand side of (1.15).

Of course, (1.13) can be made linear in $\hat{y}$, in which case the system becomes $$\hat{y}=\mu(\hat{z},\theta)+A(\hat{z},\theta)\hat{y} \tag{1.16}$$

and which can be solved with any of the linear solvers described above. A particular matrix structure, as described in Section 1.4.1 may be placed on A to aid in the solution speed and modelling capacity of the system.

1.6 Relation to Other Work

Some links can be drawn between the implicit system equation solvers described herein and other compression methods. In particular, compression systems based off of partial differential equations (PDEs) may solve their PDE with an iterative method. These iterative methods are specially designed for the particular PDE being used, and may be slow to converge to a solution. Moreover, PDE-based compression methods are not competitive with the current state-of-the-art in video and image compression.

The context window described in Section 1.4.1 is a general notion of pixel context. In this sense, the intraprediction context used in other compression algorithms could be viewed as a particular type of context window. Similarly, lapped transforms, a method used in classical signal processing (mainly audio compression) in which encoding blocks overlap, bears some similarities to the context window, in that both use blocks or windows that overlap to some degree.

1.7 Concepts

1. The construction and parametrisation of implicit defined equation systems for use in AI-based image and video compression.
2. The utilisation of implicit defined equation systems for use in AI-based image and video compression. for example for ground-truth context during network training, reducing encode and decode times, and using different solvers in the encode and decode phases.

3. The placement of special structures on such systems, for example via linear implicit systems with special matrix structure in the linear system (such as context windows and banded structure, block-structure, and various matrix factorisations).
4. The techniques for solving these systems in an AI-based image and video compression pipeline, and the interplay between solution methods and the type of implicit system to be solved.

1.8 References

[1] Jorge Nocedal and Stephen J. Wright. "Numerical Optimization". *Springer Series in Operations Research and Financial Engineering Springer*, New York. 2nd edition (2006).

[2] Gene H. Golub and Charles F. Van Loan. "Matrix Computations". *The Johns Hopkins University Press*, Baltimore, 3rd edition (1996).

2. L-CONTEXT: AUTOREGRESSIVE PROBABILITY MODELS WITH LINEAR DECODING SYSTEMS FOR AI-BASED IMAGE AND VIDEO COMPRESSION

In AI-based compression, autoregressive context models have powerful entropy modelling capabilities, yet suffer from very poor runtime. due to the fact that they must be run in serial. Here we describe a method for overcoming this difficulty, by predicting autoregressive modelling components from a hyperdecoder (and conditioning these components on "side" information). This technique yields an autoregressive system with impressive modelling capabilities, but which is able to run in real-time. This real-time capability is achieved by detaching the autoregressive system from the model needed by the lossless decoder. Instead, the autoregressive system reduces to solving a linear equation at decode time, which can be done extremely quickly using numerical linear algebra techniques. Encoding can be done quickly as well by solving a simple implicit equation.

2.1 Introduction

In AI-based image and video compression, an input image x is mapped to a latent variable y. It is this latent variable which is encoded to a bitstream, and sent to a receiver which will decode the bitstream back into the latent variable. The receiver then transforms the recovered latent back into a representation (reconstruction) $\hat{x}$ of the original image.

To perform the step of transforming the latent into a bitstream, the latent variable must be quantised into an integer-valued representation $\hat{y}$. This quantised latent $\hat{y}$ is transformed into the bitstream via a lossless encoding/decoding scheme, such as an arithmetic encoder/decoder or range encoder/decoder.

Importantly, a lossless encoding/decoding scheme requires modelling a one-dimensional discrete probability mass function (PMF) for each element of the latent quantised variable. The optimal bitstream length (file size) is achieved when this model PMF matches the true one-dimensional data-distribution of the latents.

Thus, file size is intimately tied to the power of the model PMF to match the true data distribution. More powerful model PMFs yield smaller files sizes, and better compression. As the case may be, this in turn yields better reconstruction errors (as for a given file size, more information can be sent for reconstructing the original image). Hence, much effort has gone into developing powerful model PMFs (often called entropy models).

The typical approach for modelling one-dimensional PMFs in AI-based compression is to use a parametric one-dimensional distribution, $P(Y=\hat{y}_i|\theta)$, where θ are the parameters of the one-dimensional PMF. For example, a quantised Laplacian or quantised Gaussian could be used. In these two examples, θ comprises the location μ and scale σ parameters of the distribution. For example, if a quantised Gaussian (or a quantised Laplacian) was used, the PMF would be written $$P(Y = y_i \mid \mu, \sigma) = \int_{\hat{y}_i - \frac{\delta}{2}}^{\hat{y}_i + \frac{\delta}{2}} p(s \mid \mu, \sigma) ds. \tag{2.1}$$

Here $p(y|\mu, \sigma)$ is the continuous Gaussian (or Laplacian), and δ is the quantisation bin size (for integer quantisation, δ=1).

More powerful models are created by "conditioning" the parameters θ, such as the location μ or scale σ, on other information stored in the bitstream. In other words, rather than statically fixing parameters of the PMF to be constant across all inputs of the AI-based compression system, the parameters can respond dynamically to the input.

This is commonly done in two ways. In the first, extra side-information $\hat{z}$ is sent in the bitstream in addition to $\hat{y}$. The variable $\hat{z}$ is often called a hyperlatent. It is decoded in its entirety prior to decoding $\hat{y}$, and so is available for use in encoding/decoding $\hat{y}$. Then, μ and σ can be made functions of $\hat{z}$, for example returning μ and σ through a neural network. The one-dimensional PMF is then said to be conditioned on $\hat{z}$, and is given by $P(Y=\hat{y}|\mu(\hat{z}), \sigma(\hat{z}))$.

The other common approach is to use autoregressive probabilistic models. For example, PixelCNN has been widely used in academic AI-based compression papers. In this framework, context pixels are used to condition the location μ and scale σ parameters of the PMF at the current pixel. These context pixels are previously decoded pixels neighbouring the current pixel. For example, suppose the previous k pixels have been decoded. Due to inherent spatial correlations in images, these pixels often contain relevant information about the current active pixel. Hence, these context pixels may be used to improve the location and scale predictions of the current pixel. The PMF for the current pixel would then be given by $P(Y=\hat{y}_i|\mu(\hat{y}_{i-1}, \ldots, \hat{y}_{i-k}), \sigma(\hat{y}_{i-1}, \ldots, \hat{y}_{i-k}))$, where now μ and σ are functions (usually convolutional neural networks) of the previous k variables.

These two approaches, conditioning via either hyperlatents or with autoregressive context models, both come with benefits and drawbacks.

One of the main benefits of conditioning via hyperlatents is that quantisation can be location-shifted. In other words, quantisation bins can be centred about the location parameter μ. Using integer-valued bins, the quantisation latent is given as $$\hat{y} = \lfloor y - \mu \rceil + \mu \tag{2.2}$$

where $\lfloor \cdot \rceil$ is the rounding function. This yields significantly superior results to straight rounding, $\hat{y} = \lfloor y \rceil$. In addition, conditioning via hyperlatents can be implemented relatively quickly, with (depending on the neural network architecture). real-time decoding speeds.

The main benefit of autoregressive context models is the use of contextual information—the neighbouring decoded pixels. Because images (and videos) are spatially highly correlated, these neighbouring pixels can provide very accurate and precise predictions about what the current pixel should be. Most state-of-the-art academic AI-based compression pipelines use autoregressive context models due to their impressive performance results, when measured in terms of bitstream length and reconstruction errors. However, despite their impressive relative performance, they suffer from two fatal flaws.

First, they must be run serially: the PMF of the current pixel depends on all previously decoded pixels. In addition, the location and scale functions $\mu(\bullet)$ and a $\sigma(\bullet)$ are usually large neural networks. These two facts mean that autoregressive context models cannot be run in real-time, taking many orders of magnitude longer than computing requirements necessitated by real-time performance on edge devices. Thus, in their current state, autoregressive context models are not commercially viable, despite the fact that they yield impressive compression performance.

Second, due to the effects of cascading errors, autoregressive context models must use straight rounding ($\hat{y}=\lfloor y \rceil$). Location-shifted rounding ($\hat{y}=\lfloor y-\mu \rceil+\mu$) is not possible, because tiny floating point errors introduced early in the decoding pass can be amplified and magnified during the serial decoding pass, leading to vastly different predictions between the encoder and decoder. The lack of location-shifted rounding is problematic, and it is believed that when all other components being equal, an autoregressive model with location-shifted rounding (if it were possible to construct) would outperform a straight rounding autoregressive model.

Thus, there is a need to develop a PMF modelling framework that combines the benefits of conditioning on hyperlatents (fast runtime; location-shifted rounding), with the impressive performance of autoregressive modelling (creating powerful predictions from prior decoded context pixels).

This Section 2 outlines steps we have taken towards this end. A significant contribution of this Section 2 is a method which combines the major features of hyperlatent conditioning and autoregressive modelling, without either of their drawbacks.

2.2 L-Context

An innovation we have developed tackling this problem is to modify the hyperdecoder to additionally predict the parameters of an autoregressive model using a hyperdecoder. In other words, we condition the parameters of the autoregressive model on the hyperlatent 2. This is in contrast to the standard set-up in autoregressive modelling, where the autoregressive functions are static and unchanging, and do not change depending on the compression pipeline input.

We are primarily concerned with the following quasi-linear setup (in the sense that the decode pass is linear; while encode is not linear). In addition to the usual $\mu$ and $\sigma$ predictions, the hyperdecoder also outputs a sparse matrix L. called the context matrix. This sparse matrix is used for the autoregressive context modelling component of the PMF as follows. Given an ordering on the latent pixels (such as raster-scan order), suppose the previous k latent pixels have been encoded/decoded, and so are available for an autoregressive context modelling. Our approach is to use the following modified location-shifted quantisation: we quantise via $$\hat{y}_i = \left\lfloor y_i - \mu_i - \sum_{j=i-k}^{i-1} L_{ij}\hat{y}_j \right\rceil + \mu_i + \sum_{j=i-k}^{i-1} L_{ij}\hat{y}_j \tag{2.3}$$

The probability model is then given by $$P\left(Y = \hat{y}_i \middle| \mu_i + \sum\nolimits_{j=i-k}^{i-1} L_{ij}\hat{y}_j, \sigma_i\right).$$

In matrix-vector notation, we have that $$\hat{y}=\lfloor y-\mu-L\hat{y}\rceil+\mu+L\hat{y} \tag{2.4}$$

where here L is the sparse matrix outputted by the hyperdecoder. (Note that L need not be predicted, it could also be learned or static). Note that in the ordering of the latent pixels. L is a strictly lower-triangular matrix. We call this hybrid autoregressive-hyperlatent context modelling approach L-context.

Note that this is a form of autoregressive context modelling. This is because the one-dimensional PMF relies on previously decoded latent pixels. However we remark that only the location parameters rely on previously decoded latent pixels, not the scale parameters.

Notice that the integer values which are actually encoded by the arithmetic encoder/decoder are the quantised latent residuals $$\hat{\xi}_i = \left\lfloor y_i - \mu_i - \sum_{j=i-k}^{i-1} L_{ij}\hat{y}_j \right\rceil \tag{2.5}$$

Therefore, in decode, the arithmetic encoder returns from the bitstream not $\hat{y}$ but $\hat{\xi}$. Then, $\hat{y}$ must be recovered by solving the following linear system for $\hat{y}$ $$\hat{y}=\hat{\xi}+\mu+L\hat{y} \tag{2.6}$$

or put another way, by setting $\hat{y}=(I-L)^{-1}(\hat{\xi}+\mu)$.

Now, importantly, solving the system (2.6) is detached from the arithmetic decoding process. That is. whereas the arithmetic decoding process must be done serially as the bitstream is received, solving (2.6) is independent of this process and can be done using any numerical linear algebra algorithm. To emphasise, because this point is very important for run-time implications: the decoding pass of the L-context modelling step is not a serial procedure, and can be run in parallel.

Another way of viewing this result is to see that equivalently, the arithmetic encoder/demier operates on $\hat{\xi}$, which has location zero. That is, the arithmetic encoder operates not on they latents, but on the residuals $\hat{\xi}$. In this view, the PMF is $P(\Xi=\hat{\xi}|0, \sigma)$. Only after $\hat{\xi}$ is recovered from the bitstream do we then recover $\hat{y}$. However, since recovering $\hat{\xi}$ from the bitstream is not autoregressive (the only dependence being on $\sigma$, which has not been made context/autoregressive dependent), this procedure is extremely fast. Then, $\hat{y}$ can be recovered using highly optimised linear algebra routines to solve (2.6).

2.2.1 Solving the Encoding and Training Problem

In both encoding, and the training of L-context system, we must efficiently solve (2.4) for the unknown variable $\hat{y}$ which is not given explicitly, and must be determined. In fact, (2.4) is an implicit system. Here we outline several possible approaches to finding $\hat{y}$ satisfying (2.4).

The first approach is to solve (2.4) serially. operating on the pixels according to the ordering of their dependencies in the autoregressive model. In this setting, we simply iterate through all pixels in their autoregressive ordering, and apply (2.3) at each iteration to retrieve the quantised latent at the current iteration.

Since (2.4) is an implicit equation, the second approach is to employ an implicit equation solver, which we call an Implicit Encode Solver. This could be an iterative solver, which seeks to find the fixed point solution of (2.4).

Figure 6:
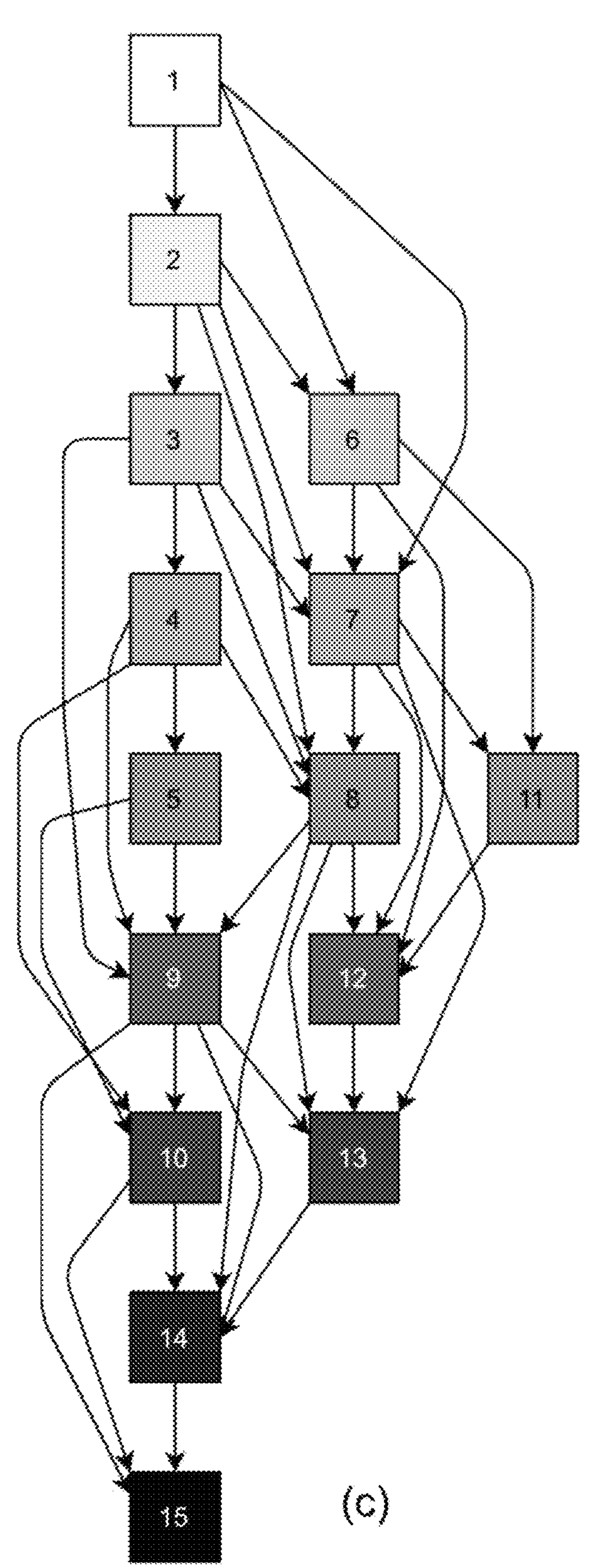
FIG. 6 shows a worked example of constructing a Directed Acyclic Graph (DAG) given dependencies generated by an L-context matrix. (a) shows the L-context parameters associated with the i-th pixel in this example. The neighbouring context pixels are those directly above the current pixel, and the left neighbour. (b) shows pixels enumerated in raster scan order. Pixels in the same level of the Directed Acyclic Graph are coloured the same. (c) shows the resulting DAG. Those pixels on the same level are conditionally independent of each other, and can be encoded/decoded in parallel.

Finally, in certain special cases, the autoregressive structure defined by the sparse context matrix L can be exploited to parallelise components of the serial decoding pass. In this approach, first a dependency graph (a Directed Acyclic Graph) is created defining dependency relations between the latent pixels. This dependency graph can be constructed based on the sparsity structure of the L matrix. Then, we note that pixels in the same level of the DAG are conditionally independent of each other. Therefore, they can all be calculated in parallel, without impacting the calculations of any other pixels in their level. Thus, in encode (and training), the graph is iterated over by starting at the root node, and working through the levels of the DAG. At each level, all nodes are processed in parallel. This procedure yields drastic speed-ups over a naive serial implementation when a parallel computing environment is available (such as on a Graphic Processing Unit or a Neural Processing Unit). For a pictorial depiction of an example of this procedure, refer to FIGS. 6 (*a*), (*b*) and (*c*).

2.2.2 Specialised Linear Equation Solvers in Decode

Many of the techniques described in the previous section can be applied at decode time as well. In particular, the linear equation $$\hat{y}=\xi+\mu+L\hat{y} \tag{2.7}$$

may be solved in any of the following ways.

Since the system is lower triangular, standard forward substitution may be used. This is analogous to the serial encoding step. For each pixel i in the decode ordering, the active pixel is given by $$\hat{y}_i = \xi_i + \mu_i + \sum_{j<i} L_{ij}\hat{y}_j$$

Alternately, any iterative numerical linear algebra routine may be used.

Finally, similar to in encode, a Directed Acyclic Graph may be constructed, modelling dependencies between the latent pixels. The Directed Acyclic Graph can be constructed given the sparsity structure of the matrix L. Then, similar to encode, the latents $\hat{y}$ are recovered from the residuals $\hat{y}$ by iterating through the layers of the DAG and processing all pixels of the level in parallel, using the linear decode equations.

2.3 Worked Example in an AI-Based Compression Pipeline

In this section we describe in detail the L-context module inside an AI-based compression pipeline.

Figure 7:
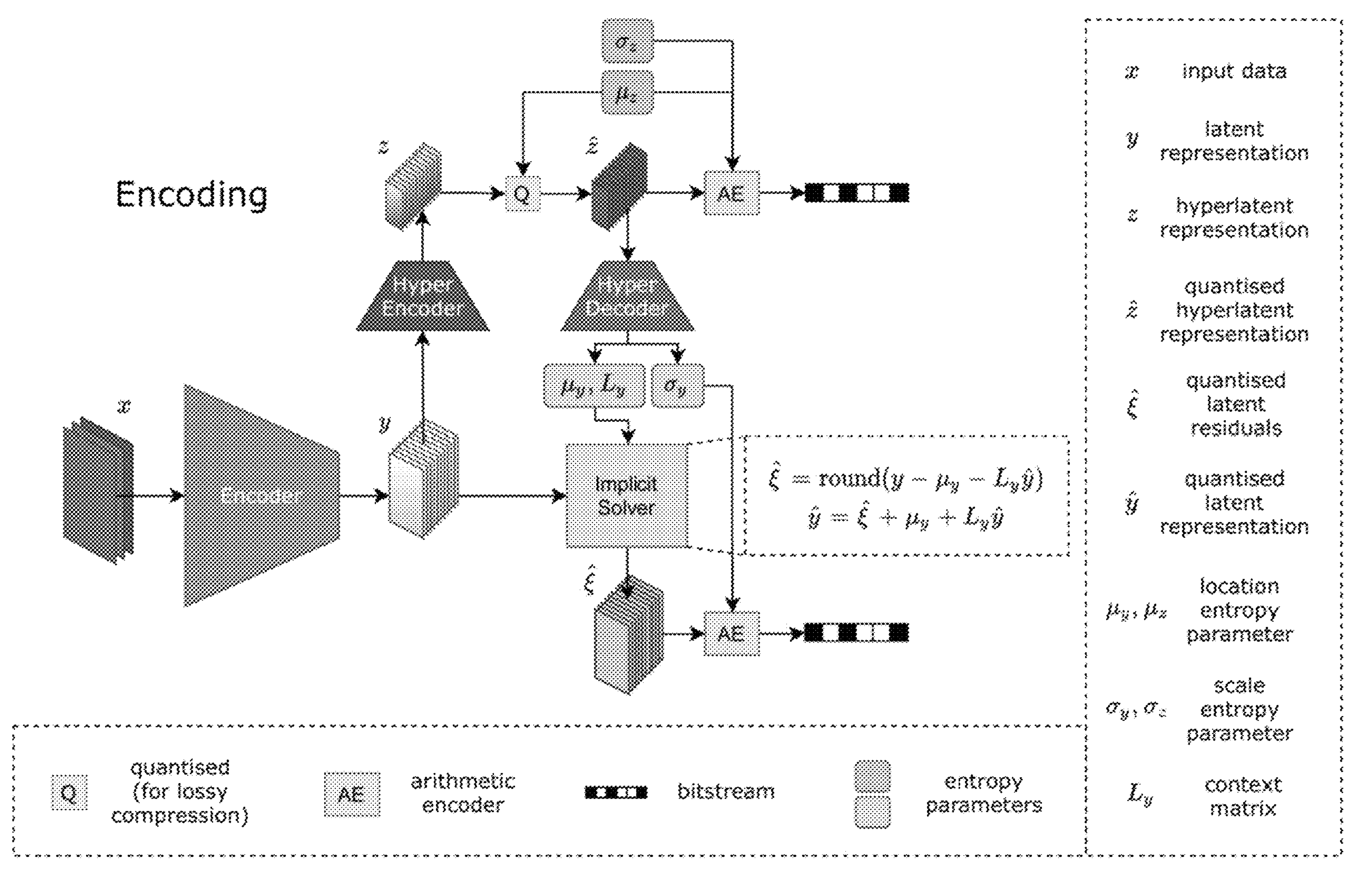
FIG. 7 shows an example encoding process with predicted context matrix Ly in an example AI-based compression pipeline. In this diagram a generic implicit solver is depicted, which could be any one of the methods discussed in Section 2.2.1, for example.

In encoding (refer to FIG. 7 for example) an input image $\hat{x}$ is fed through an Encoder function, such as a neural network. The encoder outputs a latent y. This latent is then fed through a hyperencoder, returning a hyperlatent z. The hyperlatent is quantised to $\hat{z}$ and sent to the bitstream via an arithmetic encoder using a 1D PMF dependent on learned location $\mu_z$ and scale $\sigma_z$, and a lossless encoder. Optionally (though not depicted in FIG. 7) a learned L-context module can also be employed in the entropy model on $\hat{y}$. The quantised hyperlatent is then fed through a hyperdecoder, which outputs parameters for the entropy model on y. These include location $\mu_y$, scale $\sigma_y$ and L-context matrix $L_y$. A residual is computed by solving the encoding equations using e.g. any one of the methods described in Section 2.2.1. This quantised residual $\xi$ is sent to the bitstream using a PMF with zero-mean and scale parameter $\sigma_y$.

Figure 8:
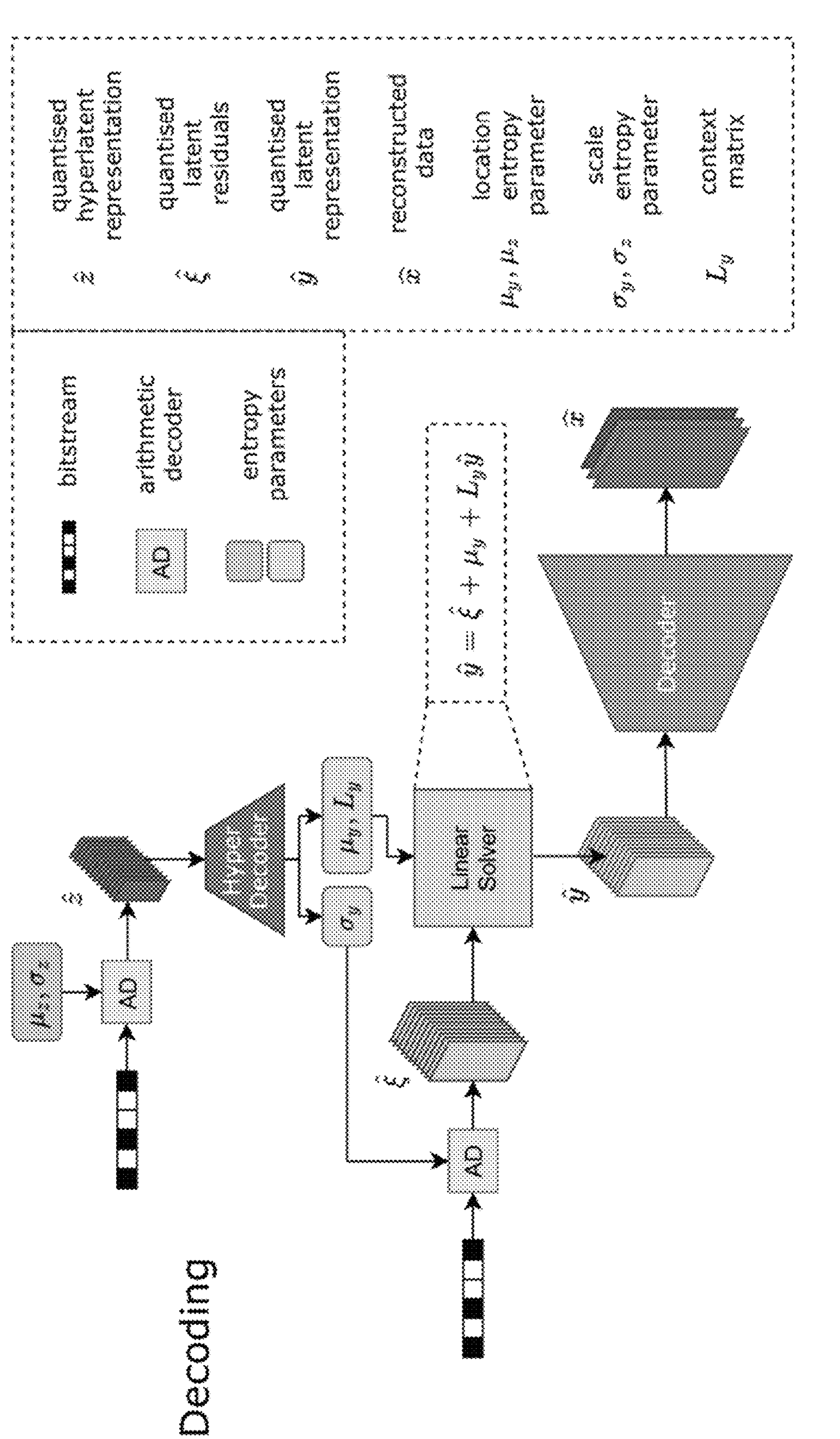
FIG. 8 shows an example decoding process with predicted context matrix Ly in an example AI-based compression pipeline. In this diagram a linear equation solver is depicted, which could be any one of the methods discussed in Section 2.2.2, for example.

In decoding (refer to FIG. 8 for example), first hyperlatents $\hat{z}$ are recovered from the bitstream using the one-dimensional PMF with learned location and scale parameters $\mu_z$ and $\sigma_z$, and a lossless decoder. Optionally (not depicted in FIG. 8) an L-context module could also be employed. if it was used in encode. The hyperlatents are fed through the hyperdecoder. which outputs location $\mu_y$, scale $\sigma_y$ and L-context matrix $L_y$. The residual $\xi$ is recovered from the bitstream using the lossless decoder, the zero-mean PMF and scale parameter $\sigma_y$. Then, the quantised latent is recovered by solving the linear decoding system, e.g. as described in Section 2.2.2. Finally, the reconstructed image is recovered by feeding the quantised latents $\hat{y}$ through a Decoder function, such as another neural network.

2.4 Extensions

Here we detail several possible extensions to L-context.

2.4.1 A-Context

In the previous sections, we have assumed L is lower-triangular, with respect to the decode ordering of the pixels. A generalisation is to relax this assumption, to a general matrix A, not necessarily lower-triangular. In this case, the encoding equations would be to solve $$\hat{y}=\lfloor y-\mu-A\hat{y}\rceil+\mu+A\hat{y} \tag{2.8}$$

and send $$\xi=\lfloor y-\mu-A\hat{y}\rceil \tag{2.9}$$

to the bitstream, via the PMF $P(\Xi=\xi_i|0, \sigma_i)$. At decode, after retrieving $\xi$ for the bitstream, the rounded latent is recovered by solving the following linear system for $\hat{y}$:

$$\hat{y}=\xi+\mu+A\hat{y} \tag{2.10}$$

2.4.2 Non-Linear Context

In general, the context functions could be non-linear. For example the encoding problem would be to solve $$\hat{y}=\lfloor y-\mu-f(\hat{y})\rceil+\mu+f(\hat{y}) \tag{2.11}$$

where $f$ is a non-linear function, which could be learned or predicted, such as a Neural Network with learned or predicted parameters. The rounded latent $\hat{y}$ is a fixed point of (2.11). This equation can be solved with any non-linear equation solver. Then, during encode the latent residuals $$\xi=\lfloor y-\mu-f(\hat{y})\rceil \tag{2.12}$$

are sent to the bitstream, via the PMF $P(\Xi=\xi_i|0, \sigma_i)$. At decode, the following non-linear equation is solved for $\hat{y}$ $$\hat{y}=\xi+\mu+f(\hat{y}) \quad (2.13)$$

One interpretation of this latter extension is as an implicit PixelCNN. For example, if $f(\cdot)$ has a triangular Jacobian (matrix of first derivatives), then (2.11) models an autoregressive system. However, (2.11) is more general than this interpretation, indeed it is capable of modelling not just autoregressive systems but any probabilistic system with both forward and backward conditional dependencies in the pixel ordering.

2.5 Concepts

- A quasi-linear, input-adaptive autoregressive context modelling system for entropy modelling in AI-based image and video compression, termed L-context, which conditions on previously decoded values and metainformation via hyperlatents.
- The parametrisation of components within such systems. for example context matrices and their associated structures; examples include sparse and banded lower- or upper-triangular matrices.
- The encoding and training processes of such implicit systems, including implicit equation solvers to find the fixed point solution of the iterative system and parallel procedures of conditionally independent components in the system.
- An extension to these systems, termed A-context, which relaxes the assumption of a triangular context matrix by generalising the context matrix structure to be of any arbitrary kind.
- An extension to these systems, termed non-linear context, in which the autoregressive system contains an arbitrarily defined non-linear function.

3. STOCHASTIC AUGMENTED LAGRANGIAN METHOD FOR AI-BASED IMAGE AND VIDEO COMPRESSION

3.1 Introduction

3.1.1 Rate-Distortion Trade-Off

The rate-distortion trade-off is a fundamental concept in lossy compression. When designing a lossy compression algorithm, two competing goals must be met. On one hand, the compression rate, measuring the size (in bits) of the compressed object (such as a video or image), must be small. On the other hand, the distortion between the ground-truth original object, and the recovered object, must also be small. These two objectives oppose each other as lower distortion typically corresponds to higher files sizes and vice versa. Deciding the relative importance of these two objectives is the so-called rate-distortion trade-off.

Currently the AI-based image and video compression community achieves a particular rate-distortion tradeoff by designing algorithms to minimise an objective function measuring the relative contribution of rate, denoted by R, and distortion D. The objective function is a sum of these two quantities with coefficients controlling the relative contribution of rate R and distortion D. That is, the objective function with its minimisation problem is written as $$\min L=\min \lambda_R R+\lambda_D D \quad (3.1)$$

where minimisation is taken over a set of compression algorithms, and $\lambda_R$ and $\lambda_D$ are the scalar coefficients controlling the relative importance of respectively the rate and the distortion to the overall objective.

For practical purposes, it is typical to either:

- Enforce a fixed allowed file size (rate) and optimise for minimal reconstruction error (distortion), or
- Enforce a fixed allowed distortion for reconstruction and optimise for minimal file sizes (rate)

The ability to reliably target a fixed rate or distortion, while minimising the complementary variable is critical for algorithm comparison in research, as well as for performance guarantees in production. An innovation that we present, the Stochastic Augmented Lagrangian method, solves this problem.

We note also that this is a complementary algorithm to that of Variable Rate Models, which perform a different type of rate targeting. A purpose of the Stochastic Augmented Lagrangian method is to reliably train deep neural networks for specified rate targets, averaged across a test set. However, while the average compression performance on the test set is guaranteed by the Stochastic Augmented Lagrangian method, individual images or video in the test set will deviate slightly from the overall average. A Variable Rate Model can then work in conjunction with the Stochastic Augmented Lagrangian method, because the Variable Rate Model's value is the ability to fine-tune an individual image or video in the test set to have a specific compression rate.

Then altogether, the optimisation problem described in Equation 3.1 is recast as a constrained optimisation problem. For example, if we target a fixed rate $r_0$, our optimisation problem is $$\min D, \text{subject to } R=r_0 \quad (3.2)$$

In the rest of this document we focus on the optimisation problem in Equation 3.15, where the innovations and algorithms can equally well be used for the case in which we could instead minimise rate R subject to a fixed constraint on the distortion D.

3.1.2 Augmented Lagrangian Method

A classical approach to solving constrained optimisation problems is the Augmented Lugrangian method. This method solves the generic constrained optimisation problem $$\min f, \text{subject to } g=c \quad (3.3)$$

by instead carrying out $$\min f+\lambda(g-c)+\frac{\mu}{2}(g+c)^2 \quad (3.4)$$

with some initial guess for λ, and then updating the Lagrange multiplier to be $\lambda^*=\lambda+\mu(g-c)$, and then repeatedly alternating the minimisation and multiplier updates until converged. μ is initially chosen to be small and is typically increased with each multiplier update.

The intuition behind this algorithm is that as the algorithm converges, $(g-c)\rightarrow 0$ and so the quadratic term in Equation 3.4 becomes significantly smaller than the other terms. Thus the original constrained optimisation problem is recovered, while simultaneously finding the optimal estimate for λ. This algorithm has strong theoretical guarantees for convergence and is standard in the literature on constrained optimisation.

Despite the strengths of the Augmented Lagrangian method, we cannot naively apply this method to our central goal of solving Equation 3.15 in the context of AI-based compression. In contrast with classical optimisation, it is infeasible to repeatedly alternate the minimisation and multiplier update steps in AI-based compression. because the minimisation step involves training deep neural networks for hours, days, or weeks.

An innovation is an algorithm that solves Equation 3.15 in a stable and robust manner in the context where the functions involved depend on deep neural networks trained on large amounts of data. This innovation draws strong inspiration from the classical Augmented Lagrangian method and so we call it the Stochastic Augmented Lagrangian method. This innovation is compatible with all standard variants of AI-based compression architectures (hypernetworks, hyperhypernetworks, etc., context models, adversarial objectives such as in GANs).

In fact, our innovation gives us the option to target many kinds of equality or inequality constraints in a stochastic (e.g. stochastic gradient descent (SGD)) optimisation problem. The description in this text is an example of how it can be used in AI-based Compression for targeting specific compression rate performance. However, the Stochastic Augmented Lagrangian method that we detail here works in all similar stochastic problems with equality or inequality constraints, even outside of AI-based Compression.

3.2 Innovation: Extension of the Augmented Lagrangian Method to the Stochastic Case Here we detail an innovation: the Stochastic Augmented Lagrangian method, for use for solving constrained optimisation problems involving deep neural networks in the context of AI-based compression. Our algorithm innovates upon the classic Augmented Lagrangian method (which is otherwise infeasible in this context) and also may include several modifications that improve stability and robustness for use in training deep neural networks.

First, we examine how the classical Augmented Lagrangian method is derived, which leads to the modifications we make for our method. Suppose we minimise $$\min L = \min D + \lambda(R - r_0) + \frac{\mu}{2}(R - r_0)^2 \tag{3.5}$$

for distortion D, rate R, and target rate $r_0$. The classical Augmented Lagrangian method prescribes that we perform the Lagrange multiplier update $$\lambda^* = \lambda + \mu(R - r_0) \tag{3.6}$$

The derivation of this multiplier update equation is as follows: if we have minimised the loss L, then the gradients w.r.t. all learnable parameters θ vanish:

$$\nabla_\theta L = 0 \tag{3.7}$$

Then from Equation 3.5, we have $$\theta = \nabla_\theta L = \nabla_\theta D + (\lambda + \mu(R - r_0))\nabla_\theta(R - r_0) \tag{3.8}$$

$$\Leftrightarrow \nabla_\theta D = -(\lambda + \mu(R - r_0))\nabla_\theta(R - r_0) \tag{3.9}$$

Thus if we set $\lambda^* = \lambda + \mu(R - r_0)$ as in the Augmented Lagrangian multiplier update rule (Equation 3.6), then we have $$\nabla_\theta D = -\lambda^* \nabla_\theta(R - r_0) \tag{3.10}$$

This says that $\lambda^*$ is the scalar that makes the gradients of the function we want to minimise collinear with the gradients of the constraint. In other words, this is precisely the definition of $\lambda^*$ being the Lagrange multiplier that solves the problem "minimise D subject to $R = r_0$," which was our original goal. So now we have a new λ and we can repeat the process of minimising L with the improved λ. Repeating this process has strong theoretical guarantees that we eventually find the optimal λ that enforces satisfying the constraint $R = r_0$ and minimises the distortion D.

Where does this go wrong for deep neural networks? The central problem is it takes a very long time to minimise L when training neural networks, so we cannot feasibly alternate minimising L and updating the estimate of the Lagrange multiplier. which is often clone many times in the classical algorithm. However, the above derivation does lead to our innovation for what we should do instead:

Since L is not minimised, we should modify the multiplier update equation to take a more conservative step in the direction of its current estimate of the optimal multiplier. That is, we do the following:

1. Take one optimiser step with e.g. SGD, mini-batch SGD, Adam (or any other optimisation algorithm used in training neural networks), with loss $$L = D + \lambda(R - r_0) + \frac{\mu}{2}(R - r_0)^2$$

2. Update the Lagrange multiplier: $\lambda \leftarrow \lambda + \epsilon\mu(R - r_0)$, where $\epsilon$ is chosen to be small.
3. Repeat 1, and 2, until converged.

This leads to numerous advantages:

1. If we naively alternated SGD etc. steps with multiplier updates without the inclusion of the factor $\epsilon$, μ would act as a type of "learning rate" for λ. This causes problems:
   - (a) We'd like p to be small (in contrast with the classical algorithm), so that the quadratic term in the loss function L has little effect during training and our exact rate-distortion problem is recovered at the end of training.
   - (b) If μ is too small, the multiplier takes e.g. hundreds of thousands or even millions of training iterations to converge (or never converges). This would make the algorithm unusuable for practical purposes.
   - (c) If μ is larger, then we change the training objective in a way that reduces the variance of the rate, which through the rate-distortion problem means an increase of variance of distortion. For AI-based compression in real-world applications, an increase in variance in distortion is not an acceptable result (the user that receives a distorted image is not comforted by the idea that on average images are not distorted—they want low variance in distortion)

The above concerns can cause the optimisation to be extremely sensitive to the choice of μ and outright fail in many cases. Instead, our decoupling of the learning rate for λ from μ through the introduction of the factor $\epsilon$ means that we can keep μ small, while the multiplier converges in a reasonable amount of time.
2. Casting the multiplier update as an iterative update rule with a decoupled learning rate naturally leads to extentions to other update rules, such as Adam. with "gradients" $\mu(R - r_0)$ and learning rate $\epsilon$. This leads to increased stability, adaptability, and is significantly more robust to variations in architectures, rate targets, and choices of hyperparameters in all of our tests.
3. The iterative update rule viewpoint for the multiplier updates also naturally leads to including "gradient clipping" on the multiplier "gradients" $\mu(R-r_0)$, as is common for SGD variants in Deep Learning.

4. We observe that since the quadratic term in the Augmented Lagrangian loss goes to zero rapidly during training, at the end of training $L \approx D+\lambda(R-r_0)$. But fixed constants don't affect optimisation problems and towards the end of algorithm training the multiplier A has converged and thus is effectively constant. So the objective we eventually optimise for is $L \approx D+\lambda R$, with fixed $\lambda$. This has the advantage that if we want to train a fixed $\lambda$ run to the same compression rate, the Stochastic Augmented Lagrangian method learns the correct $\lambda$ for us.
5. The fact that we ultimately optimise for $D+\lambda R$ at the end of training is critical, because this corresponds to the case where we are streaming data and we assume the receiver has a buffer. In real use cases, this is typically satisfied. An equivalent view is the equation stands for solving the NP-hard, discrete streaming with buffering problem using a simple approximation of quality levels (here solved by ultimately optimising for fixed $\lambda$ models, with the advantage that we don't need to know $\lambda$ ahead of time, it is learned).

We give an example of Stochastic Augmented Lagrangian method in detail:

Algorithm 3.1: Example pseudocode that outlines an example Stochastic Augmented Lagrangian method.

Inputs:
Data (a set of tensors, typically images or video): $\{x_1, \ldots x_n\}$
Encoder (typically a neural network) $f_\theta$
Decoder (typically a neural network) $h_\theta$
Learnable parameters to modify the encoder-decoder performance: $\theta$
A function measuring distortion of the data reconstruction: D
A function measuring compression rate: R
A target compression rate: $r_0$
An SGD-like optimizer (such as Adam) for the network parameters: $opt_\theta$
An SGD-like optimizer (such as Adam) for the Lagrange multiplier: $opt_\lambda$
Learning rate for the network parameter optimizer: $\eta$
Learning rate for the multiplier optimizer: $\epsilon$
Initialise Lagrange multiplier: $\lambda$
Loss function quadratic term weight: $\mu$
Training
while $\theta$ not converged do
for x in $\{x_1, \ldots, x_n\}$ do
$\hat{y} = f_\theta(x)$ (Encode the input data)
$\hat{x} = h_\theta(\hat{y})$ (Decode the encoded data)

$$L \leftarrow D(x, \hat{x}) + \lambda(R(\hat{y}) - r_0) + \frac{\mu}{2}(R(\hat{y}) - r_0)^2$$

(Calculate the Augmented Lagrangian loss)
$g_\theta \leftarrow$ backprop(L) (Calculate network parameter gradients with backprop)
$\theta \leftarrow$ step($opt_\theta(\eta, g_\theta)$) (Update network parameters with an optimizer step)
$g_\lambda \leftarrow \mu(R(\hat{y}) - r_0)$ (Calculate "gradients" for $\lambda$)
$g_\lambda \leftarrow$ clip($g_\lambda$, min = −1.5, max = 1.5) (Clip multiplier "gradients")
$\lambda \leftarrow$ step($opt_\lambda(\epsilon, g_\lambda)$) (Update $\lambda$ with an optimizer step)
end for
end while
end Typical values for the hyperparameters are $\mu = 10^{-4}$, $\eta = 10^{-3}$ or $10^{-4}$, $\epsilon = 10^{-4}$ or $10^{-5}$. $\lambda$ is initialised to be zero.

3.3 Innovations: Additional Extensions to the Stochastic Augmented Lagrangian Method Here we detail some additional modifications we make to the Stochastic Augmented Lagrangian method to improve robustness, stability, and usability.

3.3.1 Distortion Scaling

Compression algorithms must work across a variety of compression rate targets and distortion levels. Changing the rate target substantially can result in the distortion varying by an order of magnitude or more via the rate-distortion trade-off. Thus, in AI-based compression, training neural networks to different rate targets with the Stochastic Augmented Lagrangian method can result in substantial changes in scale of the loss function. This is equivalent to modifying the learning rate of the SGD (or variant) optimizer used to trained the neural network's parameters. This is undesirable, because it may mean the practitioner needs to perform a hyperparameter search for the learning rate (requires training the network multiple times) each time they design a new model, use a new distortion loss, or choose a substantially different target rate.

An innovation is to include an additional feature in the Stochastic Augmented Lagrangian method that ensures the loss function is roughly of the same scale, no matter the target rate. This means that the practitioner does not need, or rarely needs if ever, to adjust the learning rate and the Stochastic Augmented Lagrangian method works "out of the box."

To achieve this, we:

- Keep a set images from the same distribution as the images used to train the compression algorithm, precompressed to a range of target rates (compressed using another algorithm, classical or AI-based).
- At the start of training we compute the distortion on the hold-out set most close to the rate target planned for the current training run (or two nearest and interpolate).
- We scale the distortion term in the Stochastic Augmented Lagrangian method using this rough estimate of the distortion so that the distortion is of a desired scale (usually chosen to be $\approx D/s \approx 1/2$).
- During training we store a running average of the distortion (possibilities: arithmetic mean, median, geometric mean, harmonic mean, exponential moving average, smoothed moving average, linear weighted moving average).
- Periodically (every 100 k iterations for example) for the first I million iterations (or some warmup period) we modify the distortion scaling constant s and rescale the Lagrange multiplier $\lambda$ using our running estimate of the distortion so that the expected scaled distortion is roughly ½ (or other desired scale).

3.3.2 Test Target

Using a constrained optimisation algorithm such as the Stochastic Augmented Lagrangian method, we are able to target a specific average constraint (such as rate) target $r_0$ on the training data set. However, converging to that target constraint on the training set does not guarantee that we will have the same constraint satisfied on the test set. This may be caused for example by changes between the quantisation function used in training and the one used in inference (test/validation). For example it is common in AI-based compression to quantise using uniform noise during training, but use integer rounding in inference. Ideally, the constraint would still be satisfied in inference, however it is common for the constraint to be violated in inference due to the differing quantisation scheme. As a solution, we provide the following extensions to the Stochastic Augmented Lagrangian method:

- At each training step, compute the constraint target value using the inference quantisation value in the forward pass, but in the backward pass (gradient computation) the training quantisation value is used. For instance, when discussing a rate constraint, the value $R_{noisy}+(R_{round}-R_{noisy})$.detach( ) is used, where "detach" stands for removing the value from the automatic differentiation graph used to backpropagate gradients for network parameter updates.
- Alternatively, we may update the Stochastic Augmented Lagrangian method's parameters on "hold out set" images, on which the model is evaluated using the same quantisation settings as in inference.

3.3.3 Stochastic Augmented Lagrangian Method Algorithm Including Extensions

Here we present the Stochastic Augmented Lagrangian method with the described extensions necessary for adjusting for distortion scale changes and targeting inference behaviour while training:

Algorithm 3.2: Example pseudocode that outlines an example Stochastic Augmented Lagrangian method, extended to include adaptive loss scaling and inference constraint targeting.

```
Inputs:
  Data (a set of tensors, typically images or video): {x_1, . . . , x_n}
  Encoder (typically a neural network) f_θ
  Decoder (typically a neural network) h_θ
  Learnable parameters to modify the encoder-decoder performance: θ
  A function measuring distortion of the data reconstruction: D
  A function measuring compression rate: R
  A target compression rate: r_0
  An SGD-like optimizer (such as Adam) for the network
  parameters: opt_θ
  An SGD-like optimizer (such as Adam) for the Lagrange
  multiplier: opt_λ
  Learning rate for the network parameter optimizer: η
  Learning rate for the multiplier optimizer: ϵ
  Initialise Lagrange multiplier: λ
  Loss function quadratic term weight: μ
  Parameter(s) for running average of scaled distortion (if needed):
  β
  Quantisation function for training (typically noise quantisation):
  Q_train
  Quantisation function for inference (typically integer rounding):
  Q_inference
Training
  s ← 2D_0(x, x̂) (Initialise distortion scaling estimate using hold
  out set)
  while θ not converged do
    for x in {x_1. . . , x_n} do
      y = f_θ(x) (Encode the input data)
      ŷ = Q_train(y) + (Q_inference(y) −
      Q_train(y)).detach( ) (Inference quantisation targeting)
      x̂ = h_θ(ŷ) (Decode the encoded data)

      L ← D(x, x̂)/s + λ(R(ŷ) − r_0) + (μ/2)(R(ŷ) − r_0)^2

      (Calculate the Augmented Lagrangian loss)
      g_θ ← backprop(L)
      (Calculate network parameter gradients with backprop)
      θ ← step(opt_θ(η, g_θ)) (Update network parameters with an
      optimizer step)
      g_λ ← μ(R(ŷ) − (Calculate "gradients" for λ)
      g_λ ← clip(g_λ, min = −1.5, max = 1.5)
```

-continued

Algorithm 3.2: Example pseudocode that outlines an example Stochastic Augmented Lagrangian method, extended to include adaptive loss scaling and inference constraint targeting.

```
      (Clip multiplier "gradient")
      λ ← step(opt_λ(ϵ, g_λ)) (Update λ with an optimizer step)
      RA ← βRA + (1 − β)D(x, x̂)/s (Store a running average
      of the scaled distortion)
      if train_iteration ≡ 0 (mod 100,000) and
      train_iteration < 1,000,000
        s ← 2sRA (Adjust distortion scaling)
        λ ← λ/(2RA) (Rescale multiplier to match adjusted
        distortion scaling)
    end for
  end while
end
```

Typical values for the hyperparameters are $\mu = 10^{-4}$, $\eta = 10^{-3}$ or $10^{-4}$, $\epsilon = 10^{-4}$ or $10^{-5}$. λ is initialised to be zero. If using e.g. an exponential moving average for the running average of scaled distortion, β = 0.99 or 0.999.

3.4 Innovation: Decaying Scale Threshold

The Stochastic Augmented Lagrangian method carries an additional advantage in that the strength of the rate term in the rate-distortion loss starts small and increases during training. This can cause neural network training to avoid bad local minima, resulting in improved overall performance compared to the case where the weighting of the rate term in a rate-distortion loss is large throughout training.

Here we detail a related innovation that we've developed to achieve a similar objective (avoidance of bad local minima), through a similar mechanism (annealing of critical parameters during training).

In AI-based compression, data is usually encoded by a neural network into a latent variable, then further compressed using a lossless compression algorithm. These algorithms depend on a so-called "entropy model," which models the probability distribution of the latent space. The parameters for the entropy model ("entropy parameters") are learned internally within the network (either directly or predicted with a "hyperprior" structure, but not limited to these methods). The entropy parameters are most commonly comprised by a location parameter and a scale parameter (which is often expressed as a positive real value), such as (but not limited to) the mean μ and standard deviation σ for a Gaussian distribution, and the mean p and scale σ for a Laplacian distribution. Naturally, there exist many more distribution types, both parametric and non-parametric, with a large variety of parameter types. The decaying scale thresholding technique is applied in particular, but not exclusively, to the scale parameter in question; more generally, to a parametrisation of the notion of "certainty" or "narrowness" in the entropy model. Good training conditions are vital for the network to tune its parameters accordingly in order to achieve a good general performance level. One of these conditions is through a decaying scale thresholding technique, which Deep Render's research has shown gives certain types of networks a roughly 5% performance increase (in terms of test loss) compared to an equivalent network without this feature.

Description of the (e.g. exact) nature, as well as the practical implementation, of examples of this technique forms the basis of this section.

The values representing the scale parameter, σ, of a parametric entropy model (such as Gaussian or Laplacian) are commonly restricted to the positive real line, i.e. $\sigma \in \mathbb{R}$. When σ is learned via network training, the designer of the network must often actively enforce this restriction in order to avoid training instabilities (since division with this quantity is often pertinent in training, which results in an undefined value if the divisor equals zero). There exist multiple ways to enforce this restriction, including (but not limited to):

Thresholding all realisations of $\sigma$ to a certain value t; for example, if t=0.1:

$$\sigma = [-1.2, 0.2, -0.5, 1.7] \xrightarrow{t=0.1} \sigma_t = [0.1, 0.2, 0.1, 1.7] \tag{3.11}$$

where $\sigma_t$ are the thresholded realisations of $\sigma$.

Mapping all realisations of $\sigma$ with functions of a strictly positive codomain (for a defined domain), such as the softplus operation, squaring operation (with thresholding) or the absolute value operation (with thresholding).

The decaying scale thresholding technique entails enforcing the strictly positiveness property of the scale parameter $\sigma$ with a progressively decreasing thresholding value t during the course of training. This entails setting $t=t_0$ in the beginning of training, and gradually reducing its magnitude until, in most cases but not all, a final value $t=t_f$ has been attained (note that this does not imply that training has completed). The magnitude of t at any given point during training is relative to the magnitude of the scale parameters regulated by it. The decaying process can also either be fixed or variable.

Examples of fixed decaying processes of t include (but are not limited to):

Decaying t linearly with respect to the number of training iterations (data propagations and parameter updates), such that $$t_i = \max(t_0 - i\alpha, t_f) \tag{3.12}$$

where i is the training iteration index and $\alpha$ is a predefined decaying factor.

Decaying t exponentially with respect to the numher of training iterations, such that (using the same notation as previously)

$$t_i = (t_0 - t_f)e^{-i\alpha} + t_f \tag{3.13}$$

Other similar processes with analogous functionality as the aforementioned.

Examples of variable decaying processes of t include (but are not limited to):

Decaying t with respect to the loss metric, such as reducing it for each iteration that a new lowest loss level is achieved Decaying t with respect to any quantifiable metric that is retrievable during training, in similar fashion as above.

3.5 Concepts

1. Targeting a fixed rate while minimising distortion (or vice versa) in AI-based compression.
2. Infeasibility of classical algorithms for constrained optimisation involving neural networks.
3. Modifying the classical Augmented Lagrangian method to have an SGD-like learning rule (particularly useful: an Adam learning rule), resulting in the creation of the Stochastic Augmented Lagrangian method.
4. Innovation of adaptive distortion and Lagrange multiplier scaling in the Stochastic Augmented Lagrangian method, to enforce similar training learning rates across a variety of constrained optimisation objectives in AI-base Compression.
5. Computation graph modification so that the rate constraint inference behaviour can be targeted in training, where training and inference behaviour often differ in AI-based compression.
6. Advantages of the Stochastic Augmented Lagrangian method: reliable constraint enforcement, stability, robust to variations in hyperparameters, recover original rate-distortion objective as the loss is minimised, rate term is slowly increased in importance during training (which helps avoid bad local minima compared to fixed importance throughout training).
7. The Stochastic Augmented Lagrangian method is complementary to Variable Rate Models, where the former allows us to target average performance across a test dataset, while the latter allows us to line-tune performance on individual datapoints in a dataset once average performance on the dataset is guaranteed.
8. The Stochastic Augmented Lagrangian method allows us to extract the correct Lagrange multiplier $\lambda$ for the corresponding target compression rate of a loss $L=D+\lambda R$.
9. Because the Stochastic Augmented Lagrangian method eventually optimises for the equivalent loss to a fixed multiplier runs with the same target rate performance, this has the advantage of corresponding to optimising for streaming data with buffering, which is the primary use case in production.
10. Decaying scale threshold: scale thresholding is annealed during training instead of being fixed, similarly aiding in avoiding bad local minima.
11. We detail the Stochastic Augmented Lagrangian method and the decaying scale threshold technique in the context of AI-based compression, but they work perfectly well in other settings. For example, any time there is a stochastic optimisation problem subject to some equality or inequality constraints, the Stochastic Augmented Lagrangian method can be used.

3.6 Generalization: Solving Constrained Optimization

The previous discussion fits into a more general framework of solving a constrained optimization problem. Recall that the problem typically solved in AI-based compression is to minimize some combination of rate R and distortion D (see e.g. equation (3.1)), where the tradeoff between rate and distortion has been fixed before even running the optimisation (training) algorithm. The tradeoff is set by picking scalar parameters $\lambda_R$ and $\lambda_D$, which control the relative importance of the two terms. In this standard approach, the optimisation (training) problem is $$\min_\theta \lambda_R R + \lambda_D D \tag{3.14}$$

The main problem with this approach is that the compression rate is unknown beforehand. In other words, only after the optimization algorithm (training) has been performed do we know what the average compression rate actually is. This is problematic. because it means to achieve a target compression rate (called the target rate $r_0$), then many different optimization problems must be solved, each problem having a different rate-distortion tradeoff (via the scalars $\lambda_R$ and $\lambda_D$). This is an extremely inefficient procedure and does not scale well to large datasets (eg video).

Therefore, the overarching goal of Section 3 is to completely recast the training problem as one of constrained optimization. Given a target compression rate $r_0$, we seek to minimize distortion, subject to the constraint that the average model compression rate be equal to the target compression rate. In mathematical terms, we will solve $$\min_\theta D \quad \text{subject to } R = r_0 \tag{3.15}$$

Note that the constraint can be rearranged and transformed, so that for example the constraint could read $0=R-r_0$, or $f(R)=f(r_0)$ where $f$ is a monotone function such as the logarithm function.

There are many possible optimisation algorithms for solving this problem. The Augmented Lagrangian is one such method. For a review of constrained optimisation algorithms we recommend [1, Chapters 12 & 17] (for general purpose algorithms), and [11, Chapter 15] (for first-order methods).

How do constrained optimisation algorithms solve (3.15)? Almost all work by introducing the Lagrangicuz. This is a way of taking the equaility constraint and putting it into a single objective function, by introducing additional Lagrange multipliers. By way of illustration, the Lagrangian for (3.15) is $$\mathcal{L}(\theta,\lambda):=D+\mu(R-r_0) \tag{3.16}$$

It can be shown that solving (3.15) is equivalent to solving a minimax problem $$\min_\theta \max_\lambda \mathcal{L}(\theta, \lambda) \tag{3.17}$$

This minimax problem is typically what people actually solve when they tackle constrained optimization problems. Under the hood, this is what the Augmented Lagrangian is doing as well.

How do minimax optimisation algorithms work? Usually by alternating a descent step in θ (the outer minimization problem), followed by an ascent step in λ. These steps could be performed simultaneously as well (they need not alternate). In machine learning. it is typically easiest if these steps are derived using gradients of the Lagrangian (with respect to θ and λ). In general, more complicated updates can be used, for example using second-order Hessians (in which case quasi-Newton update rules could be employed). Pseudocode outlining this procedure is provided below in Algorithm 3.3.

Algorithm 3.3: Example pseudocode that outlines the general procedure of solving a constrained optimisation problem (with target rate), by reformulating the problem as a minimax of the Lagrangian. Lagrange multipliers are updated via ascent steps (solving the inner maximization problem) while network parameters are updated via descent steps (solving the outer minimization problem). The Lagrangian defined here is just one example Lagrangian incorporating the equality constraint.

-continued

Algorithm 3.3: Example pseudocode that outlines the general procedure of solving a constrained optimisation problem (with target rate), by reformulating the problem as a minimax of the Lagrangian. Lagrange multipliers are updated via ascent steps (solving the inner maximization problem) while network parameters are updated via descent steps (solving the outer minimization problem). The Lagrangian defined here is just one example Lagrangian incorporating the equality constraint.

```
Inputs:
  Data (a set of tensors, typically images or video): {x_1,...,x_n}
  Encoder (typically a neural network) f_θ
  Decoder (typically a neural network) h_θ
  Learnable parameters to modify the encoder-decoder performance: θ
  A function measuring distortion of the data reconstruction: D
  A function measuring compression rate: R
  A target compression rate: r_0
  A Lagrangian ℒ(θ,λ)
  Initialise Lagrange multiplier λ and learnable parameters θ
Training
  while θ and λ not converged do
    for x in {x_1,...,x_n} do
      ŷ = f_θ(x) (Encode the input data)
      x̂ = h_θ(ŷ) (Decode the encoded data)
      ℒ ← D(x,x̂) + λ(R(ŷ) − r_0) (Calculate the Lagrangian )
      update θ via a descent step of the Lagrangian with respect to
      network parameters
      update λ via an ascent step of the Lagrangian with respect to λ
    end for
  end while
end
```

3.7 References

[1] Jorge Nocedal and Stephen J. Wright. "Numerical Optimization". *Springer Series in Operations Research and Financial Engineering Springer*, New York, 2nd edition (2006).

[11] Amir Beck. "First-order methods in optimization". *Society for Industrial and Applied Mathematics*, Philadelphia. (2017).

4. STATISTICAL DEEP FEATURE LOSSES FOR IMAGE COMPRESSION

4.1 Introduction

Herein, we detail an outline of an approach to evaluate reconstruction quality of images in a (generative) autoencoder image compression framework. In contras to traditional image metrics that perform comparisons in image space, we compare images in a latent feature space, derived from the activations of another artificial neural network.

In the wider generative modelling community, these feature maps are commonly compared using the $L^1$ or $L^2$ norm between features of the respective feature map sharing a spatial indexing. Here we eschew this approach, and do not confine the comparison of feature maps to spatially related features. Instead we compare the feature maps with a statistical distance (either contextual or adversarial loss) that is a more general loss, taking into consideration infra- and inter-image distributions.

In this way—and in contrast to the existing compression literature—we seek to obtain a shared semantic similarity between images. We observe that this approach leads to strongly improved perceived visual quality of the reconstructed images.

Traditional image metrics used in learnt image and video compression (e.g. MSE, PSNR, etc.) compare ground truths and reconstructions pixel-to-pixel in image space. The pixel-to-pixel comparison is assuming that the images are aligned and the same region of both images is accounting for the same semantic feature. These metrics are sensitive to image transformations, such as rotating, shifting, colour shifting and so on. However, the Human Visual System (HVS) is generally less sensitive to such distortions. Thus. the pixel-to-pixel metrics in image space are poorly correlated with the HVS.

In order to solve this problem we utilize statistical distances between representations of the images in some latent feature space. The statistical losses we use are the contextual loss and the adversarial loss, which both stem from statistical divergences between probability distributions. Images are represented in different latent spaces, derived from both supervised and unsupervised machine learning techniques. With this method we seek to align more closely with the HVS.

Our experiments prove that introducing statistical distances in latent spaces significantly improves perceived image quality of the reconstructed image when used for image and video compression.

4.2 Method Examples

In this section we describe the two important aspects of our reconstruction quality metric, namely latent feature spaces and statistical distances.

4.2.1 Latent Spaces and Deep Features

Traditionally image and video compression metrics compare images in image space. Recent research [3] suggests that one can take advantage of a pre-trained artificial neural network (ANN) in order to map the images to some latent feature space, which can produce higher-level features better suited for comparison.

We begin by considering a (generative) autoencoder compression framework. Let us represent this as the function $f_\theta(x)=y$, where x is our input image, y is our reconstructed image and θ are the parameters of the autoencoder.

When calculating distortion between x and its compressed reconstruction y, one promising solution to use is the internal activations of an ANN (instead or as well as of the images) [3], trained for some other learning task (e.g. image classification). as feature embeddings [3]. Given the inherently differentiable nature of ANNs, this distance can then be differentiated, with the resulting gradients used to update the parameters of $f_0$ by gradient based optimisation.

Here an input image x and its compressed reconstruction y are independently passed through an ANN model $g_\phi$ with fixed parameters ϕ (e.g. VGG network, or any other deep pre-trained network), pre-trained for classification purposes on ImageNet (or any other suitable task). Internal activation layers of the model. which we henceforth call feature maps or feature embeddings, are extracted and used for the means of comparison. When $g_\phi$ consists of or comprises many layers we call these features deep features.

More formally, the training of our compressive autoencoder operates as follows, x and y are passed through the ANN $g_\phi$ to produce the features in our latent space.

$$g_\phi(x)=\tilde{x} \tag{4.1}$$

$$g_\phi(y)=\tilde{y} \tag{4.2}$$

Note: $\tilde{x}$ and $\tilde{y}$ can contain features from multiple different layers and channels of the activations of the network $g_\phi$. Thus we can think of $\tilde{x}$ and $\tilde{y}$ as all the output of the network $g_\phi$ that we use in our feature embedding.

Example 1: $\tilde{x}$ might only contain the activations from after the 5th max pooling layer of the VGG16.

Example 2: $\tilde{x}$ can contain all activations after the 2rd and 3rd VGG16 block.

There are several aspects of this approach that are worth adjusting for optimal compression efficiency. These are listed bellow:

Features from early vs. later layers

As we have already noted, instead of just comparing the feature maps at a certain layer of the ANN, we can consider multiple layers. This helps the comparison be more holistic and consider both lower and higher level features. The different techniques of comparing multiple layers are described separately for the two statistical distances we consider.

Type of features

Normally, features are derived from layers of a differentiable supervised model, such as a VGG network trained for classification on a dataset (e.g. ImageNet). However, we don't limit ourselves to supervised approaches, and we can also use unsupervised methods. As an example, the latent representation could be obtained from the encoder part of a Variational Auto-Encoder (VAE) trained on another dataset. Another possibility for go is the encoder part from other learnt compression pipelines.

4.2.2 Statistical Losses

So far we have described how to derive the feature embedding from our latent space. The distance between these embeddings is commonly measured in Euclidean space, and averaged over all features. For instance, one might use a pixel-wise loss like mean-squared error (MSE) or peak signal-to-noise ratio (PSNR) to quantify the measure of perceptual distortion. Whilst this reliably produces plausible reconstructions, it is well-known to correlate poorly with the human visual system (HVS). Indeed, what we would prefer is a differentiable measure of reconstruction quality that correlates perfectly or extremely well with the perceived visual quality of the HVS.

The following section describes the two statistical distances that we use on the feature embeddings, in examples.

Contextual Loss

General Outline

Here we adopt the approach detailed in [5], and apply it to learned image compression. As opposed to the approach detailed in [3], this method seeks to preserve natural image statistics such that they are not strictly required to preserve spatial positioning. In this way—and as discussed in [6]—we can traverse the distortion-perception trade-off, and produce visually pleasing reconstructions.

For contextual loss we divide our feature embeddings $\tilde{x}$ and $\tilde{y}$ into feature vectors of equal lengths. Let's enumerate these feature vectors from 1 to N:

$$\tilde{X} = \{\tilde{x}_i\}_{i=1}^{N} \tag{4.3}$$

$$\tilde{Y} = \{\tilde{y}_i\}_{i=1}^{N} \tag{4.4}$$

where $\text{size}(\tilde{x}_1)=\ldots=\text{size}(\tilde{x}_N)=\text{size}(\tilde{y}_1)=\ldots=\text{size}(\tilde{y}_N)$. Thus, we define $\tilde{X}$ and $\tilde{Y}$ as the sets of latent features (they can come from different channels and layers). It's intuitive to think of $\tilde{X}$ and $\tilde{Y}$ as the unordered versions of $\tilde{x}$ and $\tilde{y}$ respectively.

The contextual similarity measure is then defined as:

$$C(\tilde{X}, \tilde{Y}) = \frac{1}{N}\sum_{j}\max_{i} c_{i,j} \tag{4.5}$$

where $c_{i,j}$ is the similarity between features $\tilde{x}_i$ and $\tilde{y}_j$, defined below. The contextual loss we want to minimise is then defined as:

$$L(\tilde{X},\tilde{Y}) = -C(\tilde{X},\tilde{Y}) \tag{4.6}$$

Similarity Definition

To define the similarity $c_{i,j}$ let's consider the normalised distance between feature embeddings $$\tilde{d}_{i,j} = \frac{d_{i,j}}{\min_k d_{i,k} + \epsilon}, \tag{4.7}$$

where $d_{i,j}$ is the cosine distance between $\tilde{x}_i$ and $\tilde{y}_j$, and $\epsilon$ is a small positive constant intended to preserve numerical stability. We note that $d_{i,j}$ is not restricted to the cosine distance, and may additionally be any one of (but not limited to) the $L^1$ or $L^2$ norms. Similarities are then defined by exponentiation $$w_{i,j} = \exp\left(\frac{1-\tilde{d}_{i,j}}{h}\right). \tag{4.8}$$

where h>0 is a bandwidth parameter. Finally, $c_{i,j}$ can be gven such that $$c_{i,j} = \frac{w_{i,j}}{\sum_k w_{i,k}}. \tag{4.9}$$

Figure 9:
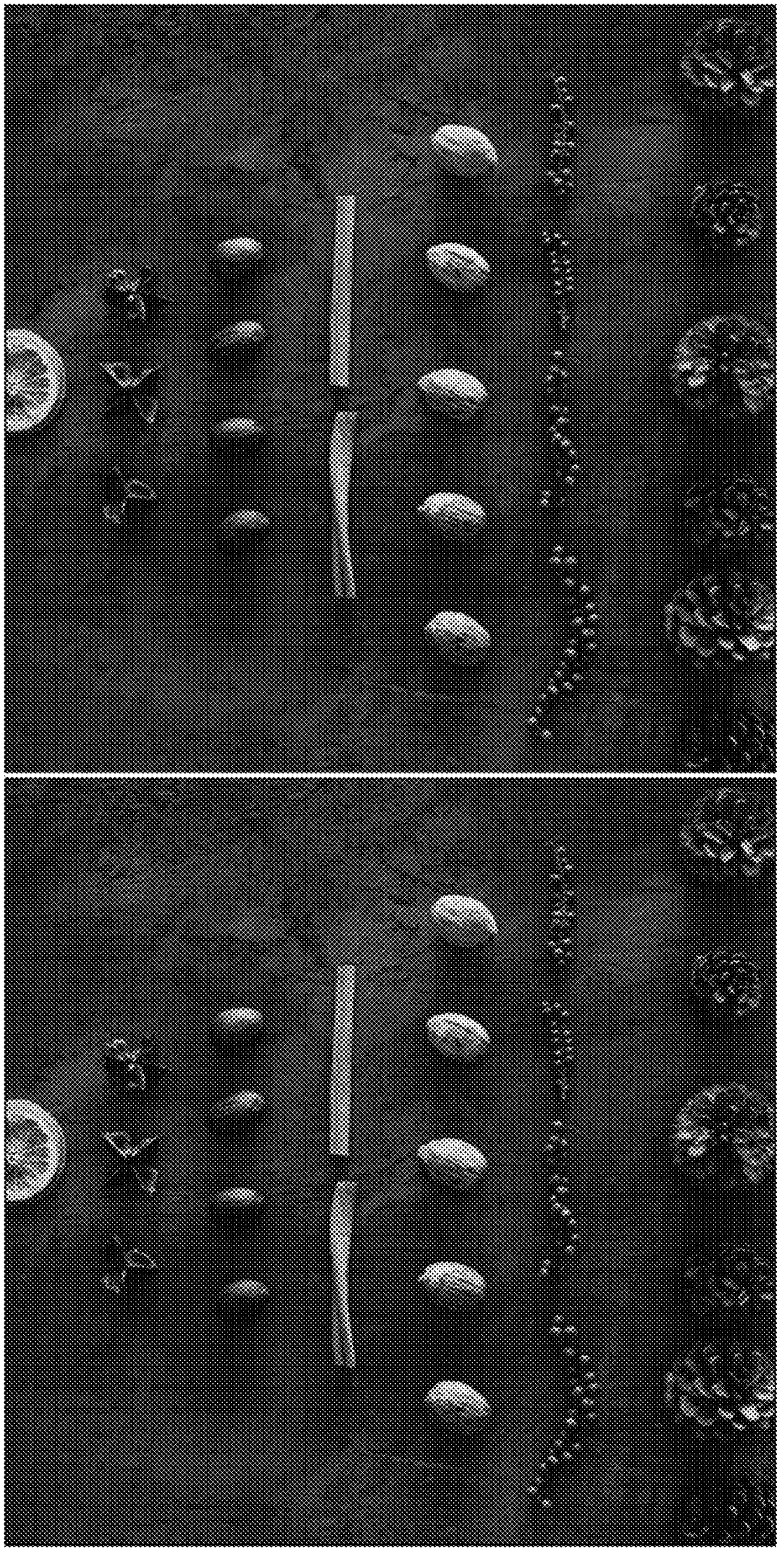
FIG. 9 shows an example of an original image G (left) and its compressed reconstruction H (right), trained using a reconstruction loss incorporating contextual similarity Eq. (4.5). The compressed image has 0.16 bits per pixel and a peak-signal-to-noise ratio of 29.7.

An example input and compressed image pair from a generative autoencoder trained using (4.5) and a ~20% mean-squared error contribution (MSE) is displayed in FIG. 9. We note it is often desirable to supplement (4.5) with the addition of a MSE as to effectively balance the distortion-perception trade-off.

Training Algorithm

An example of pseudo code for one training step of the compression pipeline $f_0$ with contextual loss is outlined in algorithm 4.1.

Algorithm 4.1: Example pseudocode that outlines one training step of the generator $f_\theta$ (i.e. compression pipeline) with contextual loss. It assumes the existence of four functions partition, dist, backpropagate and step.

Inputs:
- Input image: x
- Generator (compression) network: $f_\theta$
- Generator optimizer: $opt_{f_\theta}$
- Feature embedding network: $g_\phi$
- Additional loss for generator: $\mathcal{L}_{add}$
- Small positive constant: $\epsilon \in \mathbb{R}, \epsilon > 0$
- Bandwidth parameter: $h \in \mathbb{R}, h > 0$ -continued Algorithm 4.1: Example pseudocode that outlines one training step of the generator $f_\theta$ (i.e. compression pipeline) with contextual loss. It assumes the existence of four functions partition, dist, backpropagate and step.

Reconstruction and feature embedding:
- $y \leftarrow f(x)$
- $\tilde{x} \leftarrow g_\phi(x)$
- $\tilde{y} \leftarrow g_\phi(y)$ Generator training:
- $\tilde{X} = \{\tilde{x}_i\}_{i=1}^{N} \leftarrow$ parition($\tilde{x}$)
- $\tilde{Y} = \{\tilde{y}_i\}_{i=1}^{N} \leftarrow$ parition($\tilde{y}$)
- for i in {1, . . . , N}, for j in {1, . . . , N}: $d_{i,j}$ = dist($\tilde{x}_i$, $\tilde{y}_j$)
- for i in {1, ..., N}, for j in [1, ... , N}: $\tilde{d}_{i,j} = \frac{d_{i,j}}{\min_k d_{i,k} + e}$
- for i in {1, ..., N}, for j in [1, ... , N}: $w_{i,j} = \exp\left(\frac{1-\tilde{d}_{i,j}}{h}\right)$
- for i in {1, ..., N}, for j in [1, ... , N}: $c_{i,j} = \frac{w_{i,j}}{\sum_k w_{i,k}}$
- $C_{\tilde{X},\tilde{Y}} \leftarrow \frac{1}{N}\sum_j \max_i c_{i,j}$
- $\mathcal{L}_{context} \leftarrow -C_{\tilde{X},\tilde{Y}}$
- $\mathcal{L} \leftarrow \mathcal{L}_{context} + \mathcal{L}_{add}(x, y)$
- backpropagate($\mathcal{L}$)
- step($opt_{f_\theta}$)

The partition function divides the inputted feature embedding into equally sized feature vectors (this can be done in many different ways).
dist is a distance metric between feature vectors (e.g. cosine or $L^2$ distance).
backpropagate uses backpropagation to compute gradients of all parameters with respect to the loss.
step performs an optimization step with the selected optimizer.
Note:
From the pseudo code below you can see that the parameters $\phi$ of $g_\phi$ do not change since there is no optimizer for those parameters.

Interpretation as a Statistical Loss

We call this loss a statistical loss, since according to [7] it is a special case of Kullback-Leibler divergence (KL-divergence) between the finite set of features $\tilde{X}=\{\tilde{x}_i\}$ and $\tilde{Y}=\{\tilde{y}_i\}$. According to this interpretation, $\tilde{x}_1, \tilde{x}_2 \ldots \tilde{x}_N$ are different samples from a certain random variable, and $\tilde{y}_1, \tilde{y}_2, \ldots, \tilde{y}_N$ are different random samples from another random variable. We are minimising the KL-divergence between the distributions of these two random variables by minimising the contextual loss between the two feature embeddings $\tilde{x}$ and $\tilde{y}$. Since the samples $\tilde{x}_1, \tilde{x}_2, \ldots, \tilde{x}_N$ and $\tilde{y}_1, \tilde{y}_2, \ldots, \tilde{y}_N$ come from within the two images, we call this an intra-image statistical loss.

Commutative Contextual Loss

In order to make the reconstruction y as close as possible to the ground truth image x we normally want to maximise the contextual similarity $C(\tilde{X}, \tilde{Y})$. However, the contextual similarity function is not commutative (i.e. $C(\tilde{Y}, \tilde{X}) \neq C(\tilde{X}, \tilde{Y})$). This can either be observed from its definition ((4.5)) or from the fact that the KL-divergence is not commutative.

Due to this we provide in an example a new optimisation objective, where instead of only maximising $C(\tilde{X}, \tilde{Y})$, we maximise a linear combination of both versions of the similarity:

$$\lambda_1 \times C(\tilde{X},\tilde{Y}) + \lambda_2 \times C(\tilde{Y},\tilde{X}) \tag{4.10}$$

for some positive real constants $\lambda_1$ and $\lambda_2$. Note that when $\lambda_1=\lambda_2$ the combined optimisation objective has the commutative property, which might be desirable.

Adversarial Loss

General Outline

The adversarial loss approach on feature embeddings is utilising a discriminator (a.k.a. critic) network $h_\psi$, which is trained in a min-max fashion together with the encoder-decoder network $f_\theta$. The output of the disciminator network $h_\psi(x)$ is a number in the interval [0, 1] specifying the probability that the input x comes from the distribution of real images (i.e. ground truth ones, compared to reconstructed). This approach was initially introduced for generative adversarial networks (GANs) in [8], but is used here with feature embeddings in learnt image and video compression.

The min-max optimisation of the parameters $\theta$ is as follows:

$$\theta^* = \arg\min_\theta \max_\psi \mathbb{E}_{\tilde{x}\sim p_{\tilde{x}}, \tilde{y}\sim p_{\tilde{y}}} V(h_\psi(\tilde{x}), h_\psi(\tilde{y})) \tag{4.11}$$

for some loss function $V(\cdot, \cdot)$. In the case when $$V(h_\psi(\tilde{x}), h_\psi(\tilde{y})) = \log h_\psi(\tilde{x}) + \log[1 - h_\psi(\tilde{y})] \tag{4.12}$$

we get the standard GAN loss. This can be shown to be equivalent to minimizing the Jensen-Shannon divergence between the distributions $p_{\tilde{x}}$ and $p_{\tilde{y}}$.

Other loss functions $V(\cdot, \cdot)$ can be used to minimize other types of divergences between these distributions. We do not limit ourselves to one specific loss function. In practice, we normally use the niodified (or unsaturating) loss, where the inside maximisation of the discriminator parameters is kept the same:

$$\psi^* = \max_\psi \mathbb{E}_{\tilde{x}\sim p_{\tilde{x}}, \tilde{y}\sim p_{\tilde{y}}} V(h_\psi(\tilde{x}), h_\psi(\tilde{y})) \tag{4.13}$$

however the outside minimisation for the encoder-decoder parameters is changed to the maximisation:

$$\theta^* = \arg\min_\theta \mathbb{E}_{\tilde{y}\sim p_{\tilde{y}}} \log h_{\psi^*}(\tilde{y}) \tag{4.14}$$

Figure 10:
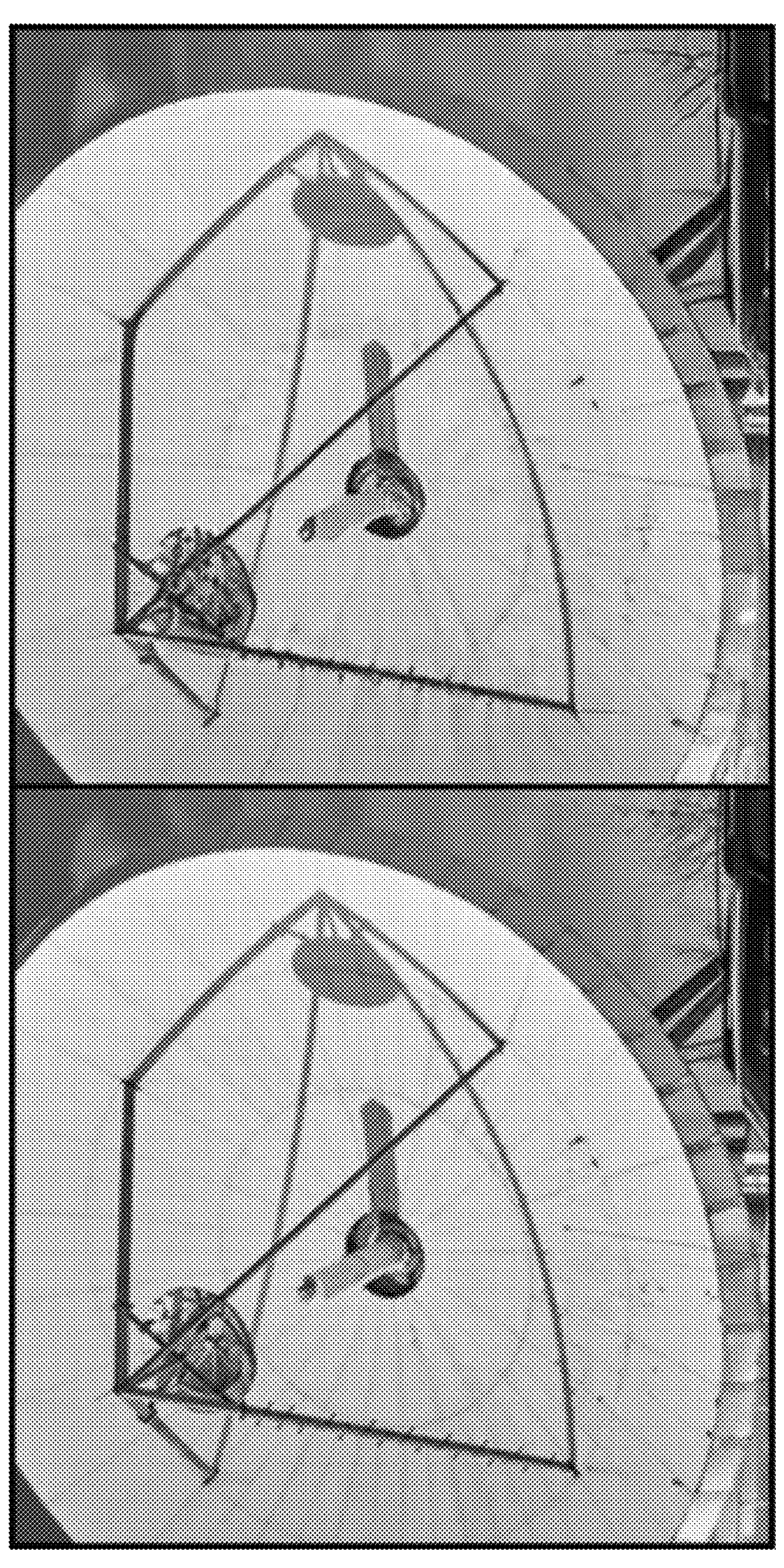
FIG. 10 shows an example of an original image G (left) and its compressed reconstruction H (right), trained using a reconstruction loss incorporating adversarial loss Eq. (4.11) on VGG features. The compressed image has 0.17 bits per pixel and a peak-signal-to-noise ratio of 26.
Figure 11:
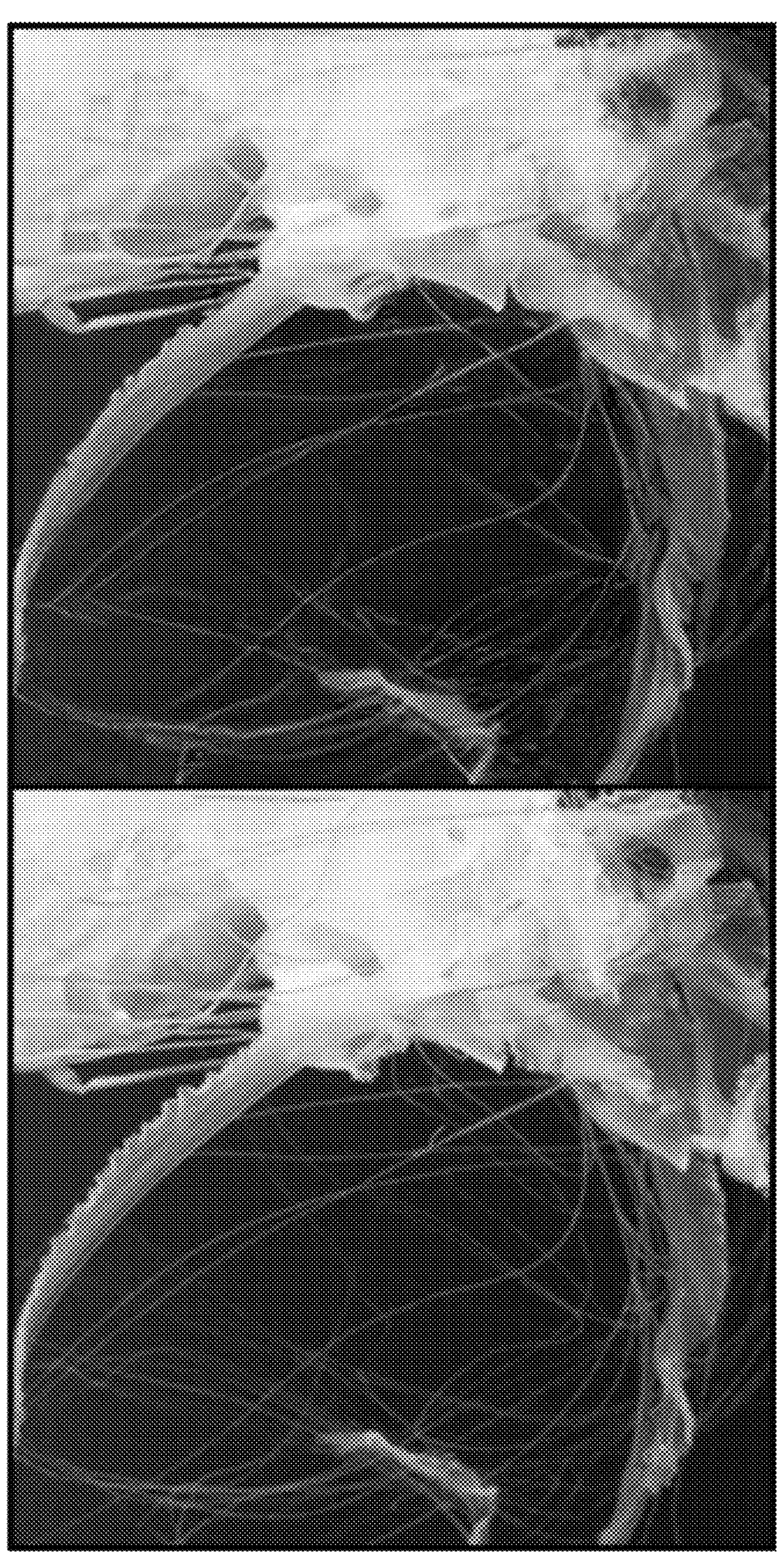
FIG. 11 shows an example of an original image G (left) and its compressed reconstruction H (right), trained using a reconstruction loss incorporating adversarial loss Eq. (4.11) on VGG features. The compressed image has 0.18 bits per pixel and a peak-signal-to-noise ratio of 26.

We give two examples in FIG. 10 and FIG. 11 of reconstructions when we train with adversarial loss (eq. (4.11)) on VGG features (the adversarial loss is in addition to MSE and, in examples, to other in-house and out-house losses).

Training Algorithm

An example of pseudo code for one training step of the compression pipeline $f_\theta$ and discriminator $h_\psi$ with adversarial loss is outlined in algorithm 4.2.

Algorithm 4.2: Example pseudocode that outlines one training step of the generator $f_\theta$ (i.e. compression pipeline) and discriminator $h_\psi$ with adversarial loss. It assumes the existence of 3 functions backpropagate, step and nogradients. backpropagate uses backpropagation to compute gradients of all parameters with respect to the loss. step performs an optimization step with the selected optimizer. The function nogradients ensures no gradients are tracked for the function executed. The function nogradients refers to how deep learning frameworks such as PyTorch and Tensorflow V2 construct a computational graph that is used for the back-propagation operation. This means that producing y with or without gradients impacts whether or not $f_\theta$ will be part of the computational graph, and therefore whether or not gradients can flow through the generator component. Therefore whether y is produced from $f_\theta$, with or without gradients matters, for the back-propagation and optimizer update step.
Note: From the pseudo code below you can see that the parameters $\phi$ of $g_\phi$ are not changed since, there is no optimizer for those parameters. Also, during the training step of the generator the parameters $\psi$ of the discriminator $h_\psi$ are not changed as well.

Inputs:
  Input image: $x$
  Generator (compression) network: $f_\theta$
  Generator optimizer: $opt_{f_\theta}$
  Discriminator network: $h_\psi$
  Discriminator optimizer: $opt_{h_\psi}$
  Feature embedding network: $g_\phi$
  Classification loss of discriminator (for real images): $\mathcal{L}_{discr.real}$
  Classification loss of discriminator (for predicted images): $\mathcal{L}_{discr.pred}$
  Classification loss of generator (for predicted images): $\mathcal{L}_{gen}$
  Additional loss for generator: $\mathcal{L}_{add}$
Reconstruction and feature embedding:
  $y \leftarrow f_\theta(x)$
  $\tilde{x} \leftarrow g_\phi(x)$
  $\tilde{y} \leftarrow g_\phi(y)$
Discriminator training:
  $\tilde{y}_{nograd} \leftarrow \text{nogradients}(\tilde{y})$
  $p_{discr.real} \leftarrow h_\psi(\tilde{x})$
  $p_{discr.pred} \leftarrow h_\psi(\tilde{y}_{nograd})$
  $\mathcal{L}_{discr} \leftarrow \mathcal{L}_{discr.real}(p_{discr.real}) + \mathcal{L}_{discr.pred}(p_{discr.pred})$
  backpropagate($\mathcal{L}_{discr}$)
  step($opt_{h_\psi}$)
Generator training:
  $p_{gen,\ pred} \leftarrow h_\psi(\tilde{y})$
  $\mathcal{L}_{adv} + \mathcal{L}_{gen}(p_{gen,\ pred})$
  $\mathcal{L} \leftarrow \mathcal{L}_{adv} + \mathcal{L}_{add}(x, y)$
  backpropagate($\mathcal{L}$)
  step($opt_{f_\theta}$)

Interpretation as a Statistical Loss

As we have shown already certain loss functions $V(\cdot, \cdot)$ lead to the minimisation of some type of divergence between the distributions $p_{\tilde{x}}$ and $p_{\tilde{y}}$. The original one from [8] is equivalent to minimisation of the Jensen-Shannon divergence. This explains why the adversarial loss components on feature embedding is another type of statistical loss.

In contrast to the contextual loss, here the distributions we are matching are over the whole feature embeddings $\tilde{x}$ and $\tilde{y}$, such that one sample from those distributions corresponds to one image. Therefore we term this statistical loss an inter-image statistical loss.

Note: We would also like to mention the possibility to do adversarial loss applied on individual features from the same image (i.e. coming from $\tilde{X}=\{\tilde{x}_1, \tilde{x}_2, \ldots, \tilde{x}_N\}$), so that we derive an adversarial intro-image statistical loss. In this scenario, one discriminator is trained per image, discriminating between the real parts of the feature embedding $\tilde{x}_1, \tilde{x}_2, \ldots, \tilde{x}_N$ and fake ones $\tilde{y}_1, \tilde{y}_2, \ldots, \tilde{y}_N$.

Different Discriminator Architectures (for Features from Multiple Layers)

Here we present some examples of discriminator architectures that we use for the purpose of adversarial loss on feature embeddings. We present three architectures, but do not limit ourselves to using them only.

Figure 12:
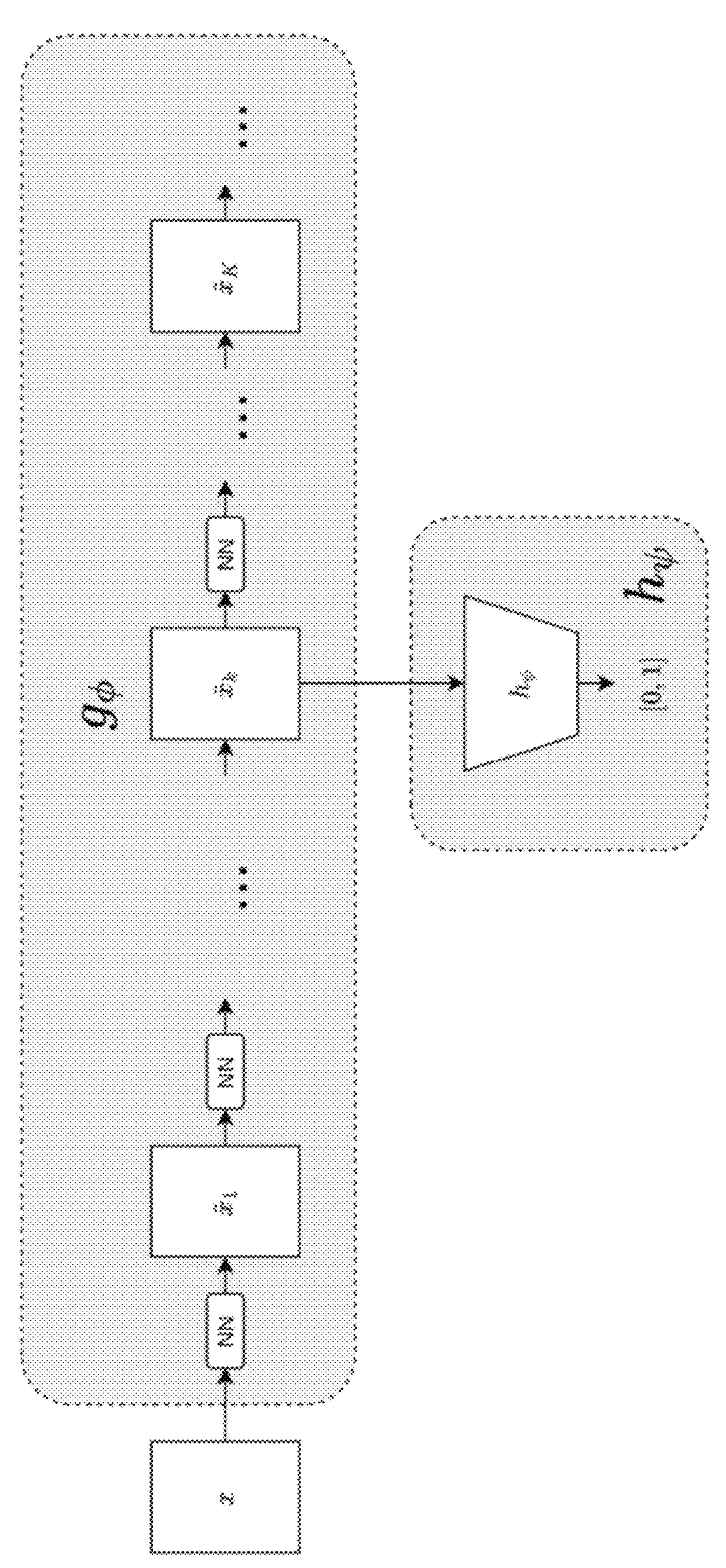
FIG. 12 shows a diagram showing an example of architecture 1 of an example discriminator.

Architecture 1 (one layer features): When $\tilde{x}$ and $\tilde{y}$ consist only of the activations of one layer of $g_\phi$, these two feature embeddings are tensors of dimensions (C, H, W), corresponding to the number of channels, height and width of the feature maps. Even when $\tilde{x}$ and $\tilde{y}$ consist of several layers that are of the same size (i.e. (H, W)) we can concatenate the features from different layers along the channel dimension to produce one (combined) tensor of size ($C_1+C_2+\ldots$, H, W). Given one input tensor, the architecture of the discriminator can be any arbitrary neural network that respects this input size (e.g. CNN or fully-connected NN). FIG. 12 shows an example of the described architecture.

Architecture 2 (multiple layer features: fusion): As noted previously we can consider discriminating feature embeddings, consisting of the activations from several layers of a network $g_\phi$. In general these layers might have different tensor dimensions, i.e.: $\tilde{x}=(\tilde{x}_1, \tilde{x}_2 \ldots, \tilde{x}_K)$, where size($\tilde{x}_1$)=($C_1$, $H_1$, $W_1$), size($\tilde{x}_2$)=($C_2$, $H_2$, $W_2$), . . . , size($\tilde{x}_K$)=($C_K$, $H_K$, $W_K$).

Here we present a discriminator convolutional neural network (CNN) architecture that performs gradual fusion of those features. This approach is similar to the way U-Net architecture performs decoding [9], but with the important difference that this type of feature fusion is applied in the discriminator on feature embeddings. To the best of our knowledge, this is the first time this approach has been used in the context of image and video compression.

Figure 13:
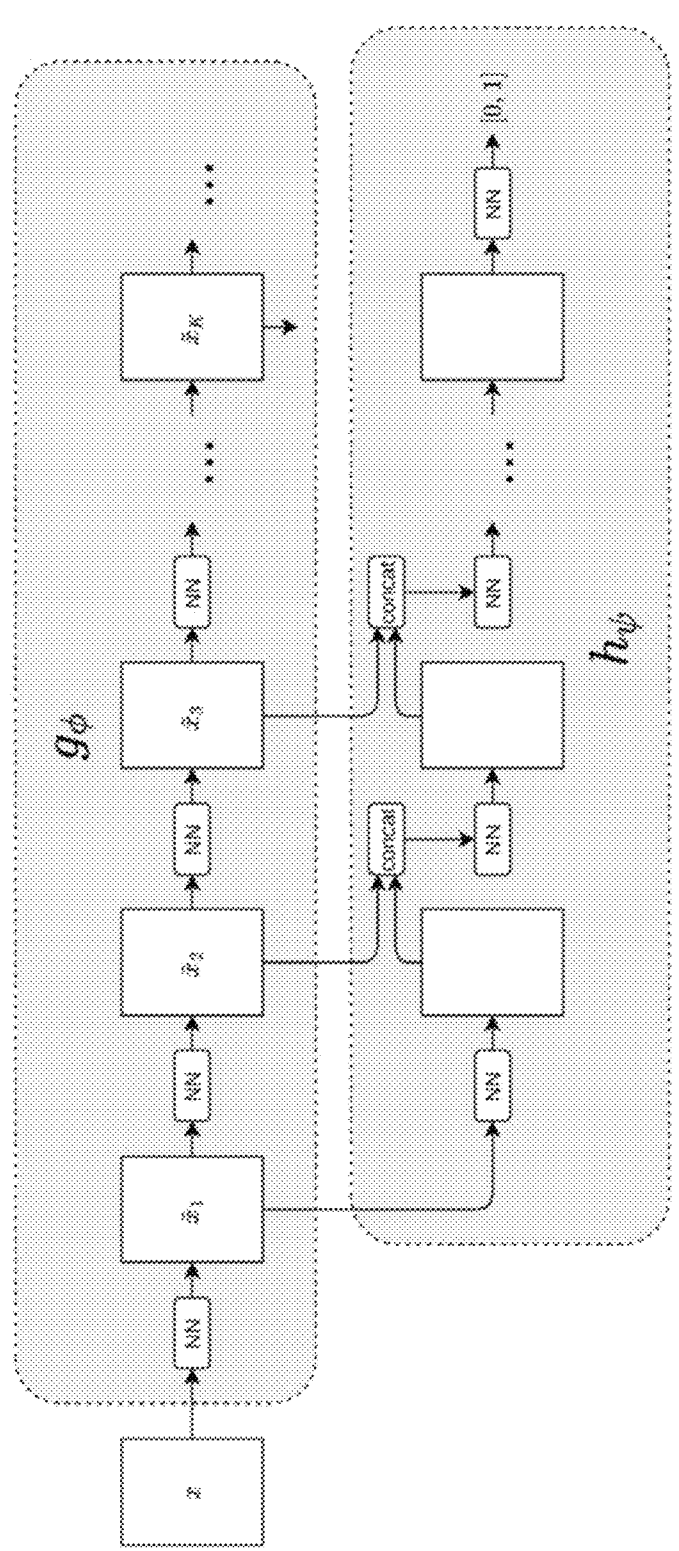
FIG. 13 shows a diagram showing an example of architecture 2 of an example discriminator.

More formally the discriminator $h_\psi$ may consist of several sub-networks $$h^1_{\psi_1}, h^2_{\psi_2}, \ldots, h^K_{\psi_K},$$

so that:

$$h_\psi(\tilde{x}) = h^K_{\psi_K}\left(h^{K-1}_{\psi_{K-1}}\left(\ldots\, h^2_{\psi_2}\left(h^1_{\psi_1}(\tilde{x}_1)\|\tilde{x}_2\right) \ldots \|\tilde{x}_{K-1}\right)\|\tilde{x}_K\right) \quad (4.15)$$

where the parameters $\psi$ consist of ($\psi_1$, $\psi_2$, . . . , $\psi_K$) and $\bullet\|\bullet$ denotes tensor concatenation along the channel dimension. Note that, the height and width output dimensions of $$h^k_{\psi_k}$$

should be the same as the height and width dimensions of $\tilde{x}_{k+1}$ so that concatenation along the channel dimension would work. FIG. 13 shows an example of the described architecture.

Figure 14:
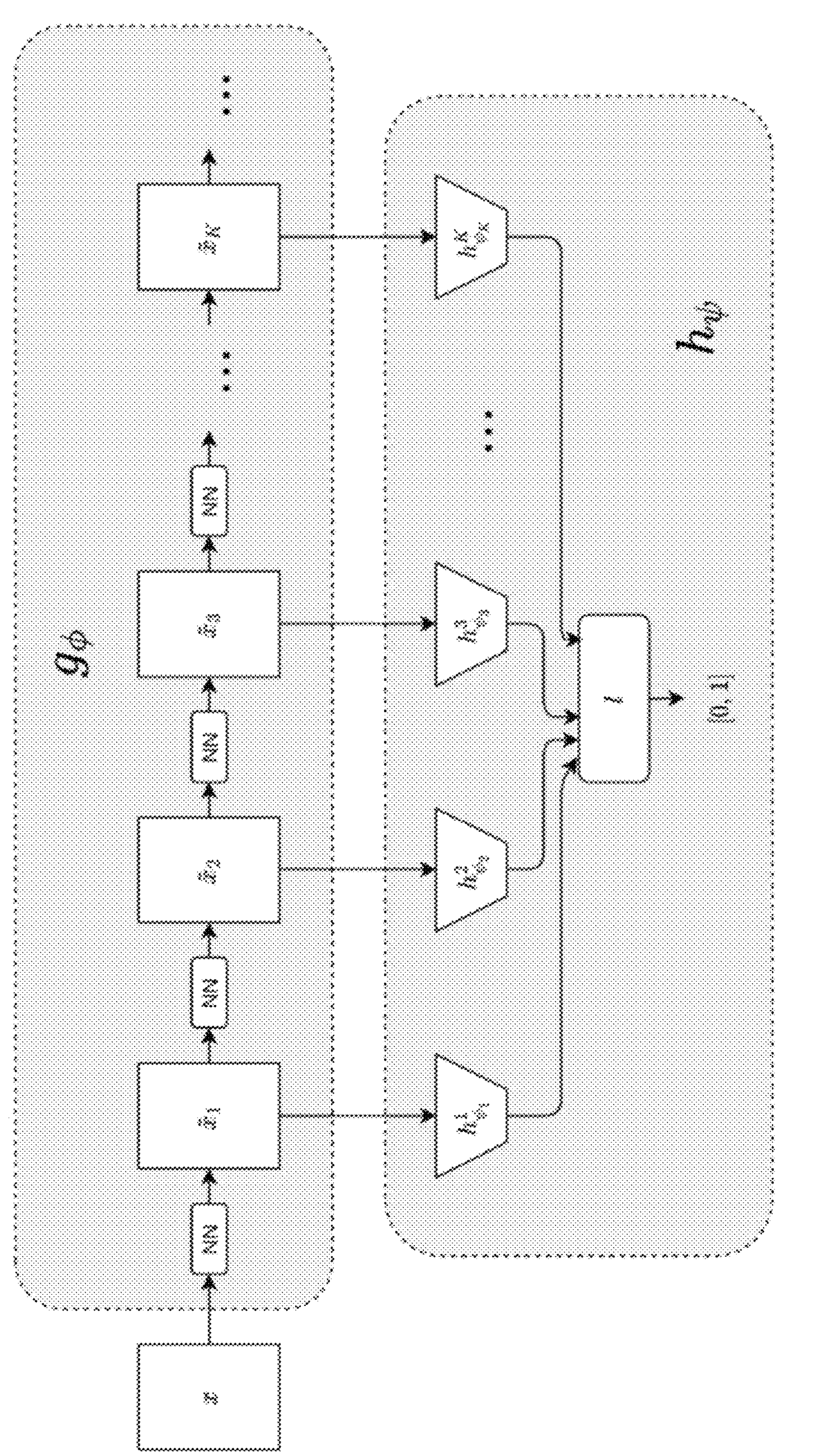
FIG. 14 shows a diagram showing an example of architecture 3 of an example discriminator.

Architecture 3 (multiple layer features: separate discriminators): Let's consider again as in Architecture 2, that our feature embedding $\tilde{x}$ consists of features from several layers of $g_\phi$ with different dimensions, i.e.: $\tilde{x}=(\tilde{x}_1, \tilde{x}_2, \ldots, \tilde{x}_K)$, where size ($\tilde{x}_1$)=($C_1$, $H_1$, $W_1$), size($\tilde{x}_2$)=($C_2$, $H_2$, $W_2$), . . . , size($\tilde{x}_K$)=($C_K$, $H_K W_K$). Instead of gradually fusing them as in Architecture 2, we assign a separate discriminator $$h^k_{\psi_k}$$

to every feature $\tilde{x}_k$. In this way the overall discriminator $h_\psi$ would be defined as a function of the probabilities of all individual discriminators, as follows:

$$h_\psi(\tilde{x}) = l\left(h^1_{\psi_1}(\tilde{x}_1), h^2_{\psi_2}(\tilde{x}_2), \ldots, h^K_{\psi_K}(\tilde{x}_K)\right) \quad (4.16)$$

$$l:[0,1]^K \rightarrow [0,1] \quad (4.17)$$

where $\psi$ consists of ($\psi_1$, $\psi_2$, . . . , $\psi_K$). FIG. 14 shows an example of the described architecture.

Alternatively one can calculate the adversarial loss for all K discriminators and then combine those losses into an overall adversarial loss (e.g. with a linear combination).

4.2.3 Combination with Other Losses

We do not limit the statistical losses (i.e. contextual and adversarial loss) on deep features to combination with MSE. Indeed these losses may be used in combination with a variety of other objectives, as well as losses found in the wider community. Such losses include (but are not limited to): Deep Render's adversarial Video Multimethod Assessment Fusion (VMAF) proxy, Learned Perceptual Image Patch Similarity (LP1PS) [1] and generative adversarial losses (GAN-based losses) (e.g. [10]).

We also do not limit ourselves to using only one instance of statistical loss. For example, we can train with two contextual losses applied on different feature embeddings and two adversarial losses applied on another two feature embeddings. These four statistical losses may be in addition to any other losses we might use.

4.2.4 Goal of Using Statistical Losses on Feature Embeddings

The goal of training with instances of statistical loss on feature embeddings in addition to other types of losses is to optimise the weights $\theta$ of the encoder-decoder network $f_\theta$, so that $f_\theta$ reconstructs images that align more closely perceptually with the ground truth images. In this way the statistical losses represent image (or image distribution) metrics that function as a proxy of the HVS metric. We may use both intra- and inter-image statistical losses (e.g. contextual loss and adversarial loss) in order to achieve our goal.

4.3 References

[3] Richard Zhang, Phillip Isola, Alexei A Efros, Eli Shechtman, and Oliver Wang. The unreasonable effectiveness of deep features as a perceptual metric. In *Proceedings of the IEEE Conference on Computer Vision and Pattern Recognition,* 2018.

[4] Diederik P Kingma and Max Welling. Auto-encoding variational bayes, *arXiv preprint arXiv:* 1312.6114, 2013.

[5] Roey Mechrez, Itamar Talmi, and Lihi Zelnik-Manor. The contextual loss for image transformation with non-aligned data. In *Proceedings of the European Conference on Computer Vision* (*ECCV*), pages 768-783. 2018.

[6] Yochai Blau and Tomer Michaeli. The perception-distortion tradeoff. In *Proceedings of the IEEE Conference on Computer Vision and Pattern Recognition,* 2018.

[7] Roey Mechrez, Itamar Talmi, Firas Shama, and Lihi Zelnik-Manor. Maintaining natural image statistics with the contextual loss. In *Asian Conference on Computer Vision, pages* 427-443. Springer, 2018.

[8] Ian Goodfellow, Jean Pouget-Abadie, Mehdi Mirza, Bing Xu, David Warde-Farley, Sherjil Ozair, Aaron Courville, and Yoshua Bengio. Generative adversarial nets. *Advances in neural information processing systems,* 27, 2014.

[9] Olaf Ronneberger, Philipp Fischer, and Thomas Brox. U-net: Convolutional networks for biomedical image segmentation. In *International Continence on Medical Image Computing and Computer-assisted Intervention*, pages 234-241, Springer, 2015.

[10] Eirikur Agustsson, Michael Tschannen, Fabian Mentzer, Radu Timofte, and Luc Van Gool. Generative adversarial networks for extreme learned image compression. In *Proceedings of the IEEE International Conference on Computer Vision*, pages 221-231, 2019.

The invention claimed is:

1. A computer implemented method of training a neural network for use in lossy image or video compression, the method comprising:

(i) receiving an input image;

(ii) encoding the input image using a first neural network to produce a latent representation, and decoding the latent representation using a second neural network to produce a reconstruction of the input image;

(iii) producing a first feature map, associated with the input image;

(iv) producing a second feature map, associated with the reconstruction of the input image;

(v) evaluating a function based on differences between the first feature map and the second feature map;

(vi) evaluating a gradient of the function;

(vii) back-propagating the gradient of the function through the first neural network and the second neural network to update the weights of the first neural network and the second neural network;

(viii) repeating steps (i) to (vii) to produce a trained first neural network and a trained second neural network.

2. The method of claim 1, comprising producing the first feature map and the second feature map using a third neural network.

3. The method of claim 2, wherein the third neural network comprises a neural network trained for a task other than image or video compression.

4. The method of claim 3, wherein the task other than image or video compression comprises a classification task.

5. The method of claim 2, wherein the first feature map and second feature map comprise one or more outputs from one or more layers of the third neural network.

6. The method of claim 5, wherein the first feature map and/or the second feature map comprise one or more outputs from one or more intermediate layers of the third neural network.

7. The method of claim 6, wherein the third neural network comprises a neural network trained for a task other than for use in lossy image or video compression.

8. The method of claim 1, wherein evaluating the function comprises estimating a difference metric between the first feature map and the second feature map.

9. The method of claim 8, wherein the difference metric comprises a cosine distance metric.

10. The method of claim 8, wherein the difference metric comprises a mean-squared error metric.

11. The method of claim 8, wherein the estimating the difference metric comprises estimating differences between the first and second feature maps with the first and second feature maps in a first operand order, and with the first and second feature maps in a second operand order.

12. The method of claim 1, wherein the function is further based on differences between the input image and the reconstruction of the input image.

13. The method of claim 1, wherein the function defines a first discriminator network and wherein evaluating the function comprises, with the first discriminator network, estimating a probability that the first and/or second feature maps are respectively associated with the input image or the reconstruction of the input image.

14. The method of claim 13, comprising:

(ix) back-propagating the gradient of the function through the first discriminator network to update the weights of the discriminator network; and (x) repeating steps (i) to (vi) and (ix) to produce a trained first discriminator network.

15. The method of claim 13, wherein the first and/or second feature maps each comprise first and second tensors of different dimensions, wherein the first discriminator network comprises a plurality of sub-networks, and wherein the method comprises:

with the plurality of sub-networks combining the first and second tensors of different dimensions before estimating said probability.

16. The method of claim 13, wherein the first and/or second feature maps comprise one or more outputs from one or more layers of a third neural network, wherein evaluating the function comprises:

with the first discriminator network, estimating a probability that the outputs from a first layer of the third neural network are respectively associated with the input image or the reconstruction of the input image; and with the second discriminator network, estimating a probability that the outputs from a second layer of the third neural network are respectively associated with the input image or the reconstruction of the input image.

17. A data processing system configured to perform the method of claim 1.

18. A non-transitory computer program comprising instructions which, when the program is executed by a computer, cause the computer to carry out the method of claim 1.

19. A decoder method comprising:

receiving a bitstream encoded with a latent representation of an image; and decoding the latent representation using a decoder neural network to reconstruct the image;

wherein the decoder neural network is trained according to the training method of claim 1, and wherein the training loss function is based on differences between feature maps associated with training images and feature maps associated with corresponding reconstructions of the training images.

20. A decoder apparatus, the apparatus comprising:

a processor configured to execute a decoder neural network to decode a latent representation of an image to produce a reconstruction of the image;

the decoder neural network trained according to the training method of claim 1, wherein the training loss function is based on differences between feature maps associated with training images and feature maps associated with corresponding reconstructions of the training images.

* * * * *